US011813525B2

(12) United States Patent
Jarrett et al.

(10) Patent No.: US 11,813,525 B2
(45) Date of Patent: *Nov. 14, 2023

(54) COMPUTER DEVICE CONFIGURED TO DETERMINE A TEAM SCORE CONTRIBUTION IN A GAME

(71) Applicant: KING.COM LIMITED, St. Julians (MT)

(72) Inventors: Stephen Jarrett, Stockholm (SE); Po Chi Chui, Stockholm (SE); Patrik Swartz, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,999

(22) Filed: Jul. 21, 2022

(65) Prior Publication Data

US 2022/0379212 A1    Dec. 1, 2022

Related U.S. Application Data

(63) Continuation of application No. 17/195,066, filed on Mar. 8, 2021, now Pat. No. 11,413,532, which is a continuation-in-part of application No. 17/113,891, filed on Dec. 7, 2020, now Pat. No. 11,298,618, which is a continuation-in-part of application No. 17/020,180, filed on Sep. 14, 2020, now Pat. No. 11,235,240.

(60) Provisional application No. 63/013,176, filed on Apr. 21, 2020.

(51) Int. Cl.
A63F 13/537    (2014.01)
A63F 13/69    (2014.01)

(52) U.S. Cl.
CPC ............ *A63F 13/537* (2014.09); *A63F 13/69* (2014.09)

(58) Field of Classification Search
CPC ..... G06F 3/04842; A63F 13/69; A63F 13/807
See application file for complete search history.

(56) References Cited

U.S. PATENT DOCUMENTS

| 2009/0239598 A1* | 9/2009 | Abe .................... G07F 17/3276 463/6 |
| 2014/0220541 A1* | 8/2014 | Waldron .................. G09B 5/02 434/362 |
| 2016/0035178 A1 | 2/2016 | Judkins et al. |

(Continued)

OTHER PUBLICATIONS

YouTube video by username Mankalor, "Mario Kart 8 Deluxe 200cc Online Team Races," dated Aug. 29, 2017, downloaded at https://www.youtube.com/watch?v=3A3VmOUs0hU (Year: 2017).*

(Continued)

*Primary Examiner* — Eric J Yoon
(74) *Attorney, Agent, or Firm* — Saul Ewing LLP

(57) ABSTRACT

A computer device provides a computer implemented game. The user interface of the computer device receives a first user input to control the movement of a game entity along a path in the computer game. The computer device determines, based on the first user input which is associated with a default movement of the game entity along the path and information about at first and second obstacles on the path, that the game entity is to move with an extended movement instead of the default movement. This is to allow both the first and second obstacles to be navigated in response to the first user input such that the game entity continues to move along the path.

19 Claims, 36 Drawing Sheets

(56) References Cited

U.S. PATENT DOCUMENTS

| | | |
|---|---|---|
| 2018/0001201 A1 | 1/2018 | Desjardins et al. |
| 2018/0056183 A1 | 3/2018 | Tezuka et al. |
| 2018/0093187 A1 | 4/2018 | Mabuchi et al. |

OTHER PUBLICATIONS

Aarava (YouTube Video by username aarava, "The Fastest Disqualification in F1 History?," published Dec. 9, 2018, downloaded from https://www.youtube.com/watch?v=ntIUS1zkLlg).

Asphalt Wiki (Asphalt Wiki Site, "Disqualified," last revised Jan. 2, 2019, downloaded from https://asphalt.fandom.com/wiki/Disqualified.

Battle Racing Stars (YouTube video, "Battle Racing Stars—Gameplay Walkthrough Part I—Tutorial (iOS, Android)," downloaded from https://www.youtube.com/watch?v=gjb67vujTbc; published Mar. 4, 2020.

YouTube video by user Gamebot, "Despicable Me Minion Rush: Vampire Minion VS the Villaintrioquist! Boss Battle," published May 17, 2018, downloaded at https://www.youtube.com/watch?v =_STh5dwjxCM (2018).

YouTube video by user Gameloft, "Despicable Me: Minion Rush—Launch Trailer," published Jun. 13, 2013, downloaded from https://www.youtube.com/watch?v=E4HclOqb4D4, 2013.

YouTube video by user makari, "How to Excaliber—Beginner's Warframe Guide," published Oct. 27, 2019, downloaded from https://www.youtube.com/watch?v=nMimLjJjutY, 2019.

Hildago, J., "Warframe Beginner's Guide," online Reno Gazette Journal, published Jan. 10, 2018, downloaded from https://www.rgj.com/story/life/2018/01/10/warframe-beginner-guide-tips-advice-technobubbl/1019204001/ (2018).

Musgrave, S., "Despicable Me: Minion Rush Review," Toucharcade.com website, published Jun. 28, 2013, downloaded from https://toucharcade.com/2013/06/28/despicable me-minion-rush-review/.

Slater, H., "Asphalt 9: Legends review," published Jul. 26, 2018, downloaded from https://www.pocketgamer.com/asphalt-9-legends/asphalt-9-legends-review-an-arcade-racer-thats-got-something-for-everyone/).

Acevedo, P., "Running Shadow Review," windowscentral.com article, published Sep. 29, 2015; downloaded from https://www.windowscentral.com/running-shadow-review (2015).

Strom, S., "Warframe Crafting Guide: Blueprints, Resources, Dojo Research, Relics and Prime Parts," published Aug. 15, 2018, Gamesradar website, downloaded from https://www.gamesradar.com/warfrae-crafting-guide/ (2018).

* cited by examiner

Figure 6a  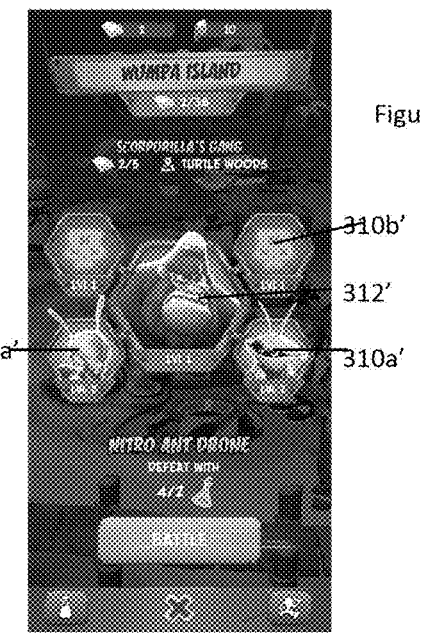 Figure 6b 372  374

376  378

381  382    381  384

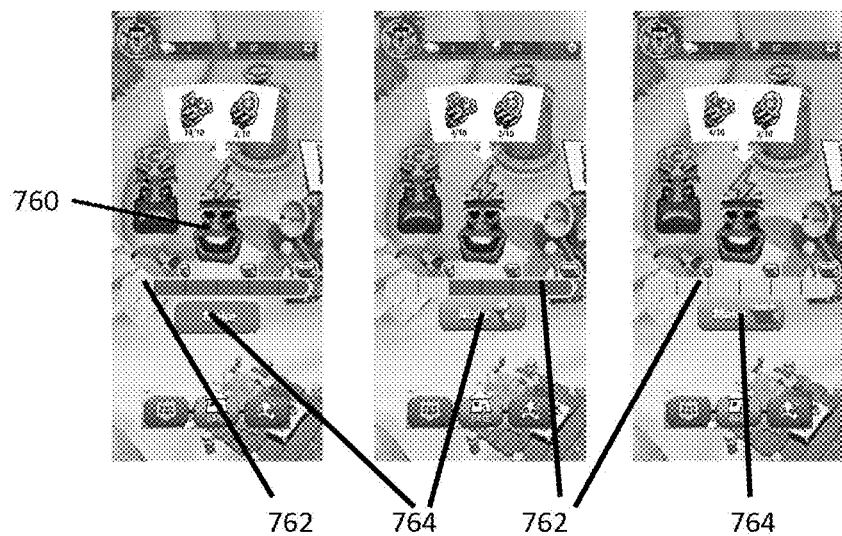

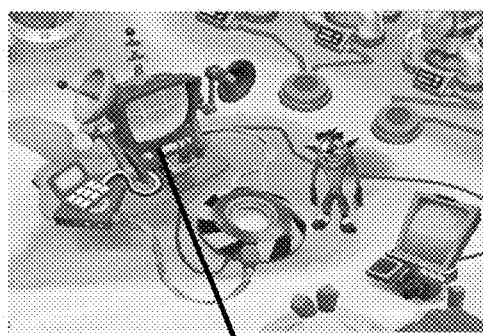
905
Figure 30d
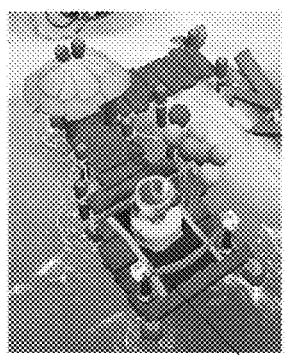 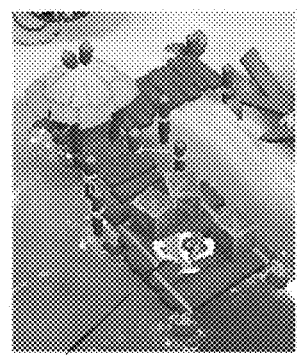
907
Figure 30e  Figure 30f

COMPUTER DEVICE CONFIGURED TO DETERMINE A TEAM SCORE CONTRIBUTION IN A GAME

CROSS-REFERENCE TO RELATED APPLICATIONS

This is a continuation of U.S. application Ser. No. 17/195,066, filed on Mar. 8, 2021, which is a continuation-in-part of U.S. application Ser. No. 17/113,891, filed on Dec. 7, 2020, which is a continuation-in-part of U.S. application Ser. No. 17/020,180, filed on Sep. 14, 2020, which claims the benefit of U.S. Provisional Application No. 63/013,176, filed on Apr. 21, 2020, the entire contents of each of which being fully incorporated herein by reference.

FIELD OF THE INVENTION

Embodiments of this application relate to a computer device configured to allow a user to play a computer implemented game.

Some embodiments may relate to providing a computer device which is configured to provide a computer implemented game which is engaging to users or players.

BACKGROUND OF THE INVENTION

In the field of computer-implemented games, there are many technical challenges facing the designer such that a computer device is configured to provide such games. For example, there may be considerations relating to how, for example, the user interface of the computer device is to be controlled when a user is playing a computer implemented game.

One technical challenge relates to the configuring of the computer device to allow a computer implemented game to be fun and compelling even when there is limited display resource available. This may be a particular technical challenge when the computer implemented game is being played on a smartphone, tablet, or other minicomputer.

Another significant challenge relates to the configuring of computer device to provide a computer implemented which is engaging to the user. Engagement involves configuring the computer device to provide a computer implemented game with gameplay which is engaging and rewarding to players. This typically requires a computer device to be configured to provide a computer implemented game which is easily understood at its simplest or introductory levels, providing rewarding gameplay with quite simple game mechanics, but becoming progressively more challenging so that players are not bored, but remain engaged and develop rewarding skills. Effective engagement requires that the computer device be configured to provide various forms of feedback to reinforce player sense of success and accomplishment.

Runner games are a popular genre of games. Such game may be played on a variety of different computer device platforms. Endless runner games are a genre of games where a player has control over a character that is constantly moving forward.

Some runner games may be played on a mobile device such as a smart phone or tablet. However, it should be appreciated that some runner games may be played on other platforms such as desktop or lap top computer devices or console devices.

There are technical challenges in configuring a computer device to provide a computer implemented game with complexity in the game play particularly where the computer device has a limited available user interface and screen. The user interface and screen may be provided by a common touch screen.

It is a technical challenge configuring a computer device to provide a computer implemented game which provides continued user engagement to retain a player for a long period of time. Some runner games have low retention due to low continued user engagement. Known runner games tend to start easy but then become harder, typically too hard for some players.

This patent specification describes not only various ideas and functions, but also their creative expression. A portion of the disclosure of this patent document therefore contains material to which a claim for copyright is made and notice is hereby given: Copyright King.com Limited 2020 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to another aspect, there is provided a computer device configured to provide a computer implemented game, the computer device comprising: a user interface configured to receive a first user input to control movement of a game entity to move along a path in the computer implemented game; at least one memory configured to store information about one or more obstacles in the path of the computer implemented game; at least one processor configured to determine, based on the first received user input which is associated with a default movement of the game entity and information about at least one of a first and a second obstacle on the path, that the game entity is to move with an extended movement instead of the default movement to allow both the first and second obstacles to be navigated in response to the first user input such that the game entity continues to move along the path, the first obstacle being followed by the second obstacle on the path; and a display configured to display the game entity moving along the path with the extended movement determined by the at least one processor.

The at least one processor may be configured to determine that a criteria is satisfied based on the first received user input and the information about at least one of the first and the second obstacle on the path, and when the criteria is satisfied the at least one processor may be configured to cause the game entity to move with the extended movement.

The default movement and the extended movement may be the same type of movement.

The default movement may comprise a type of movement for a first length of time.

The at least one processor may be configured to modify the default movement to extend a time for which the default movement is performed from the first length of time to a second length of time to provide the extended movement.

The at least one processor may be configured to modify the default movement to extend a time for which the default movement is performed from the first length of time to a second length of time to provide the extended movement, when the criteria is satisfied.

The default movement may comprise a type of movement for a first distance.

The at least one processor may be configured to modify the default movement to extend a distance for which the default movement is performed from the first distance to a second distance to provide the extended movement.

The at least one processor may be configured to modify the default movement to extend a distance for which the default movement is performed from the first distance to a second distance to provide the extended movement when the criteria is satisfied.

The default movement may comprise a first movement and the modified default movement may comprise a second, different movement.

The first obstacle may be followed by a second obstacle in the path, the first user input being provided to navigate a first obstacle.

The at least one processor may be configured to determine that the game entity is to move with the extended movement when the second obstacle is within a threshold distance of the first obstacle.

The criteria may comprise the second obstacle being within a threshold distance of the first obstacle.

The at least one processor may be configured to determine from the first received user input a start of the default movement and when the first obstacle is encountered by the game entity moving with the default movement, when determining that the game entity is to move with the extended movement.

The at least one processor may be configured to determine a remaining part of the default movement, the remaining part of the default movement being a part of the movement after the first obstacle is encountered by the game entity moving with the default movement, the at least one processor being configured use the determined remaining part when determining that the game entity is to move with the extended movement.

The at least one processor is configured to determine that the game entity is to move with an extended movement instead of the default movement when there is less than a threshold amount remaining amount of the default movement.

The criteria may comprise that there is less than a threshold amount remaining amount of the default movement.

The at least one processor is configured to determine that the game entity is to move with an extended movement instead of the default movement when there is less than a threshold amount remaining amount of the default movement and the second obstacle is within a threshold distance.

The criteria may comprise that there is less than a threshold amount remaining amount of the default movement and the second obstacle is within a threshold distance.

The at least one processor may be configured to determine if the default movement would cause the game entity to fail to navigate the second obstacle and when it is determined that the game entity would fail to navigate the second obstacle, the at least processor may determine that the game entity is to move with the extended movement.

The criteria may comprise the default movement causing the game entity to fail to navigate the second obstacle.

The at least one processor may be configured to determine that the game entity is to slide in response to the first received user input.

The game entity may comprise a character.

The computer implemented game may comprise a runner game.

The computer implemented game may comprise a runner game with resource management.

The default movement may be to remove, navigate around, navigate over, navigated through, or navigate under the first obstacle.

The user interface and the display may be provided by a touch screen.

According to another aspect, there is provided a computer implemented method provided by a computer device configured to provide a computer implemented game, the computer device comprising a user interface, at last one processor, a display and at least one memory which are configured to provide the method which comprise: receiving a first user input, via the user interface of the computer device, to control movement of a game entity to move along a path in the computer implemented game; storing, by the at least one memory of the computer device, information about one or more obstacles in the path of the computer implemented game; determining, by the at least one processor of the computer device, based on the first received user input which is associated with a default movement of the game entity and information about at least one of a first and a second obstacle on the path, that the game entity is to move with an extended movement instead of the default movement to allow both the first and second obstacles to be navigated in response to the first user input such that the game entity continues to move along the path, the first obstacle being followed by the second obstacle on the path; and displaying, by the display, the game entity moving along the path with the extended movement determined by the at least one processor.

The method may comprise determining that a criteria is satisfied based on the first received user input and the information about at least one of the first and the second obstacle on the path, and when the criteria is satisfied causing the game entity to move with the extended movement.

The default movement and the extended movement may be the same type of movement.

The default movement may comprise a type of movement for a first length of time.

The method may comprise modifying, by the at least one processor, the default movement to extend a time for which the default movement is performed from the first length of time to a second length of time to provide the extended movement.

The method may comprise modifying, by the at least one processor, the default movement to extend a time for which the default movement is performed from the first length of time to a second length of time to provide the extended movement, when the criteria is satisfied.

The default movement may comprise a type of movement for a first distance.

The method may comprise modifying, by the at least one processor, the default movement to extend a distance for which the default movement is performed from the first distance to a second distance to provide the extended movement.

The method may comprise modifying, by the at least one processor, the default movement to extend a distance for which the default movement is performed from the first distance to a second distance to provide the extended movement, when the criteria is satisfied.

The default movement may comprise a first movement and the modified default movement may comprise a second, different movement.

The first obstacle may be followed by a second obstacle in the path, the first user input being provided to navigate a first obstacle.

The method may comprise determining, by the at least one processor, that the game entity is to move with the extended movement when the second obstacle is within a threshold distance of the first obstacle.

The criteria may comprise the second obstacle being within a threshold distance of the first obstacle.

The method may comprise determining, by the at least one processor, from the first received user input when a default movement begins and when the first obstacle is encountered by the game entity as the information about at least of the first and second obstacle.

The method may comprise determining, by the at least one processor, from when a default movement begins and when the first obstacle is encountered by the game entity, a remaining amount of the default movement.

The method may comprise determining, by the at least one processor, that the game entity is to move with an extended movement instead of the default movement when there is less than a threshold amount remaining amount of the default movement.

The method may comprise determining, by the at least one processor, that the game entity is to move with an extended movement instead of the default movement when there is less than a threshold amount remaining amount of the default movement and the second obstacle is within a threshold distance.

The criteria may comprise that there is less than a threshold amount remaining amount of the default movement and/or that that second obstacle is within the threshold distance.

The method may comprise determining, by the at least one processor, if the default movement would cause the game entity to fail to navigate the second obstacle and when it is determined that the game entity would fail to navigate the second obstacle, the at least processor may determine that the game entity is to move with the extended movement.

The criteria may comprise the default movement causing the game entity to fail to navigate the second obstacle.

The method may comprise determining, by the at least one processor, that the game entity is to slide in response to the first received user input.

The game entity may comprise a character.

The computer implemented game may comprise a runner game.

The computer implemented game may comprise a runner game with resource management.

The default movement may be to remove, navigate around, navigate over, navigated through, or navigate under the first obstacle.

The user interface and the display may be provided by a touch screen.

The method may comprise storing, by at least one memory of the computer device, information about the first and second obstacles.

According to an aspect, there is provided a computer device configured to provide a computer implemented game, the computer device comprising: a user interface configured to receive user input to control movement of a first game entity in a run with one or more second game entities of the computer implemented game; at least one processor configured to control movement of the one or more second game entities in the run independently of user input and the movement of the first game entity in response to user input; and a display configured to display the first game entity moving in the run of the computer implemented game with the one or more second game entities, wherein the at least one processor configured to: determine an end of the run responsive to the first entity satisfying one or more fail conditions; in response to determining the end of the run, determining which of the first and the one or more second entities have satisfied one or more fail conditions; determine a placing of the first entity for the run in dependence on which of the first and the one or more second entities have been determined to have satisfied one or more fail conditions; determine a first score for the first game entity in dependence on the placing of the first entity for the run; and cause the display to display information indicating the first score for the first entity and the placing of the first entity at the end of the run.

The at least one processor may be configured to determine the end of the run responsive to determining that one or more second entities has satisfied one or more fail conditions.

The at least one processor may be configured to determine the placing of the first entity for the run using information associated with one or more second entities indicating that the respective second entity has not satisfied a respective fail condition before the end of the run The at least one processor may be configured to determine a placing for the first entity in dependence on a number of second entities which satisfied the one or more fail conditions prior to the end of the run.

The at least one processor may be configured to determine that the first entity has satisfied an initial first fail condition and in response to cause the display to display information about one or more continue options which when selected allow the first entity to continue to run in the run.

The at least one processor may be configured to determine that user input has been received via the user interface selecting one or more of the continue options and in response, the at least one processor is configured to cause the first entity to run in the run.

The at least one processor may be configured to pause the run in response to determining that the first entity has satisfied the initial first fail condition.

The at least one processor may be configured, in response to selecting of one or more of the continue options by user input received via the user interface, to cause the run to be restarted at a position in the run, dependent on a position at which the run was paused.

The run may comprise a plurality of segments and the at least one processor may be configured to determine in which one of the plurality of segments the initial first fail condition occurred and to cause the first entity to continue to run in the run starting at a beginning of the determined segment in which the initial first fail condition occurred.

The at least one processor may be configured to determine a run score for the first entity in dependence on at least one of a distance run by the first entity in the run and a length of time run by the first entity in the run.

The at least one processor may be configured to cause the display to display information associated with the determined run score.

The at least one processor may be configured to determine the first score for the first game entity further in dependence on the run score of the first entity in the run.

The at least one processor may be configured to determine a run score for the first entity in dependence on one or more parameters associated with the run.

The at least one processor may be configured to determine a run score for each of the first entity and the one or more second entities in dependence on at least one of a distance run by the respective entity in the run and a length of time run by the respective entity in the run.

The at least one processor may be configured to cause the display to display information associated with the determined run score for each of the first entity and the one or more second entities.

The at least one processor may be configured to determine a team score contribution provided by the first game entity in dependence on a score of the first game entity.

The at least one processor may be configured to cause the display to display a team score for a team associated with the first game entity and a team score for at least one other team.

The at least one processor may be configured to cause the first and second entities to collect resources whilst the first and second entities move in the run.

The at least one processor may be configured to cause the display to display a plurality of resources in the run and to determine if one of the first and second entities has collected a respective resource by the movement of the respective game entity.

According to another aspect, there is provided a computer implemented method provided by a computer device configured to provide a computer implemented game, the method comprising: receiving, by a user interface of the computer device, user input to control movement of a first game entity in a run with one or more second game entities of the computer implemented game; controlling, by at least one processor of the computer device, movement of the one or more second game entities in the run independently of user input and the movement of the first game entity in response to user input; displaying, by a display of the computer device, the first game entity moving in the run of the computer implemented game with the one or more second game entities; determining, by the at least one processor, an end of the run responsive to the first entity satisfying one or more fail conditions; in response to determining the end of the run, determining by the at least one processor, which of the first and the one or more second entities have satisfied one or more fail conditions; determining, by the at least one processor, a placing of the first entity for the run in dependence on which of the first and the one or more second entities have been determined to have satisfied one or more fail conditions; determining, by the at least one processor, a first score for the first game entity in dependence on the placing of the first entity for the run; and causing, by the at least one processor, the display to display information indicating the first score for the first entity and the placing of the first entity at the end of the run.

The method may comprise determining, by the at least one processor, the end of the run responsive to determining that one or more second entities has satisfied one or more fail conditions.

The method may comprise determining, by the at least one processor, the placing of the first entity for the run using information associated with one or more second entities indicating that the respective second entity has not satisfied a respective fail condition before the end of the run.

The method may comprise determining, by the at least one processor, a placing for the first entity in dependence on a number of second entities which satisfied the one or more fail conditions prior to the end of the run.

The method may comprise determining, by the at least one processor, that the first entity has satisfied an initial first fail condition and in response causing the display to display information about one or more continue options which when selected allow the first entity to continue to run in the run.

The method may comprise determining, by the at least one processor, that user input has been received via the user interface selecting one or more of the continue options and in response, the causing the first entity to run in the run.

The method may comprise pausing, by the at least one processor, the run in response to determining that the first entity has satisfied the initial first fail condition.

The method may comprise causing, by the at least one processor, in response to selecting of one or more of the continue options by user input received via the user interface, the run to be restarted at a position in the run, dependent on a position at which the run was paused.

The run may comprise a plurality of segments and the method may comprise determining, by the at least one processor, in which one of the plurality of segments the initial first fail condition occurred and causing the first entity to continue to run in the run starting at a beginning of the determined segment in which the initial first fail condition occurred.

The method may comprise determining, by the at least one processor, a run score for the first entity in dependence on at least one of a distance run by the first entity in the run and a length of time run by the first entity in the run.

The method may comprise causing, by the at least one processor, the display to display information associated with the determined run score.

The method may comprise determining, by the at least one processor, the first score for the first game entity further in dependence on the run score of the first entity in the run.

The method may comprise determining, by the at least one processor, a run score for the first entity in dependence on one or more parameters associated with the run.

The method may comprise determining, by the at least one processor, a run score for each of the first entity and the one or more second entities in dependence on at least one of a distance run by the respective entity in the run and a length of time run by the respective entity in the run.

The method may comprise causing, by the at least one processor, the display to display information associated with the determined run score for each of the first entity and the one or more second entities.

The method may comprise determining, by the at least one processor, a team score contribution provided by the first game entity in dependence on a score of the first game entity.

The method may comprise causing, by the at least one processor, the display to display a team score for a team associated with the first game entity and a team score for at least one other team.

The method may comprise causing, by the at least one processor, the first and second entities to collect resources whilst the first and second entities move in the run.

The method may comprise causing, by the at least one processor, the display to display a plurality of resources in the run and to determine if one of the first and second entities has collected a respective resource by the movement of the respective game entity.

According to another aspect, there is provided a computer device configured to provide a computer implemented game, the computer device comprising: a user interface configured to receive user input to control movement of a first game entity in a run with one or more second game entities of the computer implemented game; at least one processor configured to control movement the one or more second game entities in the run independently of user input and the movement of the first game entity in response to user input, a display configured to display the first game entity moving in the run of the computer implemented game with the one or more second game entities; wherein the at least one processor configured to: determine an end of the run responsive to the first entity satisfying one or more fail conditions; in response to determining the end of the run, determining whether or not one or more second entities have satisfied one or more fail conditions; determine a placing of the first entity for the run in dependence on a number of the one of second entities determined to have satisfied one or more fail conditions; determine a score for the first game entity in dependence on the placing of the first entity for the run and on the distance run by the first game entity in the run; and causing the display to display information indicating the placing of the first entity at the end of the run.

According to one aspect, there is provided a computer device configured to provide a computer implemented game, the computer device comprising: a user interface configured to receive user input to control movement of a game entity in a collection run of the computer implemented game, the collection run for collecting resources; a display configured to display the game entity moving in response to the user input in the collection run of the computer implemented game; at least one processor configured to determine in response to the received user input one or more resources collected by the movement of game entity in the collection run;

wherein the at least one processor is configured to determine that one or more required resources have been collected and to receive a further user input via the user interface to use the one or more required resources, and in response to the further user input provide one or more further items for the computer implemented game.

The at one or more further items may be used in a subsequent collection run.

The one or more subsequent collection runs may comprise a battle run

The at least one processor may be configured to provide the one or more further items after a predetermined time.

The at least one processor may be configured to provide the one or more further items a predetermined time after the further user input.

The at least one processor may be configured to start a timer in response to the further user input and to provide the one or more further items in response to determining that the timer has expired.

The at least one processor may be configured to provide a battle option for the game entity.

The battle option may comprise an enemy for the at least one game entity to battle.

The at least one processor may be configured to provide the battle option in the collection run.

The battle option may be provided at an endpoint of the collection run.

A plurality of different battle options may be provided in the computer implemented game and, the at least one processor may be configured to provide one of the plurality of different battle options in response to user input received via the user interface.

In response to user input received via the user interface, the at least one processor may be configured to provide one or more of the further items for the game entity to use in the battle option The computer implemented game may comprise a further item area different from the collection run and the at least one processor may be configured to cause the further item area to be displayed on the display.

The collection run may comprise one or more exit points and the at least one processor may be configured to determine when the game entity has reached one of the one or more exit points and in response cause the further item area to be displayed.

The collection run may comprise one or more exit points and the at least one processor may be configured to determine when the game entity has reached one of the one or more exit points and in response cause the further item area to be accessible.

The further item area may comprise a base.

The further item area may comprise one or more item creating entities, wherein in response to selection of an item creating entity by user input received via the user interface, the at least one processor may be configured to cause one or more options associated with the selected item creating entity to be displayed on the display.

The at least one processor may be configured, for a selected item creating entity and in response to selection of one or more collected resources and/or one or more items made by one or more item creating entities, to provide one or more further items.

The at least one processor may be configured to in response to user input cause at least one item creating entity to be one of upgraded, created, or unlocked.

The computer implemented game may comprise a further item area different from the collection run, the at least one processor may be configured to cause the further item area to be displayed and in response to the further user input received via the user interface selecting one or more of the given collected resources to cause one or more intermediate items to be provided.

When the further item area is displayed, the at least one processor may be configured to cause one or more further items to be provided in response to user input received via the user interface selecting one or more of: one or more the given collected resources and one or more intermediate items.

The at least one processor may be configured, in response to user input received via the user interface selecting one or more of the given collected resources to cause one or more further items to be provided.

The one or more further items may comprise one or more of a weapon and ammunition.

According to another aspect, there is provided a computer implemented method provided by a computer device configured to provide a computer implemented game, the method comprising: receiving via a user interface of the computer device, user input to control movement of a game entity in a collection run of the computer implemented game, the collection run for collecting resources; displaying on a display of the computer device the game entity moving in response to the user input in the collection run of the computer implemented game; determining, by at least one processor of the computer device, in response to the received user input one or more resources collected by the movement of game entity in the collection run; determining by the at least one processor that one or more required resources have been collected; receiving a further user input via the user interface to use the one or more required resources; and in response to the further user input providing by the at least one processor one or more further items for the computer implemented game.

The at one or more further items may be used in a subsequent collection run.

The one or more subsequent collection runs may comprise a battle run

The method may comprise providing, by the at least one processor, the one or more further items after a predetermined time.

The method may comprise providing, by the at least one processor, the one or more further items a predetermined time after the further user input.

The method may comprise starting, by the at least one processor, a timer in response to the further user input and providing the one or more further items in response to determining that the timer has expired.

The method may comprise providing, by the at least one processor, a battle option for the game entity.

The battle option may comprise an enemy for the at least one game entity to battle.

The method may comprise providing, by the at least one processor, the battle option in the collection run.

The battle option may be provided at an endpoint of the collection run.

The method may comprise providing, a plurality of different battle options in the computer implemented game and providing, by the at least one processor, one of the plurality of different battle options in response to user input received via the user interface.

The method may comprise providing, by the at least one processor, in response to user input received via the user interface one or more of the further items for the game entity to use in the battle option The method may comprise providing in the computer implemented game a further item area different from the collection run and causing, by the at least one processor, the display to display the further item area on the display.

The collection run may comprise one or more exit points and the method may comprise determining, by the at least one processor, when the game entity has reached one of the one or more exit points and in response causing the display to display the further item area.

The collection run may comprise one or more exit points and the method may comprise determining, by the at least one processor, when the game entity has reached one of the one or more exit points and in response causing the further item area to be accessible.

The further item area may comprise a base.

The further item area may comprise one or more item creating entities, and the method may comprising causing, by the at least one processor, in response to selection of an item creating entity by user input received via the user interface, one or more options associated with the selected item creating entity to be displayed on the display.

The method may comprise providing, by the at least one processor, for a selected item creating entity and in response to selection of one or more collected resources and/or one or more items made by one or more item creating entities, one or more further items.

The method may comprise causing, by the at least one processor, in response to user input at least one item creating entity to be one of upgraded, created, or unlocked.

The at least one processor may be configured, in response to user input received via the user interface selecting one or more of the given collected resources to cause one or more further items to be provided.

The computer implemented game may comprise a further item area different from the collection run and the method may comprise causing, by the at least one processor, the further item area to be displayed on the display and in response to the further user input received via the user interface selecting one or more of the given collected resources causing one or more intermediate items to be provided.

When the further item area is displayed, the method may comprise causing, by the at least one processor, one or more further items to be provided in response to user input received via the user interface selecting one or more of: one or more the given collected resources and one or more intermediate items.

The one or more further items may comprise one or more of a weapon and ammunition.

According to an aspect, there is provided a computer device comprising: a display; at least one memory; at least one processor; and a user interface, the at least one processor being configured to: cause the display to display a character moving through a game environment in a collection run; in response to user input received via the user interface controlling the character, determining one or more resources collected by the at least one character during the collection run; in response to user input causing one or more items to be created from at least one or more resources; causing the display to display the character moving through a game environment in a battle run; and in response to user input received via the user interface controlling the character to use one or more of the one or more items to battle an enemy in the battle run.

The at least one processor may be configured to cause the display to display a base comprising one or more base entities.

The at least processor may be configured in response to user input cause at least one base entity to create one or more items.

The one or more items may comprise one or more of a weapon and ammunition.

The at least one processor may be configured in response to user input cause at least one base entity to be one of upgraded, created, or unlocked.

The at least one processor may be configured to determine if the character has reached an exit point in the collection run and when the character reaches the exit point, the character is taken to the base.

The at least one processor is configured to cause the display to display an indication as to the location of the exit point.

The at least one processor is configured to determine if the enemy has been defeated in the battle run, and if so providing one or more rewards.

The at least one processor is configured to provide the enemy at the end of a battle run.

The at least one processor is configured to provide at least one locked path in the collection run and in response to one or more user actions determining that the path is unlocked.

The one or more user actions may comprise the user purchasing a key from a shop.

The shop may comprise a base entity.

The at least one processor may be configured, in response to user input, to use one or more of the rewards to upgrade one or more base entities.

The at least one processor may be configured to start a timer when the path is unlocked and when the timer expires, the at least one processor is configured to cause the path to be locked again.

The at least one processor may be configured to display information indicating when the path will be locked again.

The at least one processor may be configured to display information indicating the remaining amount of time for which the path will be unlocked.

The at least one processor may be configured to determine that one or more resources on the locked path have been collected and in response to start one or more reseed timers whereby a respective resource is only replenished when a respective reseed timer has expired.

According to another aspect, there is provided a computer device comprising: a display; at least one memory; at least one processor; and a user interface, the at least one processor being configured to: cause the display to display a character moving through a game environment in a collection run; in response to user input received via the user interface controlling the character, determining one or more resources collected by the at least one character during the collection run; and in response to user input causing one or more items to be created from at least one or more resources.

According to another aspect, there is provided a computer implemented comprising: causing by at least one processor of a computer device, a display of the computer device display to display a character moving through a game environment in a collection run; in response to user input received via a user interface of the computer device, controlling the character, determining by the at least one processor, one or more resources collected by the at least one character during the collection run; in response to user input received via the user interface, causing by the at least one processor, one or more items to be created from at least one or more resources; causing by the at least one processor, the display to display the character moving through a game environment in a battle run; and in response to user input received via the user interface controlling by the at least one processor, the character to use one or more of the one or more items to battle an enemy in the battle run.

The method may comprise causing by the at least one processor, the display to display a base comprising one or more base entities.

In response to user input causing by the at least one processor, at least one base entity to create one or more items.

The one or more items may comprise one or more of a weapon and ammunition.

In response to user input causing by the at least one processor, least one base entity to be one of upgraded, created, or unlocked.

The method may comprise determining by the at least one processor if the character has reached an exit point in the collection run and when the character reaches the exit point, the character is taken to the base.

The method may comprise causing by the at least one processor the display to display an indication as to the location of the exit point.

The method may comprise determining by the at least one processor if the enemy has been defeated in the battle run, and if so providing one or more rewards.

The method may comprise causing by the at least one processor the enemy to be provided at the end of a battle run.

The method may comprise providing by the at least one processor at least one locked path in the collection run and in response to one or more user actions determining that the path is unlocked.

The one or more user actions may comprise the user purchasing a key from a shop.

The shop may comprise a base entity.

The method may comprise, in response to user input, using by the at least one processor one or more of the rewards to upgrade one or more base entities.

The method may comprise starting by the at least one processor a timer when the path is unlocked and when the timer expires, causing the path to be locked again.

The method may comprise displaying information indicating when the path will be locked again.

The method may comprise displaying information indicating the remaining amount of time for which the path will be unlocked.

The method may comprise determining that one or more resources on the locked path have been collected and in response starting one or more reseed timers whereby a respective resource is only replenished when a respective reseed timer has expired.

According to another aspect, there is provided a computer implemented method comprising: causing by at least one processor of a computer device, a display of the computer device display to display a character moving through a game environment in a collection run; in response to user input received via a user interface of the computer device, controlling the character, determining by the at least one processor, one or more resources collected by the at least one character during the collection run; and in response to user input received via the user interface, causing by the at least one processor, one or more items to be created from at least one or more resources.

According to another aspect, there is provided a computer device configured to provide a computer implemented game, the computer device comprising: a display configured to display a plurality of different item generating options of the computer implemented game; a user interface configured to receive user input to select one of the plurality of different item generating options of the computer implemented game; at least one processor configured to determine that one or more resources required by the selected one of the plurality of item generating options to generate a respective item are unavailable, wherein the at least one processor is further configured to determine which one or more of a plurality of collection runs has one or more of the unavailable resources.

The at least one processor may be further configured to cause information about one or more collection runs of the computer implemented game to be displayed on the display.

The at least one processor may be further configured to cause information about one or more collection runs of the computer implemented game having one or more of the unavailable resources to be displayed on the display.

The at least one processor may be further configured to cause information only about one or more collection runs of the computer implemented game having one or more of the unavailable resources.

The at least one processor may be further configured to cause information about one or more collection runs of the computer implemented game to be displayed, the information indicating for a respective collection run resources which are available for collection in the collection run.

The at least one processor may be further configured to cause information about one or more collection runs of the computer implemented game to be displayed, the information indicating for a respective collection run if that collection run has one or more of the unavailable resources available for collection.

The at least one processor may be configured to cause information to be displayed on the display indicating which collection run provides one or more of resources which are not available for the selected item generating option.

The user interface may be configured to receive user input selecting one of plurality of collection runs and in response, the at least one processor is configured to cause the display to display the selected collection run.

The at least one processor may be configured to determine which one or more of the plurality of different item generating options of the computer implemented game are currently available for selection.

The display may be configured to display information indicating which one or more of the plurality of different item generating options of the computer implemented game are currently available for selection.

The at least one processor may be configured to determine which one or more of the plurality of collection runs of the computer implemented game are currently available for selection.

The at least one processor may be configured to cause information about availability for selection of one or more collection to be displayed by the display.

The at least one processor may be configured to provide information about one or more collection run options in which the respective unavailable resources can be collected in response to selection of a collection run option received via the user interface.

The at least one processor may be configured to cause the display to display information indicating which one or more resources required by the selected one of the plurality of item generating options is available.

The at least one processor may be configured to cause the display to display information indicating which one or more resources required by the selected one of the plurality of item generating options is unavailable.

The user interface may be configured to receive user input to subsequently select the one of the plurality of different item generating options of the computer implemented game and the at least one processor is configured to determine in response to the received user input that the one or more resources required by the one of the plurality of item generating options are available and in response to user input cause one or more items associated with the selected one of the plurality of item generating options to be provided.

A plurality of sets of item generating options may be provided, each set comprising a plurality of different item generating options.

The user interface may be configured to receive user input selecting one of the sets of item generating options.

The computer implemented game may comprise a plurality of enemy options and in response to selection of one of the plurality of enemy options, the at least one processor may be configured to cause the display to display a user selectable option which when selected causes the plurality of different item generating options of the computer implemented game to be displayed on the display.

According to another aspect, there is provided a computer implemented method provided by a computer device configured to provide a computer implemented game, the method comprising: displaying by a display of the computer device a plurality of different item generating options of the computer implemented game; receiving user input via a user interface of the computer device to select one of the plurality of different item generating options of the computer implemented game; determining by at least one processor of the computer device that one or more resources required by the selected one of the plurality of item generating options to generate a respective item are unavailable; and determining by the at least one processor which one or more of a plurality of collection runs has one or more of the unavailable resources.

The method may comprise causing by the at least one processor information about one or more collection runs of the computer implemented game to be displayed on the display.

The method may comprise causing by the at least one processor information about one or more collection runs of the computer implemented game having one or more of the unavailable resources to be displayed on the display.

The method may comprise causing by the at least one processor information only about one or more collection runs of the computer implemented game having one or more of the unavailable resources to be displayed on the display.

The method may comprise causing by the at least one processor information about one or more collection runs of the computer implemented game to be displayed, the information indicating for a respective collection run resources which are available for collection in the collection run.

The method may comprise causing by the at least one processor information about one or more collection runs of the computer implemented game to be displayed, the information indicating for a respective collection run if that collection run has one or more of the unavailable resources available for collection.

The method may comprise causing by the at least one processor information to be displayed on the display indicating which collection run provides one or more of resources which are not available for the selected item generating option.

The method may comprise receiving via the user interface an input selecting one of plurality of collection runs and in response, causing by the at least one processor the display to display the selected collection run.

The method may comprise determining by the at least one processor which one or more of the plurality of different item generating options of the computer implemented game are currently available for selection.

The method may comprise displaying by the display information indicating which one or more of the plurality of different item generating options of the computer implemented game are currently available for selection.

The method may comprise determining by the at least one processor which one or more of the plurality of collection runs of the computer implemented game are currently available for selection.

The method may comprise causing by the at least one processor information about availability for selection of one or more collection to be displayed by the display.

The method may comprise providing by the at least one processor information about one or more collection run options in which the respective unavailable resources can be collected in response to selection of a collection run option received via the user interface.

The method may comprise causing by the at least one processor the display to display information indicating which one or more resources required by the selected one of the plurality of item generating options is available.

The method may comprise causing by the at least one processor the display to display information indicating which one or more resources required by the selected one of the plurality of item generating options is unavailable.

The method may comprise receiving via the user interface user input to subsequently select the one of the plurality of different item generating options of the computer implemented game, determining by the at least one processor in response to the received user input that the one or more resources required by the one of the plurality of item generating options are available and in response to user input received via the interface causing one or more items associated with the selected one of the plurality of item generating options to be provided.

A plurality of sets of item generating options may be provided, each set comprising a plurality of different item generating options.

The user interface may be configured to receive user input selecting one of the sets of item generating options.

The computer implemented game may comprise a plurality of enemy options and the method comprises in response to selection of one of the plurality of enemy options via the user interface, causing by the at least one processor to display on the display a user selectable option which when selected causes the plurality of different item generating options of the computer implemented game to be displayed on the display.

According to an aspect, there is provided a computer device configured to provide a computer implemented game, the computer device comprising: a display configured to display one or more item generating options of the computer implemented game; a user interface configured to receive user input to select one of the one or more item generating options of the computer implemented game; at least one processor configured to determine if one or more resources required by the selected item generating option to generate a respective item are available, wherein the at least one processor is further configured to provide information about one or more collection runs of the computer implemented game in which resources can be collected and in response to user input received by the user interface selecting one of the one or more collection runs, the at least one processor is configured to cause the display to display the selected one of the one or more collection runs.

One or more item generating option may be associated with a timer, the timer controlling when the respective item is generated.

The at least one processor may be configured to start the timer in response to determining that the one or more resources required by the selected item generating option are available.

The at least one processor may be configured to start the timer in response to user input received via the user interface selecting an item generating option of the one or more item generating options when the one or more resources required by the selected item generating option are available.

The at least one processor may be configured to determine when the timer expires, and in response to provide the respective item.

The user interface may be configured to receive user input to control movement of a game entity in the selected one collection run of the computer implemented game, the display may be configured to display the game entity moving in response to the user input in the selected one collection run and at least one processor may be configured to determine in response to the received user input one or more resources collected by the movement of game entity in the collection run.

The display may be configured to display information indicating which one or more of the item generating options of the computer implemented game are currently available for selection.

The display may be configured to display information about one or more collection runs.

The information about one or more collection run may comprise information indicating which one or more resources are available for collection in the respective collection run.

The information about one or more collection run may comprise information indicating which collection run provides one or more of resources which are not available for the selected item generating option.

The information about one or more collection run may comprise information indicating if a collection run is available for selection.

The information about one or more collection run may comprise information about one or more collection runs in which the respective unavailable resources can be collected in response to selection of a collection run option received via the user interface.

The at least one processor may be configured to cause the display to display information indicating which one or more resources required by the selected one or more item generating options is available.

The at least one processor may be configured to cause the display to display information indicating which one or more resources required by the selected one or more item generating options is unavailable.

The at least one processor is configured to determine in response to the received user input that the one or more resources required by the selected one of the item generating options are available and in response to cause an item associated with the selected one of the item generating options to be provided.

A plurality of sets of item generating options may be provided, each set comprising a plurality of different item generating options.

According to another aspect, there is provided a computer implemented method provided by a computer device configured to provide a computer implemented game, the method comprising: displaying by a display of the computer device one or more item generating options of the computer implemented game; receiving user input via a user interface of the computer device to select one of the one or more item generating options of the computer implemented game; determining by at least one processor of the computer device if one or more resources required by the selected item generating option to generate a respective item are available; providing, by the least one processor, information about one or more collection runs of the computer implemented game in which resources can be collected; and causing, by the at least one processor in response to user input received by the user interface selecting one of the one or more collection runs, the display to display the selected one of the one or more collection runs.

One or more item generating option may be associated with a timer, the timer controlling when the respective item is generated.

The method may comprise starting by the at least one processor, the timer in response to determining that the one or more resources required by the selected item generating option are available.

The method may comprise starting by the at least one processor, the timer in response to user input received via the user interface selecting an item generating option of the one or more item generating options when the one or more resources required by the selected item generating option are available.

The method may comprise determining by the at least one processor, when the timer expires, and in response to provide the respective item.

The method may comprise receiving, via the user interface, user input to control movement of a game entity in the selected one collection run of the computer implemented game, displaying on the display the game entity moving in response to the user input in the selected one collection run and determining, by the at least one processor, in response to the received user input one or more resources collected by the movement of game entity in the collection run.

The method may comprise displaying, by the display information indicating which one or more of the item generating options of the computer implemented game are currently available for selection.

The method may comprise displaying, by the display information about one or more collection runs.

The information about one or more collection run may comprise information indicating which one or more resources are available for collection in the respective collection run.

The information about one or more collection run may comprise information indicating which collection run provides one or more of resources which are not available for the selected item generating option.

The information about one or more collection run may comprise information indicating if a collection run is available for selection.

The information about one or more collection run may comprise information about one or more collection runs in which the respective unavailable resources can be collected in response to selection of a collection run option received via the user interface.

The method may comprise causing, by the at least one processor, the display to display information indicating which one or more resources required by the selected one or more item generating options is available.

The method may comprise causing, by the at least one processor, the display to display information indicating which one or more resources required by the selected one or more item generating options is unavailable.

The method may comprise determining, by the at least one processor, in response to the received user input that the one or more resources required by the selected one of the item generating options are available and in response to cause an item associated with the selected one of the item generating options to be provided.

A plurality of sets of item generating options may be provided, each set comprising a plurality of different item generating options.

According to an aspect, there is provided a computer device configured to provide a computer implemented game, the computer device comprising: a display; at least one processor configured to cause the display to display a resource management part of the computer implemented game, the resource management part of the computer game providing one or more resources based on one or more items and to cause the display to display a runner part of the computer implemented game; a user interface configured to receive user input to control a movement of a game entity of the runner part of the game, wherein the at least one processor is configured to determine one or more items collected in response to the movement of the game entity, the one or more items being used in the resource management part of the game to provide one or more resources.

According to an aspect, there is provided a computer method provided by a computer device configured to provide a computer implemented game, the method comprising: causing, by at least one processor of the computer device, a display of the computer to display a resource management part of the computer implemented game, the resource management part of the computer game providing one or more resources based on one or more items and to cause the display to display a runner part of the computer implemented game; receiving, via a user interface of the computer device, user input to control a movement of a game entity of the runner part of the game; and determining, by the at least one processor, one or more items collected in response to the movement of the game entity, the one or more items being used in the resource management part of the game to provide one or more resources.

According to another aspect, there is provided a computer device configured to provide a computer implemented game, the computer device comprising: a user interface configured to receive user input to control movement of a game entity in the computer implemented game; at least one processor configured to use a first received user input which is associated with a default movement and information about an environment in the computer implemented game in which the game entity is moving to determine if the game entity is to move with the default movement or with a modified default movement; and a display configured to display the game entity moving with the movement determined by the at least one processor.

The at least one processor may be configured to modify the default movement to reduce a time for which the default movement is performed from a first length of time to a third length of time.

The at least one processor may be configured to modify the default movement to reduce a distance for which the default movement is performed from a first distance to a third distance.

According to another aspect, there is provided a computer device configured to provide a computer implemented game, the computer device comprising: a user interface configured to receive user input to control movement of a game entity in a collection run of the computer implemented game, the collection run comprising a plurality of different path options of which at least one path option is locked; a display configured to display the game entity moving in response to the user input along a path option of the plurality of path options of the collection run; at least one processor configured to determine that at least one locked path option is unlocked, and to cause the display to display information indicating for how long the respective locked path option is unlocked.

The at least one processor may be configured to cause the display to display information indicating when that unlocked path option is locked again.

The at least one processor is configured to determine that the at least one path option is unlocked in response to one or more user actions.

The user interface may be configured to received one or more user inputs via the user interface, the at least one processor being configured to determine in response to the one or more user inputs that the at least one path option is to be unlocked.

The at least one processor may be configured to provide, in response to the one or more user inputs received via the user interface, a key to unlock one or more locked path options The at least one processor may be configured to determine from the one or more user inputs received via the user interface, that a key to unlock the one or more path options is purchased from an in-game shop of the computer implemented game.

The at least one processor may be configured to determine from the one or more user inputs received via the user interface, that a key to unlock the one or more path options is obtained.

The at least one processor may be configured to start a timer when a respective locked path option is unlocked and when the timer expires, the at least one processor is configured to cause the respective path option to be locked again.

The at least one processor may be configured to cause the display to display a time as the information indicating when the path option will be locked again.

The at least one processor may be configured to cause the display to display a remaining time for which the respective path option will be unlocked as the information indicating when the path option will be locked again.

The at least one processor is configured to cause the game entity to collect resources as the game entity moves along the path options, wherein at least one type of resource is only available in the collection run by the game entity moving along the locked path option when unlocked.

The at least one processor is configured to cause the game entity to collect resources as the game entity moves along the path options, to determine that one or more resources on the respective locked path option have been collected when that path option is unlocked and in response to start one or more respective timers, whereby a respective resource is replenished when the respective timer has expired.

According to another aspect, there is provided a computer implemented method performed by a computer device configured to provide a computer implemented game, the method comprising: receiving, by a user interface of the computer device, user input to control movement of a game entity in a collection run of the computer implemented game, the collection run comprising a plurality of different path options of which at least one path option is locked; displaying, by a display of the computer device, the game entity moving in response to the user input along a path option of the plurality of path options of the collection run; determining, by at least one processor of the computer device, that at least one locked path option is unlocked; and causing, by the at least one processor, the display to display information indicating for how long the respective locked path option is unlocked.

The method may comprise causing, by the at least one processor, the display to display information indicating when that unlocked path option is locked again.

The method may comprise determining, by the at least one processor, that the at least one path option is unlocked in response to one or more user actions.

The method may comprise receiving, via the user interface, one or more user inputs via the user interface, and determining, by the at least one processor, in response to the one or more user inputs that the at least one path option is to be unlocked.

The method may comprise providing, by the at least one processor, in response to the one or more user inputs received via the user interface, a key to unlock one or more locked path options The method may comprise determining, by the at least one processor, from the one or more user inputs received via the user interface, that a key to unlock the one or more path options is purchased from an in-game shop of the computer implemented game.

The method may comprise determining, by the at least one processor, from the one or more user inputs received via the user interface, that a key to unlock the one or more path options is obtained.

The method may comprise starting, by the at least one processor, a timer when a respective locked path option is unlocked and when the timer expires, causing the respective path option to be locked again.

The method may comprise causing, by the at least one processor, the display to display a time as the information indicating when the path option will be locked again.

The method may comprise causing, by the at least one processor, the display to display a remaining time for which the respective path option will be unlocked as the information indicating when the path option will be locked again.

The method may comprise causing, by the at least one processor, the game entity to collect resources as the game entity moves along the path options, wherein at least one type of resource is only available in the collection run by the game entity moving along the locked path option when unlocked.

The method may comprise causing, by the at least one processor, the game entity to collect resources as the game entity moves along the path options, determining that one or more resources on the respective locked path option have been collected when that path option is unlocked and in response starting one or more respective timers, whereby a respective resource is replenished when the respective timer has expired.

According to another aspect, there is provided a computer device configured to provide a computer implemented game, the computer device comprising: a user interface configured to receive user input to control movement of a game entity in a collection run of the computer implemented game, a plurality of different types of resource being available for collection; a display configured to display the game entity moving in response to the user input in the collection run of the computer implemented game; and at least one processor configured to determine, in response to the received user input, one or more resources collected by the movement of game entity in the collection run, determine availability of one or more of the different types of resources, and cause the display to display information indicating the availability of one or more of the different types of resources.

One or more of the different resources may always be available in the collection run.

The at least one processor may be configured to provide for one or more of the different resources a respective predetermined number of resources in the collection run and when the respective one or more of that respective resource has been collected, that respective resource is replenished only after a respective predetermined time.

For one or more of the different resources a respective predetermined number of resources may be provided in the collection run and when the respective predetermined number of that respective resource has been collected, that respective resource may next be available for collection in the collection run only after a respective predetermined time.

For at least one of the different resources the respective predetermined number may be one.

The at least one processor may be configured to start a timer for a respective resource when the respective predetermined number of that resource has been collected.

The timer for the respective resource may be configured to expire at the respective predetermined time.

The at least one processor may be configured, when the timer of the respective resource has expired, to cause the respective resource to be available for collection in the collection run.

The information indicating the availability for the respective resource may comprise information indicating when the timer expires for that respective resource expires.

The information indicating the availability for the respective resource may be provided for one or more resources which are not currently available for collection in the collection run.

The information indicating the availability for the respective resource may indicate for a respective resource when that resource is next available.

The computer device may comprise a timer associated with a respective resource

The computer implemented game may comprise a plurality of different collection runs.

The display may be configured to display a plurality of options selectable by user input via the user interface, each option being associated with a different collection run and the at least one processor may be configured, responsive to user input received via the user interface to select one of the plurality of options associated with a respective collection run, to cause one or more screens to be displayed on the display associated with that respective collection run.

The at least one processor may be configured to cause the display to display information about a plurality of different collection runs, the information comprising an indication of the plurality of different resources collectable in the respective collection run.

The information about the plurality of different collection runs may comprise information indicating which of the plurality of different resources of a respective collection run are available for collection.

The information about the plurality of different collection runs may comprise information indicating which of the plurality of different resources of a respective collection run are not available for collection.

The information about the plurality of different collection runs may comprise for the one or more different resources which are not available for collection, information about when those one or more different resources will be available for collection.

The at least one processor may be configured to cause the display to display information indicating if a respective collection run is available for selection by a user.

According to another aspect, there is provided a computer implemented method performed by a computer device configured to provide a computer implemented game, the method comprising: a receiving, by a user interface of the computer device, user input to control movement of a game entity in a collection run of the computer implemented game, a plurality of different types of resource being available for collection; displaying, by a display of the computer device, the game entity moving in response to the user input in the collection run of the computer implemented game; determining, by at least one processor of the computer device, in response to the received user input, one or more resources collected by the movement of game entity in the collection run; determining, by at least one processor, availability of one or more of the different types of resources; and causing the display to display information indicating the availability of one or more of the different types of resources.

One or more of the different resources may always be available in the collection run.

The method may comprise providing, by the at least one processor, for one or more of the different resources a respective predetermined number of resources in the collection run and when the respective one or more of that respective resource has been collected, that respective resource is replenished only after a respective predetermined time.

For one or more of the different resources a respective predetermined number of resources may be provided in the collection run and when the respective predetermined number of that respective resource has been collected, that respective resource may next be available for collection in the collection run only after a respective predetermined time.

For at least one of the different resources the respective predetermined number may be one.

The method may comprise starting, by the at least one processor, a timer for a respective resource when the respective predetermined number of that resource has been collected.

The timer for the respective resource may be configured to expire at the respective predetermined time.

The method may comprise causing, by the at least one processor, when the timer of the respective resource has expired, the respective resource to be available for collection in the collection run.

The information indicating the availability for the respective resource may comprise information indicating when the timer expires for that respective resource expires.

The information indicating the availability for the respective resource may be provided for one or more resources which are not currently available for collection in the collection run.

The information indicating the availability for the respective resource may indicate for a respective resource when that resource is next available.

The computer implemented game may comprise a plurality of different collection runs.

The method may comprises displaying by the display a plurality of options selectable by user input via the user interface, each option being associated with a different collection run and causing, by the at least one processor, responsive to user input received via the user interface to select one of the plurality of options associated with a respective collection run, one or more screens to be displayed on the display associated with that respective collection run.

The method may comprise causing, by the at least one processor, the display to display information about a plurality of different collection runs, the information comprising an indication of the plurality of different resources collectable in the respective collection run.

The information about the plurality of different collection runs may comprise information indicating which of the plurality of different resources of a respective collection run are available for collection.

The information about the plurality of different collection runs may comprise information indicating which of the plurality of different resources of a respective collection run are not available for collection.

The information about the plurality of different collection runs may comprise for the one or more different resources which are not available for collection, information about when those one or more different resources will be available for collection.

The method may comprise causing, by the at least one processor, the display to display information indicating if a respective collection run is available for selection by a user.

According to another aspect, there is provided a non-transitory computer readable storage device storing instructions that, when executed by at least one processor of a computer device causes the at least one processor to provide the method of embodiments.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which:

FIG. 5 shows a second method for an embodiment of FIG. 2a;

FIG. 6a shows one screen for selecting an enemy to battle;

FIG. 6b shows another screen for selecting an enemy to battle;

FIGS. 27a to 27c show a battery making entity;

FIG. 30d shows a mission board at the base for missions or challenges;

FIG. 30e shows a dock at the base during a season;

FIG. 30f shows a dock at the base prior to the start of a season;

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement embodiments in a number of alternative variations.

Figure 1A:
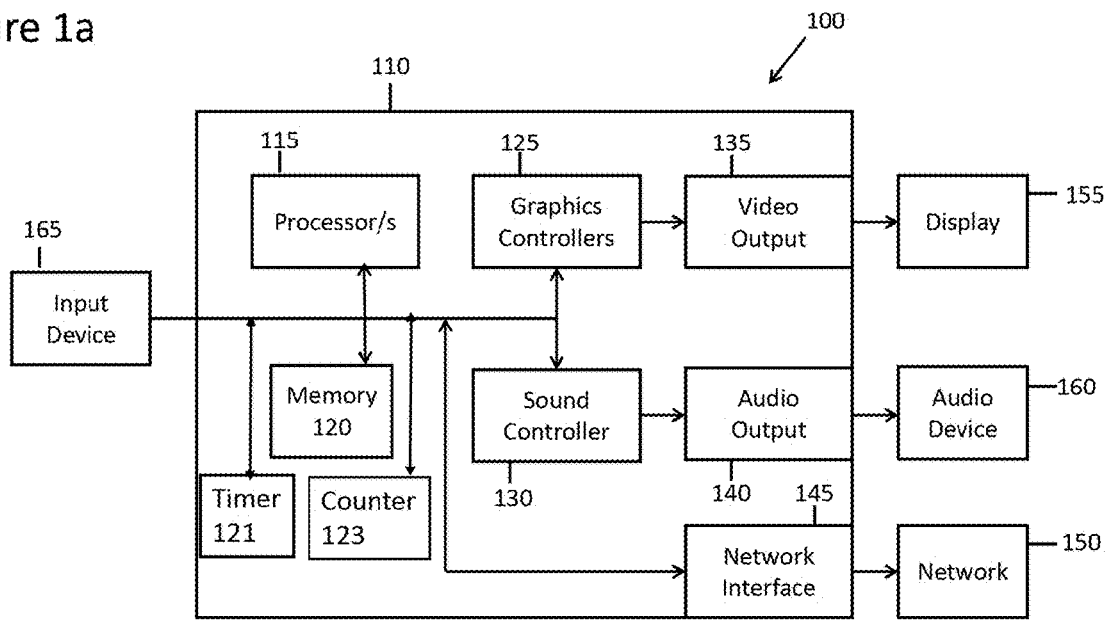
FIG. 1a shows an example user device in which some embodiments may be provided.

A schematic view of a user device 100 according to an embodiment is shown in FIG. 1a. The user device is a computer device. All of the blocks shown are implemented by suitable circuitry. The blocks may be implemented in hardware and/or software. The user device may have a control part 110.

The control part has at least one processor 115 and at least one memory 120.

The control part 110 is shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example. The input device may provide a user interface.

A timer 121 is provided. This may be a hardware timer or a software timer or provided by a combination of hardware and software. The timer may be provided at least partially by the at least one processor in some embodiments.

A counter 123 is provided. This may be a hardware counter or a software counter or provided by a combination of hardware and software. The counter may be provided at least partially by the at least one processor in some embodiments.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 1B:
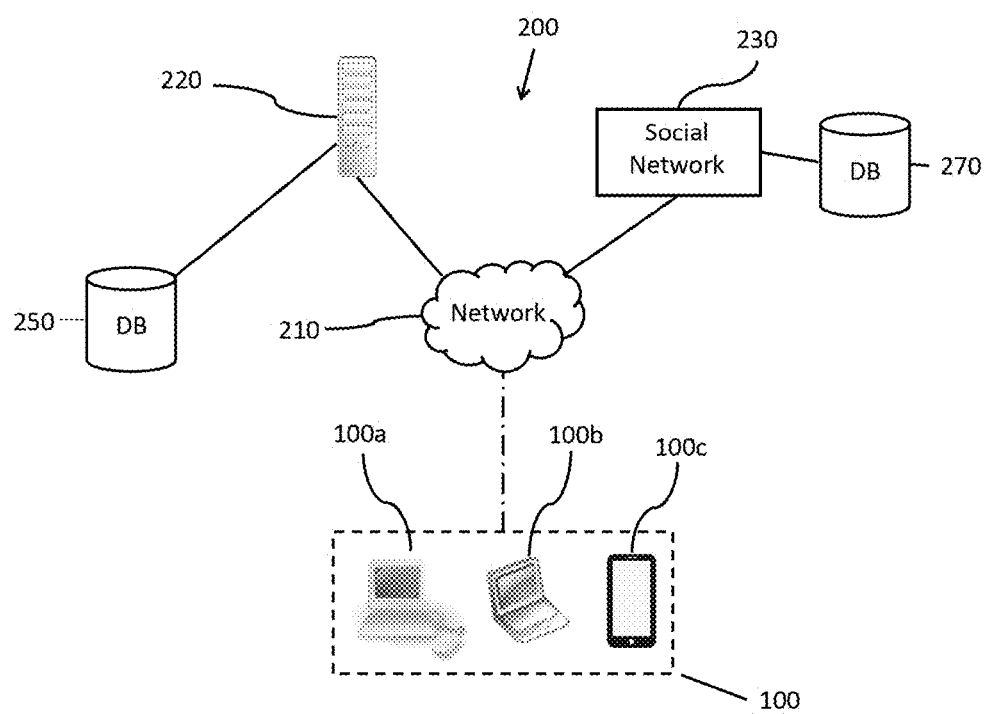
FIG. 1b shows an example system in which some embodiments may be provided.

FIG. 1b schematically shows a system 200 according to an embodiment. The system 200 comprises a server 220 which may store or be in communication with a database 250 which may store game player's details, profiles, statistics etc. In practice, one or more databases 250 may be provided. Where more than one server 220 is provided, the database(s) 250 may be provided in one server 220 or across two or more servers or as one or more separate entities. The server 220 may have a games data function. This may comprise one or more units of memory to store for example the computer game program and optionally user behaviour data and at least one processor to run the games program and optionally process the user behaviour data.

The server 220 may communicate via, for instance, the internet 210 with one or more client or user devices 100, such as the user device 100 shown in FIG. 1a by way of example. The server 220 may communicate with one or more social networks 230, for example, Facebook™. The communication may be via the Internet or via any other suitable communications link or network. The social network 230 may be connected to one or more databases 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the at least one memory of the user device and is run on the one or more processors of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the game server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may provide a computer implemented game as a stand-alone computer implemented game on the user device.

Some embodiments provide a computer device which is configured to provide a computer implemented game of the runner type or genre. Runner games are games where a player has control over a character that is constantly moving. Often the character or game entity will run or move along a path.

This runner type game may be played on a mobile computer device such as a smart phone or a tablet.

Some embodiments provide a resource management computer implemented game. A resource management game generally allows a player to obtain resources. The player will generally then be able to turn these resources into "higher level" products or resources. In resource management games, there may be a delay in providing of one or more of the resources and/or the turning of the resources into other resources. That delay may be controlled by a timer. A player may be able to speed up the timer in some embodiments.

In some embodiments, the resource management part of the computer implemented game may be a base. However, it should be appreciated that in other embodiments, the resource management part of the game may be provided by any other suitable game area.

Some embodiments provide a game which provides a runner game part to collect resources which can be used in a resource management game part. The resource management game part may turn those resources into items which can be used in the runner game part.

Figure 2A:
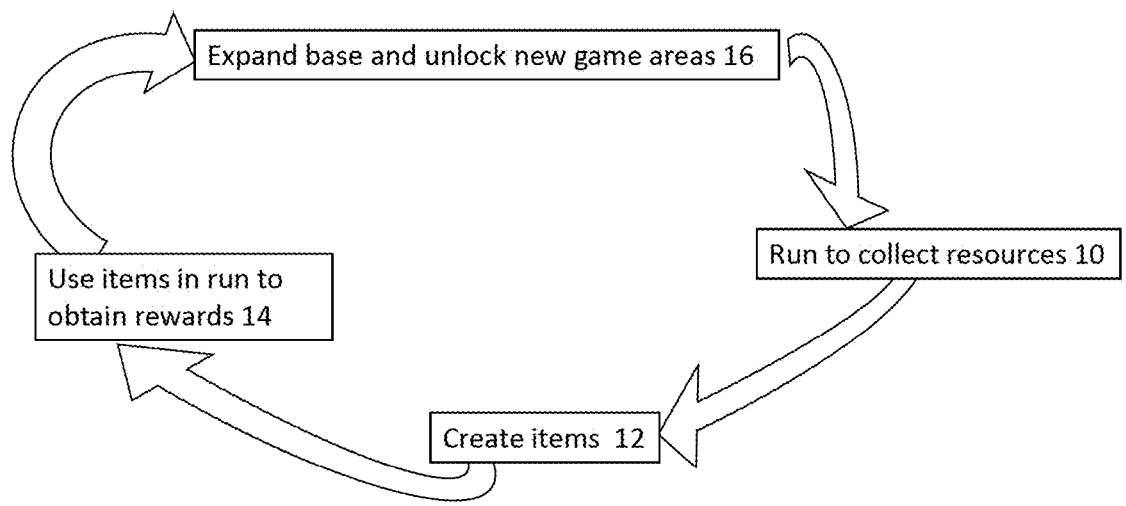
FIG. 2a schematically shows a computer implemented game of some embodiments.

Reference is made to FIG. 2a which shows schematically some embodiments. FIG. 2a schematically shows the different parts of a computer implemented game of some embodiments. The computer implemented game may have only one or more than one game area. The different game areas may be represented as different geographical areas or worlds. The different game areas may represent different parts of the game. For example, different game areas may be different islands or different cities or different countries or different continents or different planets or different universes and/or the like. Different game areas may provide different resource collection runs.

In some embodiments, the player is not able to access all the game areas initially. In some embodiments, there may be one or more criteria which need to be satisfied in order access a particular game area. One or more of the game areas may be locked.

In some embodiments, the at least on processor of the user device may be configured to allow a user to control a character displayed on the display via the user interface. The character may be controlled by the at least one processor in response to user input received via the user interface to perform a collection run. As the character moves through the run, the player is able to provide user input via the user interface which is used by the at least one processor to control the character to collect resources. This is referenced 10 in FIG. 2a.

One or more runs may be provided in a game area.

In some embodiments, there may be only a single type of resource available on a given collection run.

In other embodiments there may be a plurality of different types of resource available on a given run.

In some embodiments, different resources may be available in different parts of a run.

In some embodiments, the one or more resources which are available in a given run may be dependent on the game area in which the given run is provided.

In some embodiments, there may only be a single collection run option in a game area. The player may be able to control the character to perform that collection run repeatedly to collect the resources.

In some embodiments, there may be a plurality of different runs in a game area. In some embodiments, the resources which can be collected will be dependent on the run being performed.

These runs are configured to have an end point. Some examples of an end point of a run will be described later. When the at least one processor determines that a character successfully reaches the end point of the run, the at least one processor is configured to allow the player to use the collected resources. The player may provide user input via the user interface and in response the at least one processor may cause the collected resources to be used.

Alternatively or additionally there may be one or more addition or alternative criteria which is used by the at least one processor to determine if the collected resources are available for use by the at least one processor.

In one implementation of the game, these resources may be referred to as ingredients.

In some embodiments, the at least one processor may be configured to determine that a character controlled by the at least one processor in response to user input received via the user interface has lost a life when doing a collection run. The character may be provided with a limited number of lives or unlimited lives. The at least one processor may be configured to determine that a life has been lost when the character has run into an obstacle and/or encountered an unfriendly character and/or in any suitable way. The obstacle may be a certain type of obstacle. The at least one processor may be configured to determine that a life has been lost if the game entity is moving in a certain way when encountering a given object.

In some embodiments, one example of an unfriendly character may be a turtle or an enemy.

The at least one processor may be configured to determine that the character is to lose a life if the character runs into the unfriendly character. However, if for example, the at least one processor determines that the character is spinning or otherwise interacting with the unfriendly character, the at least one processor is configured to determine that the unfriendly character may be removed from the collection run or that one or more removable obstacles in the collection run path may be removed.

In some embodiments, a base is provided. The collection run may be such that the at least one processor causes the user to be automatically taken to the base at the end of a collection run. This may be the case for example where the at least one processor determines that the user has successfully completed a given collection run and has navigated to the end point of the collection run. It should be appreciated that there may be one or more alternative or additional ways of navigating between the collection run and the base.

In some embodiments the base may comprise one or more base entities which will be described in more detail later.

The at least one processor may be configured to cause one or more base entities to use one or more of the resources to create one or more items. This is referenced 12 in FIG. 2a. One or more base entities may be configured by the at least one processor to create one or more further items using one or more items, optionally also with one or more resources.

In some embodiments, the resources may be used to make items such as weapons and/or ammunition for weapons. However, this is by way of example only and in other embodiments, the resources may be used to make alternative or additional items.

The at least one processor may be configured to cause resources which are collected to be processed to provide items which can be used in battles against an enemy. The at least one processor may be configured to cause items to be created from the one or more resources in a base entity such as a lab.

Thus, in some embodiments, resources are collected in response to user input received via the user interface to control a character in a collection run or otherwise collected. The resources are used by the at least one processor to create weapons and/or ammunition which can be used to fight an enemy in a so-called battle run which will described further later. In some embodiments, different ammunition and/or different weapons are required for different enemies.

In some embodiments, the at least one processor may be configured to use resources to create an item. However, there may be time associated with the providing of a given item from the resources. For example, it may take 10 minutes to create a given weapon from the required resources. This is by way of example only, the time may be of the order of seconds, minutes, hours, days or even longer. Different items may be associated with different times, in some embodiments. In other embodiments, the time may be the same regardless of the item being made.

The at least one processor may be configured to start a timer when user input is received via the user input. This user input may be configured to select an item creating option which is displayed on the display.

The timer may be used to control the timing of the providing of an item. For example, the at least one processor is configured to provide the item when the timer has expired. This will be described in more detail later.

In some embodiments, the at least one processor is configured such that the user is only able to use the collected resources which are collected in that run if the at least one processor determines that the run has been successfully completed.

In some embodiments, the user is able to provide user input via the user interface and in response the at least one processor is configured to pause a run, in order to allow the collected resources to be used.

In some embodiments, the at least one processor is configured such that the user is able to use the collected resource after a run has attempted and failed.

In some embodiments, one or more other criteria may need to be satisfied in order for the at least one processor to determine that the user is to have the opportunity to use the resources.

In some embodiments, the items may be used in one or more battle runs to obtain rewards. This is referenced 14 in the embodiment of FIG. 2*a*. A battle run is associated with an enemy. This may be different to the collection runs discussed in relation to reference 10. For example, a battle run may be associated with a specific enemy which can be defeated with an item such as a weapon and/or ammunition which have been made from the collected resources. In some embodiments, there may be a specific item such as a weapon and/or ammunition required to defeat a specific enemy.

In some embodiments a battle run may be associated with one enemy. In other embodiments a battle run may be associated with one more enemy.

In some embodiments, the player is able to collect resources when doing this battle run. These resources may be the same and/or different as the resources which may be collected when the player does a collection run.

If the player defeats the enemy, the player may earn one or more rewards. In some embodiments, a victory against the enemy will provide one or more power gem resource.

In some embodiments, the at least one processor may be configured to provide one or of the game areas with one or more game enemies. A game enemy may be a game boss. In some embodiments, there may be different game enemies in different game environments. Different ones of the game enemies may require one or more different items in order to be defeated.

The game enemy may be provided at the end of a battle run. The game enemy may use one or more weapons against the character. The game enemy may direct shots or other ammunition against the character. The character may need to use one or more items and/or objects against the enemy. The character may gain rewards by defeating that enemy.

In some embodiments, in order to upgrade, make or unlock one more base entities, the at least one processor may require one or more rewards acquired as a result of defeating one or more enemies.

The rewards and/or one or more items and/or one or more resources may be used to modify a base and/or unlock new game areas. This is referenced 16 in FIG. 2*a*.

In some embodiments, the resources and/or items and/or rewards acquired by defeating a game enemy may be used to create and/or upgrade and/or unlock one or more parts of the base and/or base entities of the base.

In some embodiments, one or more rewards and/or one or more items and/or one or more resources may be used to unlock one or more new collections runs and/or one or more locked paths in a collection run.

During a run, the at least one processor may be configured to determine that the character controlled by the user may "die". This may mean the character is unable to continue with that run. In some embodiments, the at least one processor may be configured to cause a message to be displayed on the display asking if the player want to quit the run or continue with the run. This may be the case with collection runs and/or battle runs.

Where the player selects the option to continue with the game, the at least one processor may be configured to cause the collection run to restart from the beginning. In some embodiments, a run may be provided with one or more waypoints. If the character has passed a waypoint before the character dies, the at least one processor may be configured to cause character to restart the collection run from the respective waypoint.

In some embodiments, in order to continue with the run, this may require the payment of in game currency, the watching of an advertisement, the satisfying of one or more game criteria and/or the use of one or more of one or more resource, one or more items and one or more reward items.

The player may or may not retain the items which were selected prior to the character dying.

In some embodiments, the player may retain the resources collected prior to the passing of a waypoint, even if the character dies after that waypoint.

In some embodiments, if the player selects the quit option, the player will lose any resources which the player previously collected in that run.

In some embodiments, where the player replays at least a part of a run, the at least one processor may be configured such that the player may not collect the corresponding resource that the player collected when previously playing that run. In some embodiments, when at least a part of the run is replayed, the at least one processor may be configured such that any previously collected resource may not be displayed.

In some embodiments, where the player replays at least a part of the run, at least one processor may be configured such that the player may be able to collect the corresponding resource that the player collected when previously playing that run.

Figure 5:
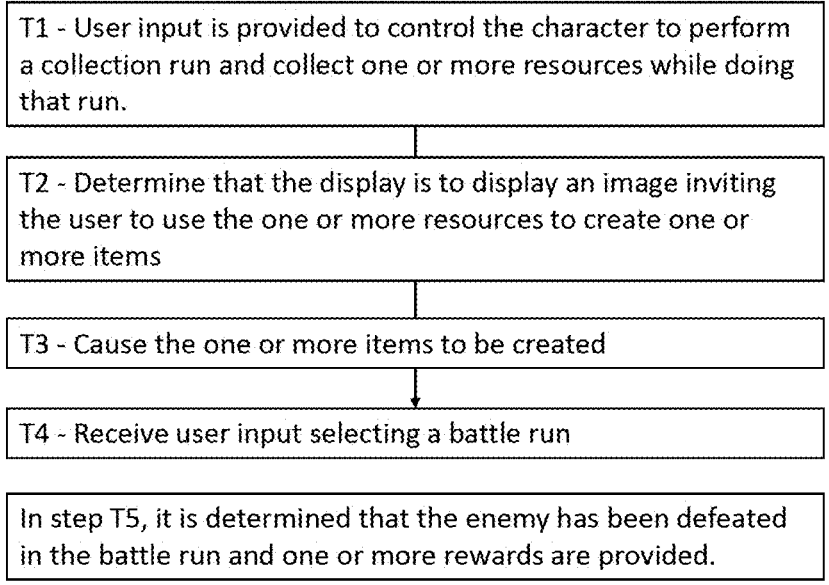

Reference is made to FIG. 5 which shows a method of some embodiments. This may be for the embodiments outlined in relation to FIG. 2a.

In step T1, user input received via the user interface is provided to control the character to perform a run and collect one or more resources while doing that run. The run may be completed or otherwise ended. This may be a collection run, such as previously discussed.

In step T2, the at least one processor is configured to determine that the display is to display one or more screens inviting or allowing the user to use one or more resources to provide one or more items. This may be to make one or more items to use in a battle run. The items may be one or more of a weapon and ammunition.

In some embodiments, there may be a series of screens which are displayed. The screens which are displayed may be dependent on received user input. In some embodiments, one or more of the screens may be provided with one or more user selectable options which when selected will be used by the at least one processor to determine the next screen to be displayed.

The display inviting the user to use one or more resources to make one or more items may be displayed when the at least one processor has determined that a collection run has been completed or has ended. In response to determining that the run has been completed or ended, the at least one processor may determine that a screen inviting the user to use the one or more resources is to be displayed automatically.

Alternatively, the at least one processor may determine that a screen inviting the user to use the one or more resources is displayed in response to a user input selecting an associated base entity such as a lab.

It should be appreciated that in some embodiments, one or more items and/or one or more rewards may alternatively or additionally be used to make the one or more items.

In step T3, the at least one processor is configured to cause the one or more items to be created from the one or more resources and/or one or more items and/or one or more rewards. The one or more items which are created will be in response to user input associated with the one or more screens of step T2.

In step T4, the at least one processor is configured to receive user input selecting a battle run option. The user may use one or more of the items created in step T3 against the enemy of the battle run in order to defeat the enemy.

In step T5, it is determined by the at least one processor that the enemy has been defeated in the battle run and one or more rewards are provided. As mentioned previously, the rewards may be used to for example to upgrade the base.

Figure 2B:
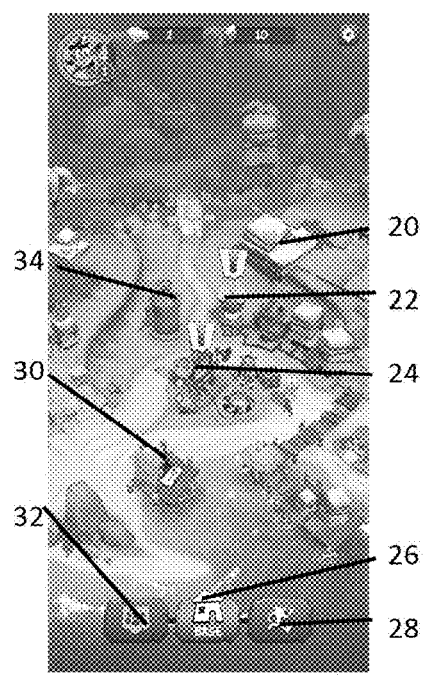
FIG. 2b shows a base of some embodiments.

Reference is made to FIG. 2b which shows an example of a base. The screen shown in FIG. 2b has three user selectable navigation options. The navigation options are selectable via user input received via the user interface. These options are one example of how game navigation may be achieved. These navigation options may be regarded as buttons which can be selected by user input received via the user interface. The at least one processor is configured to control which screen is displayed on the display in response to user input selection one of the navigation options.

The first user selectable navigation option 32 when selected will take a user to a clan view. The user may belong to one or more clans or teams. This will be described in more detail later.

The second user selectable navigation option 26 is a base option, which when selected causes the screen shown in FIG. 2b to be displayed.

Figure 8:
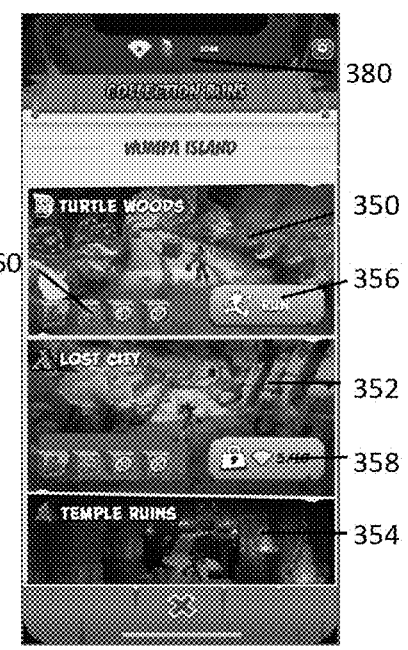
FIG. 8 shows a screen showing a plurality of different run options.

The third user selectable area 28 is a run option, which when selected causes the user to be provided with a collection run screen such as shown in FIG. 8. This will be described in more detail later.

Alternatively or additionally, navigation may be achieved by swiping between screens. An example of this will be described in more detail later.

The base will now be described in more detail. In some embodiments, there may be a single base. In other embodiments, there may be more than one base. In those embodiments, where more than one base is provided, different bases may be associated with different game areas.

The base has various different base entities. The base entities may take any suitable form. For example, a base entity may be a building, a structure, an area and/or any other suitable entity.

It should be appreciated that a base entity may be upgraded in some embodiments.

In some embodiments, a base entity may be unlocked.

In some embodiments, a base entity may be created.

By way of example, the at least one processor may be configured such than an entity may be one or more of created, unlocked, and upgraded using one or more collected resources, one or more items and/or one or more rewards and/or in game currency. Different base entities may have different requirements for one or more resources and/or one or more different items and/or one or rewards and/or in game currency.

By way of example, one or more different base entities will now be described. However, this is by way of example only and one or more of these described base entities may not be provided. In some embodiments, alternatively or additionally one or more different base entities may be provided.

One example of a base entity is a shop 30. This is discussed in more detail later. It should be noted that the shop has yet to be unlocked in the screen shown in FIG. 2b and as such the at least one processor is configured to cause the shop to be displayed in a visually distinct way as compared to when the shop is unlocked The user may be able to purchase one or more purchasable items. The purchasable items may be items which may be only purchased in the shop. Alternatively or additionally, the user may be able to purchase one or more resources from the shop. Alternatively or additionally, the user may be able to purchase one or more of the items which can also be made.

The base entity referenced 22 is in this embodiment a lab which is used to make an item in the form of a serum from collected resources. This is described in more detail later.

The base entity referenced 34 is in this embodiment a silo which contains various items and/or resources of the user. This is described in more detail later.

The base entity referenced 24 in this embodiment allows the user to select an enemy to battle. This is described in more detail later.

In some embodiments, there may be a single base.

In other embodiments, there may be more than one base. A base may be associated with a game area. In some embodiments, there may be one base per game area. In other embodiments, there may be more than one base associated with a game area.

Figure 26:
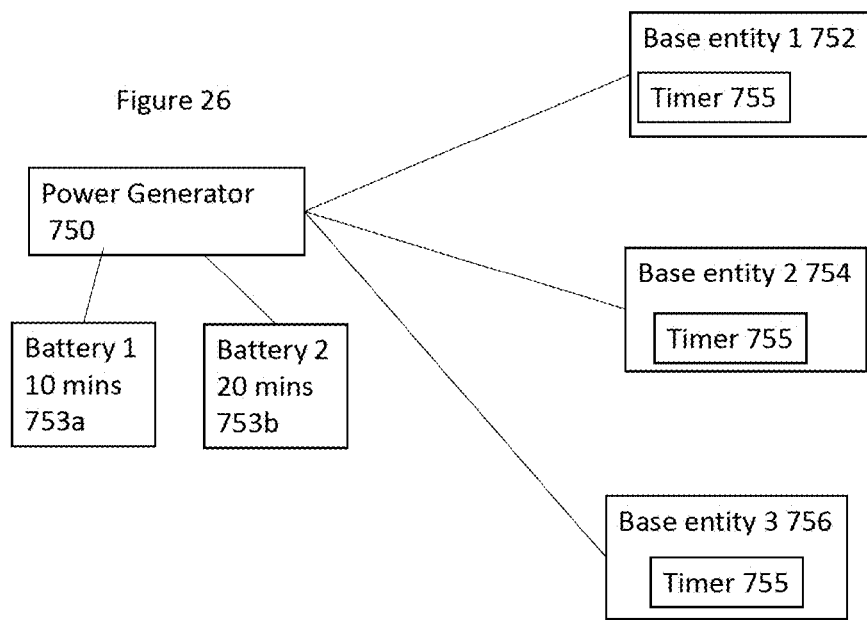
FIG. 26 shows a power source arrangement used to provide power to a plurality of different base entities.

Reference is made to FIG. 26. A power source 750 may be provided. The power source may be a power generator. In some embodiments, this power generator may be provided by a base entity.

In some embodiments, the user may be able to select via the user input received via the user interface one or more base entities to be connected to the power source 750. In response to the user input, the at least one processor is configured to cause the selected one or more base entities to be selected to the power source 750.

In the example shown in FIG. 26, first to third base entities 752 to 756 are shown connected to the power source. This is by way of example only and more or less than three base entities may be connected to the power generator at a given time. The user may be able to provide user input and in response to the user input, the at least one processor can change the number of base entities connected to the power generator at a given time. There may or may not be a maximum number of base entities which can be connected to the power generator at a given time. The user may be able to provide user input and in response to the user input, the at least one processor can change which base entities which are connected to the power generator.

In some embodiments, a base entity which is connectable to the power generator may be associated with the creating of one or more items. As mentioned previously, a respective timer may be associated with the creation of the one or more items. A given base entity may be able to create one or more items at the same time. In some embodiments, different timings may be associated with different items. Each base entity is thus provided with a timer function 755. The timer function is configured to control the time taken to create one or more of the respective items. The timer function may provide one or more different timers. As discussed elsewhere in this document, the at least one processor may be configured to cause the display to display time information for an item which is being created. This time information may be the remaining amount of time before the item is created. This may be controlled by the respective timer.

The at least one processor may be configured to control the one or more timer functions.

In some embodiments, the power generator may be connected to one or one or more batteries 753a and 753b. In some embodiments, the batteries may be made from one or more resources and/or one or more items. There may or may not be a maximum number of batteries connectable to the power generator at a given time.

A respective battery may be associated with a given amount of time. When the battery is connected to the power generator in response to user input, the remaining time for one or more items being created in one or more base entities which are currently connected to the power generator is reduced by that amount of time. In some embodiments, the timer for at least one or more or all of the items in each of the connected base entities is reduced by the given amount of time or completed if less than the given amount of time is remaining on the respective timer.

Consider the example shown in FIG. 26. Battery 1 753a is associated with a time of 10 minutes. When just battery 1 753a is connected to the power generator, the remaining time for any item currently being created is reduced by 10 minutes. If the time remaining for a given item is less than 10 minutes, then the creation of the item is completed. If the time remaining for a given item is more than 10 minutes, then the remaining time is reduced by 10 minutes. The at least one processor may update a respective timer for a particular item and cause the updated remaining time to be displayed for that particular item.

As shown in FIG. 26, a second battery is provided, battery 2 753b. This battery is associated with a time of 20 minutes. On its own, this battery will reduce the remaining time for an item to be created by 20 minutes.

When both the first battery and the second battery are connected to the power generator, then the remaining time will be cumulatively reduced by 30 minutes.

It should be appreciated that in some embodiments, the batteries may be associated with a same amount of time. In other embodiments, such as shown in FIG. 26 different batteries may be associated with different amounts of time.

In some embodiments, a battery item may be created (or recharged) and added to the power generator.

In some embodiments, the battery may be created or recharged by one or more other base entities and/or purchased using in game currency.

In some embodiments, a battery may be created or recharged from surplus resources stored in the silo. The silo may therefore need to be filled to at least a minimum level before resources can be used to create or recharge a battery.

The number of resources used to create and/or recharge the battery may determine the number of minutes by which a timer is reduced. A larger number of resources may be required to be provide a battery with a greater reduction in time. A smaller number of resources may be required to be provide a battery with a smaller reduction in time. A longer time may be required to create a battery and/or recharge a battery which provides a greater reduction in time as compared to a battery which provides a shorter reduction in time.

Reference is made to FIGS. 27a to *c* which shows three screens with a base entity 760 for making batteries which are caused by the at least one processor to be displayed on the display. Each screen shows a scale 762. The scale will indicate if there are enough resources to make a battery and if so the size of the battery.

In the example shown in FIG. 27a, the at least one processor has determined that there are not enough resources to make any size of battery and accordingly controls the user interface and the display such that the user selectable option button 764 which allows a battery to be made is available but not selectable.

In the example shown in FIG. 27b, the at least one processor has determined that there are enough resources to the smallest size of battery (associated with the shortest time reduction) and accordingly controls the user interface and the display such that the user selectable option button 764 which allows a battery to be made is available. If selected, this allows the user to make that smallest size of battery.

In the example shown in FIG. 27c, the at least one processor has determined that there are enough resources to the largest size of battery (associated with the greatest time reduction) and accordingly controls the user interface and the display such that the user selectable option button 764 which allows a battery to be made is available. If selected, this allows the user to make that largest size of battery.

In some embodiments, the at least one processor may be configured to be a battery to be emptied or depleted once the time of at least one item has been reduced or the creating of the item has been completed. In other embodiments, a given battery may be used up to m times. m may be the same for all batteries or different.

In some embodiments, the more entities that are connected to the power source, the quicker that a battery used up.

In some embodiments, there may be a finite amount of power from a battery which may be shared between the entities. The power may be shared equally or unequally between the entities.

It should be appreciated that different base entities may require different powers.

Different base entities may require different rates of power.

In some embodiments, the at least one processor is configured to cause the amount of power that the power source currently has to be displayed on the display.

In some embodiments, a character runs along a path of a run. This run may be a collection run and/or a battle run The character is controlled by the at least one processor in response to input provided by a user via the user interface. In some embodiments, the path may comprise one or more lanes which are caused by the at least one processor to be displayed on the display. In the example shown in FIG. 3, there are three lanes 300 shown. However, it should be appreciated that this is by way of example only and more or less than three lanes may be provided.

In some embodiments, the number of lanes provided may vary during the game. For example, the number of lanes may be reduced so as to be less than three or increased so as to be greater than three. One or more of the lanes may be at a different level to one or more other lanes.

Figure 3:
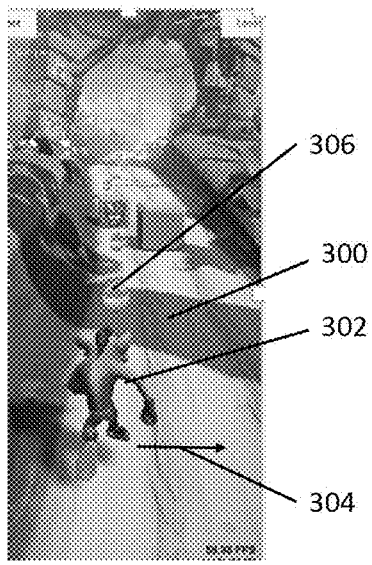
FIG. 3 shows a game screen for a character in a runner game with three lanes.

In the example shown in FIG. 3, a character 302 is controlled by the at least one processor in response to user input via the user interface to run along the lanes. As mentioned, in some embodiments, the user interface may be a touch screen display which is the same as the display on which the game area is displayed.

In some embodiments, the character 302 will run along a lane under the control of at least one processor. The user input which is received via the user interface is used to control which lane the character is running in. For example, as shown in FIG. 3, the character 300 is currently running in the far left lane 302. A user input in a form a swipe to the right, represented by arrow 304 will cause the character to move into the middle lane.

In some embodiments, the at least one processor is configured in response a user input providing a swipe to the right to move the character by one lane only. A further swipe to the right will be required to cause the character to move to the far right lane.

Conversely, when the character is in the middle lane or the far right lane, a swipe to the left will cause the character to move one lane to the left.

The at least one processor may to configured to determine that a character has collected a resource by running through it. One or more resources may be provided in an object. Interacting with the object may cause the resource to be collected. The object may be for example a crate or other container. In some embodiments, the object may be regarded as being an obstacle.

It should be appreciated that the at least one processor may be configured to cause one or different actions to be performed by the character in dependence on the input received from the user via the user interface.

Swiping left and right may control the character as previously described.

The at least one processor may be configured to control the character to move alone a lane. The user input is used by the at least one processor to control how the character moves and/or the path taken and/or in which lane the character runs.

For example, the character may be controlled by a tap or similar user input with respect to the user interface in order to spin. A spinning action with respect to an object may cause the object to be removed and the associated resource or resources to be collected. Alternatively or additionally, a spinning action may remove one or more obstacles.

The character may be controlled by user input received via the user interface to jump. This user input may be in the form of a swipe up.

The character may be controlled by user input received via the user interface to slide. This user input may be in the form of a swipe down.

In some embodiments, a swipe detector is provided by the at least one processor. The at least one processor is configured to determine how far the user's finger has travelled with respect to the user interface (touch screen) in a time period to determine if the user's input is a swipe. The time period may be set such a swipe action is determined even if the user moves his finger relatively slowly.

In some embodiments, the at least one processor is configured to determine from the user input as to the move to be made by the character even if the user does not lift their finger up between moves. For example, the user will make a series of moves without lifting his finger between moves. Each move may be in a given direction. The at least one processor is configured to analyse the received user input to determine a direction of the move, that is right, left, up or down. Depending on the determined direction, the character will be controlled to perform the corresponding action.

A timer may be used to distinguish between a single move in a given direction and say a second move in that same direction. If the move is for less than a first amount of time, then the input is considered to represent a single move in a direction and if the move is from more than the first amount of time then, the input is considered to represent two consecutive moves in the same direction. For example, this might be to control the character to do two jumps, one after the other or to cause the character to move across by two lanes.

In some embodiments, the user may be able to provide a combination of moves with a single input. For example, if the user moves his finger in a diagonal direction, a determination can be made as to the direction of the swipe and whether the character is to jump or slide. In this latter embodiment, thresholds for the diagonal movement may be set to allow an imperfect swipe (up, down, left, or right) to be distinguished from a combined movement input.

It should be appreciated that when the user's finger does not move, the character will continue to run as controlled by the at least one processor in the current lane.

Figure 4:
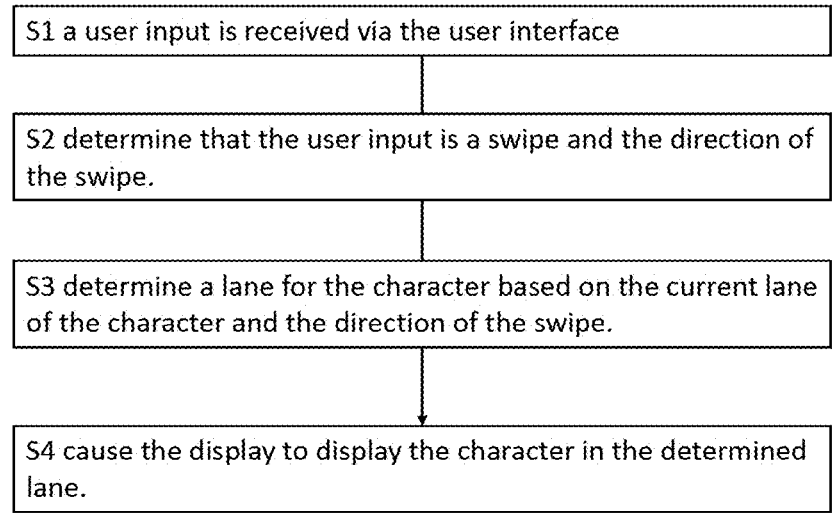
FIG. 4 shows a first method for controlling the movement of the character between lanes.

Reference is made to FIG. 4 which shows a method of some embodiments.

In step S1, a user input is received via the user interface. In some embodiments, this may be via a touch screen on which the game is displayed.

In step S2, the at least one processor of the user device is configured to determine that the user input is a swipe and the direction of the swipe. A user input may be considered to be a swipe when one or more swipe conditions are satisfied. The one or more swipe conditions may comprise that the user input has one or more of: lasted for at least a minimum length of time; moved a minimum distance; moved in a given direction; and has a component in a given direction. In this example method, the swipe is determined to be a swipe to a left or a swipe to the right.

In step S3, the at least one processor is configured to determine a lane for the character based on the current lane of the character and the direction of the swipe.

In step S4, the at least one processor is configured to cause the display to display the character in the determined lane.

In some embodiments, the location of the start of the swipe and the end of the swipe may be any location in the game area.

This may be advantageous when playing the game on a mobile device with a limited display area.

In alternative embodiments, the location of the start of the swipe should be in the current lane of the character and the end of the swipe should be in one of the adjacent lanes in order to move the character to an adjacent lane.

In alternative embodiments, the length of the swipe may be determined by the at least one processor. The length of the swipe may be used by the at least one processor to determine if the character is to move into an adjacent lane or into a lane which separated from the current lane by one or more other lanes.

As mentioned previously, as the character runs along the path of a run, the character is able to collect resources. In the example shown in FIG. 3, resources 306 are shown in the different lanes. As the character runs through a resource in a lane, the at least one processor is configured to determine that the resource is collected by the character.

In some embodiments, there resource may simply be provided in the various lanes. The user input may cause the at least one processor to move the character between the lanes in order to collect the resources.

Alternatively or additionally, one or more resources may be provided in an object. That object may be provided in one or more lanes. The character may be required to perform a particular action with respect to that object in order that the at least one processor determines that the one or more resources are collected. For example, the object may a crate. The user is required to provide a user input. In response to the user input, the at least one processor determines that the crate is smashed open in order to release the one or more resources in the crate.

In some embodiments, a user will be able to select a same run more than once. In some embodiments, if a give resource is collected during a run, that given resource may not be available for collection for at least a given time defined by a timer. This means that if the user selects the same run and the given time has not yet ended, the user will not be able to collect that given resource. Conversely, if the user selects the same run and the given time has ended, the user will be able to collect that given resource.

In some embodiments, some resources may be associated with a timer. In some embodiments some resources may not be associated with a timer.

In some embodiments, one or more resources provided in an object such as a crate may be associated with a timer.

Different resources may be associated with different timers having different lengths of time before that resource is available again.

The one or more timers are controlled by the at least one processor. A timer may be started by the at least one processor. This may for example be in response to determining that one or more given resources have been collected. In response to the expiry of the timer, the at least one processor is configured to cause one or more given resources to be available for collection.

Reference is made by way of example to FIG. 6a. In some embodiments, the screen of FIG. 6a may be displayed when a user selects an entity of a base. This may be the entity referenced 24 in FIG. 2b in some embodiments.

In FIG. 6a, the at least one processor is configured to cause a display to display a screen which shows the images or icons of a plurality of enemies 310a and b in a row. The respective enemy may be defeated or yet to be defeated. If the enemy is defeated, as referenced 310a, the user has successfully battled that enemy. If the enemy is not yet defeated, as referenced 310b, the user has yet to battle that enemy and/or has yet to defeat that enemy. The defeated and yet to be defeated enemies may be displayed in a visually distinct manner. For example, a defeated enemy may be indicated with a tick, enemy 310a in this example. The at least one processor is configured to determine for a given enemy if that enemy has yet to be defeated or has been defeated. In response to that determination, the at least one processor is configured to control the display to display information indicating if the enemy has yet to be defeated or defeated.

The user is able to select one of those enemies to battle by providing user input via the user interface. The user may only be able to select an enemy which has been undefeated in some embodiments. In other embodiments, the user is able to select any of the available enemies regardless of whether the enemy has been previously defeated or not.

In some embodiments, the user is able to select an enemy by clicking on one of the images or icons of the plurality of enemies. The selected enemy may be displayed in a visually distinct manner.

In some embodiments, the user may be required to defeat a number of lesser enemies before the user is able to battle a more powerful enemy or a so-called boss. That more powerful enemy may provide a greater reward when defeated and/or may be a harder enemy to defeat and/or may require additional items to defeat. A larger icon 312 of the more powerful enemy is also shown. This icon may indicate if the selected enemy is locked (and not yet available for battling). In this example, this is indicated by a padlock.

The at least one processor is configured to determine for a given enemy if that enemy is available to be battled or is not yet available for a battle. In response to that determination, the at least one processor is configured to control the display to display information indicating if the enemy is available to be battled or is not yet available for a battle.

The screen of FIG. 6a indicates the rewards 314 which are obtained by defeating the particular enemy. These rewards may be used for example to upgrade the base and/or otherwise used.

The screen of FIG. 6a also indicates the one or more items which are required in order to defeat that enemy. The at least one processor may be configured to determine whether or not the user has sufficient number and/or types of the items in order to be able to battle that enemy and to cause the display an indication indicating whether or not the user has sufficient number and/or types of the items in order to be able to battle that enemy. These items may be made or from collected resources and/or one or more other items as previously described.

The screen of FIG. 6a has a user selectable option area or button 320. In response to selection of the button 320 by user input received via the user interface the at least one processor will cause the display to display a game area which allows the user to provide user input make one or more items from the collected resources. In some embodiments, this is a laboratory. This may be the base entity referenced 22.

The screen of FIG. 6a has another user selectable option area or button 324 In response to selection of the button 324 by user input received via the user interface the at least one processor will cause the display to display screen where the user can select a collection run.

The screen of FIG. 6a has a third user selectable option area or button 322. In response to selection of the button 322 by user input received via the user interface the at least one processor will cause the display to display the battle run which allows the user to battle the selected enemy. It should be appreciated that this option area may only be selectable if the at least one processor determines that the selected enemy is unlocked, and that the user has the one or more items required to battle the selected enemy.

In some embodiments, the at least one processor will cause an enemy to be unlocked once a user has acquired sufficient items to battle that enemy.

Alternatively or additionally, the at least one processor will cause the enemy to be unlocked once one or more game related criteria or goals have been satisfied.

Reference is made to FIG. 6b which shows another example. In some embodiments, the screen of FIG. 6b may be displayed when the at least one processor determines that a user input received via the user interface selects structure 24 of the example base of FIG. 2b.

In FIG. 6b, the at least one processor is configured to display a screen which shows the images or icons of a plurality of enemies 310a' and b' surrounding a more powerful enemy 312'. The enemies referenced 310a' are ones which are available to be battled and the enemies referenced 310b' are not yet available to be battled. Enemies which have been defeated would be displayed in a visually distinct manner from those which are yet to be defeated. The more powerful enemy 312' again can only be battled once all the surrounding enemies 310a' and 310b' have been defeated. In this example, the enemy referenced 310a' on the left of the screen is selected in response to user input received via the user interface and may be displayed in a visually distinct manner.

The at least one processor is configured to determine for a given enemy if that enemy is available to be battled or is not yet available for a battle. In response to that determination, the at least one processor is configured to control the display to display information indicating if the enemy is available to be battled or is not yet available for a battle.

It should be appreciated that the battle runs may be dependent on a game area and/or a part of a game area. The battle runs may be provided in the same location as one or more collection runs. Unlocking a particular collection run may unlock a corresponding battle run. In other embodiments one or more other criteria may be alternatively or additionally required in order to unlock a battle run. The user may be permitted to provide user input via the user interface to select from a list of available battle runs. In response to selecting a particular battle run by user input received via the user interface, the at least one processor may cause the user to be presented on the display with the options to select a particular enemy to battle such as shown in FIG. 6a or 6b.

Figure 7A:
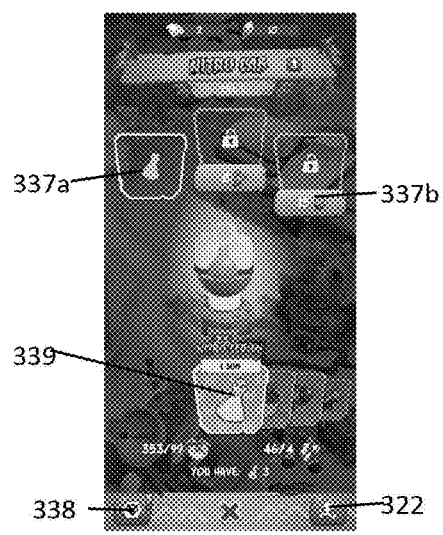
FIGS. 7a to 7c show first example screens for making an item from collected resources.
Figure 7B:
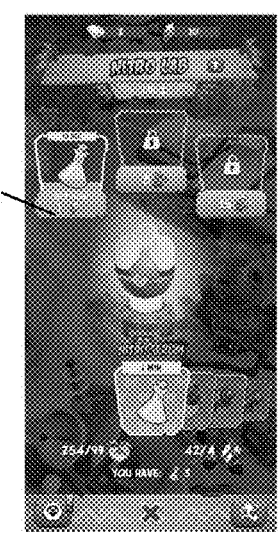
Figure 7C:
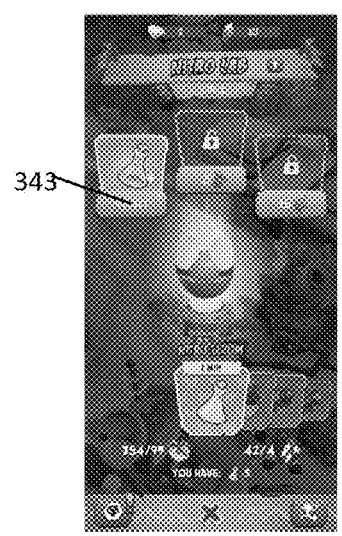

Reference is made to FIGS. 7a to c which shows an example of the screen which is displayed when the at least one processor determines that a user input received via the user interface selects a laboratory option, such as discussed in relation to FIG. 6a or 6b. The user can alternatively or additionally get to the laboratory option by providing a user input via the user interface to select structure 22 shown in FIG. 2b.

In this example, there are three options 337 displayed on the display. The first option 337a shows an available serum making option for making a particular type of serum. The second and third options 337b are for making different types of serum. In the example shown in FIGS. 7a to 7c, the user is not yet able to select either of the second and third options.

The options which are not available for selection by the user may be displayed in a visually distinct manner, for example with a lock.

The at least one processor is configured to determine for a given serum making option if that serum making option is available or not. In response to that determination, the at least one processor is configured to control the display to display information indicating if the serum making options is available or not.

The user may need to upgrade the laboratory and/or collect one or more resources or resource types and/or make one or more other items and/or defeat one or more enemies in order to be able to use one or more of the locked options and/or use one or more the rewards collected by defeating one or more enemies.

The screen has one or more serum to be made options 339 displayed. It should be appreciated that the user may be able to select via user input received via the user interface one of a plurality of different to be made options. One or more of the plurality of different to be made options may be unavailable to the user. Those plurality of different to be made options which are unavailable may be displayed in a different way to those which are available in some embodiments.

The at least one processor is configured to determine for a given serum to be made option is available for selection or not. In response to that determination, the at least one processor is configured to control the display to display information indicating if the serum to be made option is or is not yet available.

For a currently selected one of a plurality of different to be made options, the at least one processor is configured to cause the display to display an amount of time required to make the serum (1 minute in the option shown in FIGS. 7a to c). The at least one processor is configured to cause the display to display the resources required to make the serum and the number of those resources. The at least one processor is configured to cause the display to display an indication to the user if they have the required number of each resource. In the event that there are not enough of one or more of the required resources, the user may go on one or more collection runs.

To make a serum requires an available serum option to be selected by user input and to be dragged by the user input to the corresponding one of serum making options, as shown in FIG. 7b.

The at least one processor is configured to cause the display to display an option for the user to obtain the serum at once by using for example in-game currency. For example, the user may select a user selectable option area or button 341 in order to use in-game currency in order to obtain the selected serum immediately. This may be advantageous for those serums which take much longer than on minute to be obtained. Otherwise the at least one processor is configured to cause the serum to be provided at the end of the time period. The time period may be controlled by the timer. The at least one processor may be configured to start the timer when an available serum option is selected. The at least one processor may be configured to use the timer to update the time remaining until the serum is available. The updated remaining time may be displayed on the display.

As shown in FIG. 7c, at the end of the required time, the user is able to collect the serum by user input via the user interface selecting the user selectable option area or button 343.

In these screens, there is an area or button 338 which when selected by user input received via the user interface will cause the at least one processor to display the enemy selection screen. In the event that the selected item is available for use, the user may return to the screen shown in FIG. 6b for example.

As in the example shown in FIGS. 7a to c, there is an area or button 322 which when selected by user input received via the user interface cause the at least one processor to display a collection run option. In some embodiments, the user may select this option or button in order to do one or more collection runs in order to collect one or more missing resources.

Figure 7D:
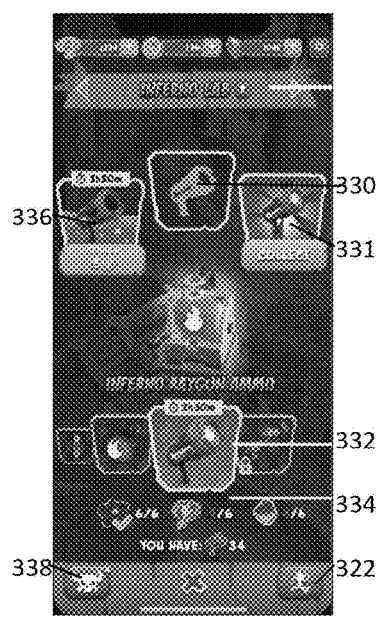
FIG. 7d shows a second example for making an item from collected resources.

FIG. 7d shows another example of a different lab. In some embodiments, this may be provided by a different base entity or lab of the base. This different base entity may need to be unlocked before it is usable. In some embodiments, this base entity may be an upgraded part of the same lab referenced 22 in FIG. 2b.

In this example lab, ammunition for a ray gun is being made. The ammunition is the item being made.

As with the arrangement shown in FIGS. 7a to 7c, there are three ammunition making options 336, 331, 330. The first ammunition making option 336 is in the process of making a first type of ammunition. This uses the same mechanism to activate or select this option as described in relation to FIGS. 7a to 7c. The user selects the corresponding ammunition to be made option 332 and dragged it to the respective ammunition making option 336.

In this example, the first type of ammunition is available after a given time period which is 2 hours and 30 minutes in this embodiment. Alternatively first type of ammunition can be purchased immediately using in game currency. In this example, 5 gold bars are required to purchase this item.

The second ammunition making option 330 is currently unused.

The third ammunition making option 331 has been used to make the third type of ammunition which is awaiting collection by the user. This ammunition may be collected in response to user input via the user interface.

As referenced 334 an ammunition option for a particular type of ammunition to be made is displayed along with information indicating which resources are required to make the item and the number of those resources which the user has currently collected.

In this screen, there is a user selectable option area or button 338 which when selected will take the user to the enemy selection screen, such as previously described.

There is a user selectable option area or button 322 which when selected will take the user to a collection run option such as previously described. In some embodiments, the user may select this option in order to do one or more runs in order to collect the missing resources.

Figure 7E:
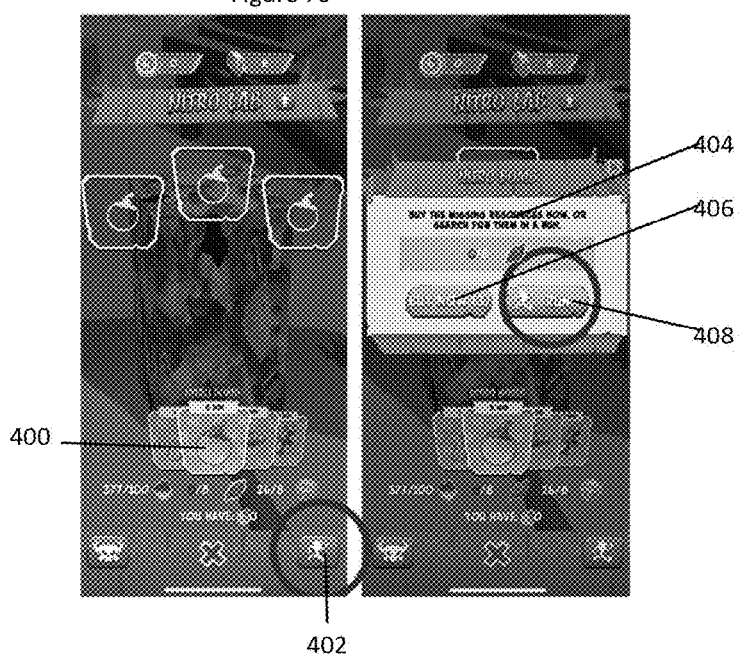
FIG. 7e shows a third example screens for making an item from collected resources.

Reference is made to FIG. 7e which shows another example of the lab used to make an item from one or more resources. This may the same or different to the labs shown in FIGS. 7a to 7d.

FIG. 7e shows two screens. In this example, the user wants to make an item 400 and has enough of two of the required resources. However, the user does not have enough of the third resource. When the user selects the user selectable option area or button 402 on the screen on the left to select the run option, the at least one processor is configured to take the user to a collection run option such as previously described.

On the screen on the right hand side, the user has attempted to make the item 400 and has dragged item 400 to the respective item making option. In this example, the at least one processor is configured to cause the display on the display of a message 404 with two user selectable option areas or buttons 406 and 408. The message 404 indicates the missing resources and provides the user with the two user selection option areas. The first user selectable option area or button 406, when selected allows the user to purchase the required items using in-game currency. The second user selectable option area or button 408, when selected allows the user to select a run option.

In some embodiments, the user may be presented with the message shown in FIG. 7e in response to one or more different actions. For example, selection of the user selectable option area or button 402 may cause the message to be displayed.

As mentioned previously, some embodiments may have a plurality of different game areas. Each game area may have one or more different collection runs. Reference is made to FIG. 8 which shows an example of a screen which the at least one processor causes the display to display to show a player his options for a collection run in a given game area or in the game. In this example, the game area is referred to as "Wumpa Island".

The screen may show a plurality of different collection run options 350, 352, 354. In this example, the collection run options are "Turtle Woods", "Lost city" and "Temple Runs". In some embodiments, one or more of the collection run options may comprise one or more individual collection run options.

A user selectable option area or button 356 with the word run may be selectable. In response to selection of that option area by user input received via the user interface, the at least one processor is configured to provide the user with that collection run. If user selectable option area or button is not selectable, as referenced 358, then the at least one processor may be configured to cause the display to display information in that area and/or elsewhere on that screen. The information may indicate to the user what that user is required to do to unlock that run.

In some embodiments, information is provided as to the resources that are collectable during a particular run. In the example shown in FIG. 8, the different resources that are collectable may be represented by respective icons on crates. In other embodiments, the resources which are collectable may be represented in any suitable way.

An area 380 on the screen shown in FIG. 8 may be provided for showing the gems that have been collected by a player. There may be different types of gems in some embodiment. This area may show which gems have been collected. The gems may in some embodiments be used to unlock a collection run.

In the arrangement of FIG. 8, the resources 360 which can be collected on a run are shown on crates.

Figure 9A:
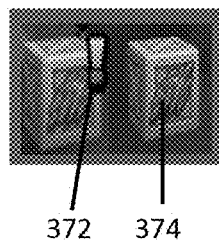
FIG. 9a shows an image indicating a resource which is specifically required to provide an item and an image indicating a resource which is not specifically required.

A crate may have an appearance of one of the crates of FIG. 9a. The crate 372 on the left is shown with an indication that the resource is required to complete an item. In this example the indication is provided by an exclamation mark. This is by way of example and other embodiments may use alterative indications. The crate 374 on the right does not have that indication. This would be the case where the resource is not required to complete a particular item.

The at least one processor may be configured to determine for one or more items, the one or more resources which are required to make the item and which are yet to be collected. This may be where the user has been attempting to make a particular item and has selected a collection run option. The at least one processor may be configured to cause information to be displayed for a given collection run if that collection run contains one or more resources that need to be collected. The indication may indicate which one of the resources are required. Optionally information on the number of resources available and/or the number of resources required may be displayed.

Thus, in the case in for example the scenario shown in FIG. 7e, the user is unable to make a particular item because he does not have enough of one of the resources. Selection of the user selectable option area or button 402 would cause the screen of FIG. 8 to be shown. The indication shown in FIG. 9a can be used to indicate to the user, on which of the collection runs the missing resource(s) can be collected.

Figure 9B:
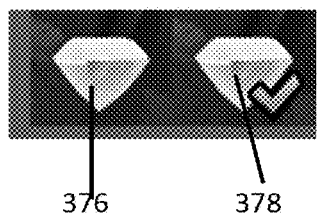
FIG. 9b shows an image indicating a gem which has been collected and an image indicating a gem to be collected.

In some embodiments, there may be currency type objects. In this example, those currency type objects are referred to as gems. In some embodiments, an indication may be provided for a given run as to whether gems are available and/or have been collected. In this regard, reference is made to FIG. 9b. The gem 378 on the right is shown with an indication that the gem has been collected. In this example the indication is provided by a tick. This is by way of example and other embodiments may use alterative indications. The crate 376 on the left does not have that indication. This would be the case where the gem has yet to be collected. This may be shown in association with one or more particular runs in FIG. 8.

Figure 10:
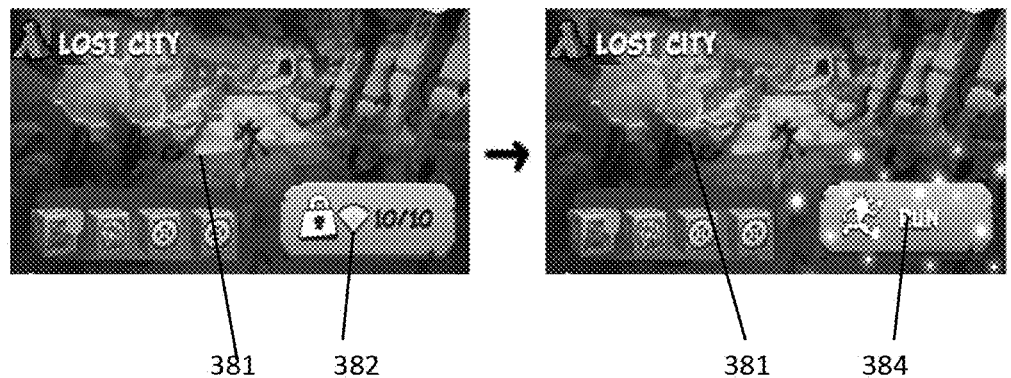
FIG. 10 shows a part of a game area which is locked becoming unlocked.

Reference is made to FIG. 10. The at least one processor is configured to cause the display to display information which indicates a part 381 of a game area which is initially locked in the left hand screen and unlocked in the right hand screen. In this example the part of the game area is the Lost City. The left hand screen has a part 382 of the screen which indicates that the area is locked and what is required to unlock that area. In this example, this area is just about to become unlocked. When the game area is locked, user input to select the part 382 will not cause the lost city runs to be accessed.

On the right hand screen, there is user selectable option area or button 384 which when selected by user input received via the user input allows the user to access the associated collection run.

The at least one processor may be configured to cause the display a list of collection runs. This may be all of the collection runs.

In some embodiments, the collection runs may be provided in a list through which the user is able to scroll by providing user input via the user interface. In the latter case, the at least one processor is configured to display a part of the list of collection runs, the part of the list which is displayed is responsive to the user input.

In some embodiments, a subset of the collection runs may be displayed. The user may be able to scroll through this subset in some embodiments.

In some embodiments, the at least one processor may be configured to provide a filtered list. The at least one processor may be configured to filter the list based on any suitable criteria. For example, at least one processor may be configured to filter the collection run list in dependence on one or more required resources.

In some embodiments, the at least one processor may be configured to display only collection runs which are available.

In other embodiments, the at least one processor is configured to cause the display to display collection runs with information indicating if that collection run is available. This may be as shown in FIG. 28a which shows a list of collection runs.

Figure 28A:
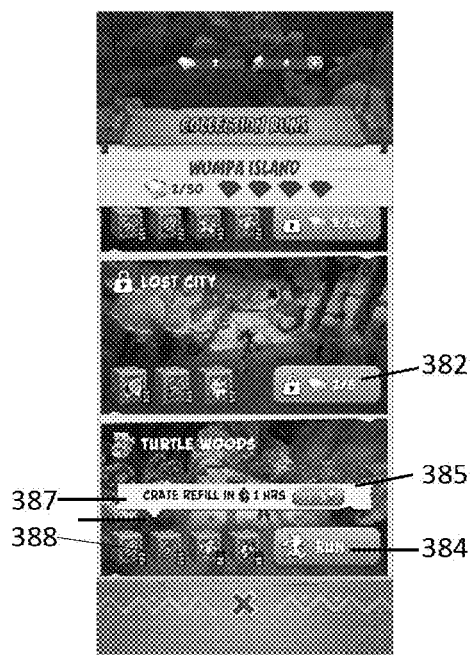
FIGS. 28a and 28b show examples of screens showing collection run options.

As shown in FIG. 28a, each collection run is shown with information indicating if the collection run is available or not. This may be indicated with either a lock 382 if the run is unavailable or a user selectable option area 384 which when selected will provide that collection run. This may be as discussed in relation to FIG. 10.

Figure 28B:
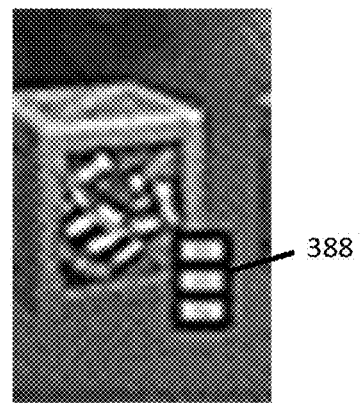

For each type of resource in a collection run, information 388 is provided which indicates if the resource is available. This information may indicate how much of the resource is available. In some embodiments, this information will provide information as to how many of the maximum available resource are available. In some embodiments, this information comprises a meter which is shown in more detail in FIG. 28b. The meter is full when the maximum number of resources are available. This is as shown in FIG. 28b.

In some embodiments, the meter may have a bar representation. In the example shown in FIGS. 29a and b there are a maximum of three bars. When there are three bars, the maximum number of the resources are available in the run. When there are two bars, there are around two thirds of the maximum number of that type of resource available for collection. When there is only one bar, there area around one third of the maximum number of that type of resource available for collection. When there are no bars, there are no resources of that type currently available for collection.

There may be more or less than three bars in other embodiments.

It should be appreciated that the meter can be represented in any other suitable manner. An "empty" bar of the meter may be displayed in different way to a "full" bar of the meter.

A full bar of the meter may be displayed in a visually distinct manner when the meter it is completely full as compared to when the meter is not completely full. This visual indication may be provided by a different colour.

In other embodiments a linear scale or any another representation may be used to indicate the availability of resources.

Alternatively or additionally, the information may comprise information indication a number of resources which are currently available and/or information indicating the maximum number of resources available.

Information 385 may be displayed to indicate when there will be a replenishment of the available resources. This information may comprise the time when the replenishment will be available and/or the length of time required for that replenishment. This may be displayed only when a given number of the available resources area available for collection where the given number is less than the maximum number of resources.

In some embodiments, instead of a list, the at least one processor may be configured to provide collection run information on a map. The map may show a plurality of different areas or worlds. In some embodiments the map may show the different collection runs. In some embodiments, a user may be able to use a zoom function to move between the map showing the different areas and the different collection runs within a given area.

In some embodiments, an indication may be provided on the map to show if a given area is locked or unlocked. A given area when unlocked may have one or more available collection runs. There may be information indicating what resources are available in that given area.

Information such as previously discussed may be displayed on the map adjacent a collection run. This may comprise information indicating if the collection run is available and/or information about the resources of the collection run and/or information when resources which are currently unavailable for collection will be available.

Figure 11:
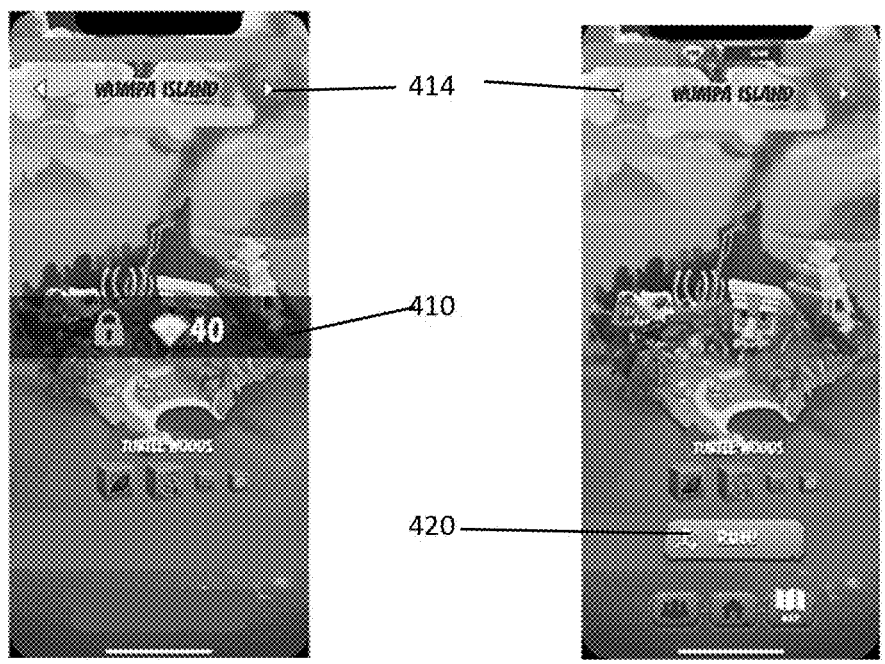
FIG. 11 shows a map representation of a part of an area which is locked becoming unlocked.

FIG. 11 shows a part of the game area. By way of example, this is Turtle Woods of Wumpa Island (Wumpa Island being the game area). In the screen on the right, the part of the area is locked. This is represented by the by the indication 410 which has a lock to show that the area is unavailable and an indication as to what is required to unlock that area. On the screen on the right side, a user selectable option area or button 420 is provided which when selected by user input allows a run to be carried out.

It should be noted that arrow icons 414 allows the user to go to different parts of the game area and/or different game areas. Alternatively or additionally, swiping left or right will allow the user to switch between different parts of the game area and/or different game areas.

In some embodiments, swiping will allow the user to navigate between the base, the clan area, and the runs.

In some embodiments, swiping may be left and right and/or up and down. In some embodiments, one of swiping up and down or swiping left and right may allow navigation between the base, the clan area, and the runs for example and the other of swiping up and down or swiping left and right may allow navigation between different collection runs.

Information such as previously discussed may be displayed. This may comprise information indicating if the collection run is available and/or information about the resources of the collection run.

Figure 29A:
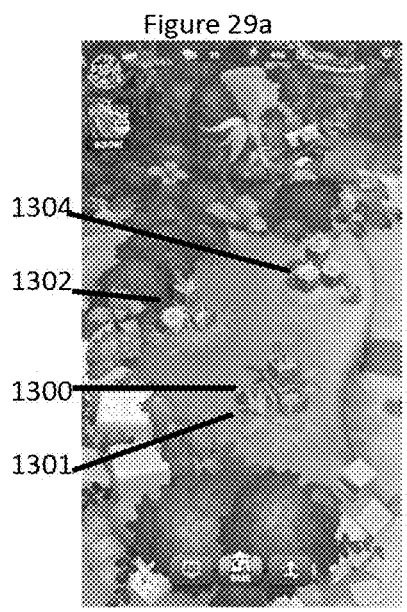
FIG. 29a shows an example of entity which generates eggs.
Figure 29B:
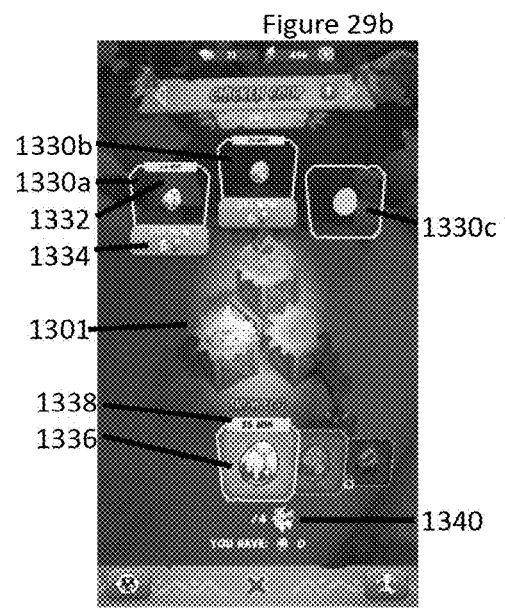
FIG. 29b shows an example screen for making an egg item.

Reference is made to FIGS. 29*a* and 29*b* which show another example of an entity 1301 which is able to make an item. This entity may be a chicken coop. The chicken coop entity itself needs to be created and/or upgraded in order to produce an item. In this example the produced item may itself be used to create another item. For example, the item may be an egg. That egg may be used to produce ammunition and/or a gun. It should be appreciated that in the following examples, reference is made to an egg. This is by way of example only and the refined item which is produced may be any other suitable item. The egg or other produced item is described as being used to make another item such as a weapon or ammunition. It should be appreciated that the refined item may be used to produce any other suitable item.

Reference is made to FIG. 29*a*. A chicken coop may start in a first state 1300. This may be regarded as a ruin state or base state. In this state, the entity may not be capable of producing an items until upgraded to have one or more production slots.

In some embodiments the chicken coop may have m production slots. This means that a chicken coop may make a maximum of m eggs at the same time. In the example shown m is 3. However, in other embodiments m may be more or less than three. In some embodiments, a chicken coop may be upgraded to have more than m production slots.

In some embodiments, each of the chicken production slots may be provided with a nest and a chicken. In some embodiments, when an egg is not being produced in a particular production slot, the respective chicken may be visualised by the at least one processor moving round the base.

When a chicken is associated with the production of an egg, the at least one processor may be configured to control a visual characteristic of the chicken (for example colour) to be the same as the corresponding characteristic of the egg being produced.

In some embodiments, each production slot may be individually upgraded. In some embodiments, the production slots may only be upgraded together. In the first state, none of the production slots may be able to produce an egg.

The chicken coop can be upgraded. This may be as previously described with one or more gems and/or one or more resources and/or one or more items made by one or more other base entities. An upgraded chicken coop is referenced 1302 and this has one production slot which can produce one or more eggs. The other production slots are not yet able to produce an egg.

A further upgraded chicken coop is shown in FIG. 29*a* and referenced 1304. This upgraded chicken coop has all three production slots upgraded and, in the example, shown an egg is being produced in two different production slots.

In some embodiments the at least one processor may be configured to receive user input to upgrade the chicken coop or to upgrade one or more production slots. The at least one processor may be configured to determine if the criteria for upgrading the chicken coop or one or more production slots is satisfied and if so to cause the upgrade to occur. It should be appreciated that the criteria may be any suitable criteria such as the user having a sufficient number of gems and/or resources and/or items and/or parts made from a plurality of items. Where the criteria comprises having a sufficient number of gems, the at least one processor is configured to cause the number of gems to be updated to deduct the required number of gems for the selected upgrade. In some embodiments, in response to the user input, the at least one processor is configured to cause a timer to start. The at least one processor is configured to upgrade the chicken coop or one or more production slots when the timer expires or reaches a predetermined time. In some embodiments, the user may be able to cause the time required to upgrade the chicken coop or one or more production slots to be reduced. This may require one or more additional gems or the payment of an in-game currency or the like.

In FIG. 29*a*, three different chicken coops at different stages of upgrade are shown. In some embodiments, a single chicken coop is provided which may be upgraded as described in relation to FIG. 29*a*.

Reference is made to FIG. 29*b*. The at least one processor is configured to cause, in response to selection of the chicken coop option by user input received via the user interface, the chicken coop entity to be displayed on the display. One example of a chicken coop entity is shown in FIG. 29*b*. The at least one processor is configured to cause the display to display for the chicken coop entity, three options 1330*a*, *b* and *c*. Each of these options is associated with item making option. In this example, the item is an egg. Different item making options will provide different types of egg.

There may be more or less than three item making options. The item making options may correspond to respective production slots.

The at least one processor is configured to determine for each of the three options, if that item making option is available or not. The at least one processor may be configured to cause the display to display information for one or more of the options indicating if the respective option is currently available for selection by a user or not. In the example shown in FIG. 29*b*, options 1330*a* and 1330*b* are available for selection and option 1330*c* is not available for selection. The at least one processor may be configured to cause an option which are available for selection in a visually distinct manner from an option which is not available for selection.

The at least one processor may be configured to determine for an available item making option an amount of time which it would take to make the item. The at least one processor may be configured to cause information about the amount of time to be displayed. In the example shown in FIG. 29b, the amount of time 1332 is displayed. This is the amount of time it would take to provide the item once that item making option is determined to have been selected by the at least one processor. The at least one processor may determine that the respective item making option has been selected in response to user input received via the user interface.

The at least one processor may be configured to determine for an available item making option an amount of time and/or in-game currency amount and/or number of gems which would be required to reduce the time (possibly to zero) for providing the item. The at least one processor may be configured to cause information about the in-game currency amount or number of gems to be displayed on the display. In the example shown in FIG. 29b, the number of gems 1334 is displayed. This is the number of gems that would be required to immediately provide the item once that item making option is determined to have been selected by the at least one processor.

The at least one processor is configured to cause the display to display one or more egg to be made options 1336. It should be appreciated that the user may be able to select via user input received via the user interface one of a plurality of different egg to be made options. One or more of the plurality of different egg to be made options may be unavailable to the user. The at least one processor may be configured to determine if an egg to be made option is available for selection by the user or not. The at least one processor may be configured to cause an egg to be made option which is unavailable to be displayed in a visually distinct manner to one which is available.

In some embodiments, certain eggs may be associated with certain production slots. In other embodiments, any egg may be generated in any production slot.

In some embodiments, a given production slot may be capable of producing (at different times) two or more different eggs.

In some embodiments, a production slot may provide two or more eggs at the same time.

The at least one processor may be configured to cause scrolling through the one or more eggs to be made options in response to user input received via the user interface.

For a currently selected one of a plurality of different egg to be made options, the at least one processor is configured to cause the display to display an amount of time 1338 required to make the egg. This may be the same as the time displayed in relation to the corresponding available egg making option. The at least one processor is configured to cause the display to display information 1340 about the one or more the resources required to make the currently selected egg. This information may comprise the one or more resources and/or the number of the respective resources. The at least one processor may be configured to determine if all the required resources to make the current egg are available and to cause the display to display an indication to the user if they have the required number of each resource. In the event that there are not enough of one or more of the required resources, the user may go on one or more collection runs such as previously discussed.

To make an egg may require an available egg option to be selected by user input and to be dragged by the user input to the corresponding one of egg making options. This may only be permitted by the at least one processor when all the required resources are available. The at least one processor is configured to provide the egg after the associated egg making time or immediately if the gem option is selected by the user.

Some embodiments may allow resource to be collected in a collection run. Those resource may be used to make a refined item. The refined items may be used, optionally with collected resources to make further items.

Figure 12B:
FIG. 12b shows an example of a sign on a path of a run indicating an end of a run.
Figure 12A:
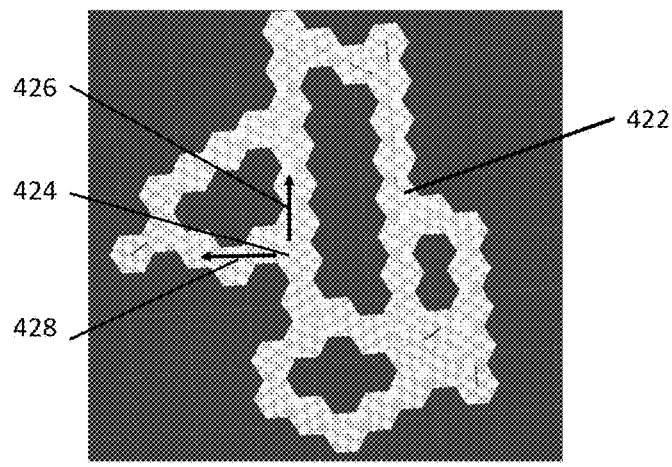
FIG. 12a schematically shows a path of a run.

Reference is made to FIG. 12a which schematically shows an example of a path 422 for a run. This may be for a collection run. In other embodiments, this may alternatively or additionally be for a battle. The path may have one or more branching paths. When a character takes a branching path, that branching path will lead back a main path. By way of example only, at point 424 on the path, the user has the option of guiding the character along the main path as indicated by arrow 426 or along the branching path as indicated by arrow 428. If the user guides the character along the branching path, the character will at the end of the branching path re-join the main path. In some embodiments, the character may be able travel along the same part of the path more than once. The user provides user input via the user interface. In response to this user input, the at least one processor cause the character to move along the path.

In some embodiments, the path will have an exit or end point. In some embodiments, the end of the path may allow the character to return to the base. In some embodiments, the end of the path may be represented by a portal or gate or the like. When the character passes through the gate, the at least one processor is configured to cause the character to be returned to the base.

The path may be provided with one or more indicators to guide the user to the exit or end point. In this regard reference is made to FIG. 12b. In this example, the indicator is provided by a sign which will indicate to the player which branch of the path to take if he wants to reach the end point or exit of the run.

Figure 13:
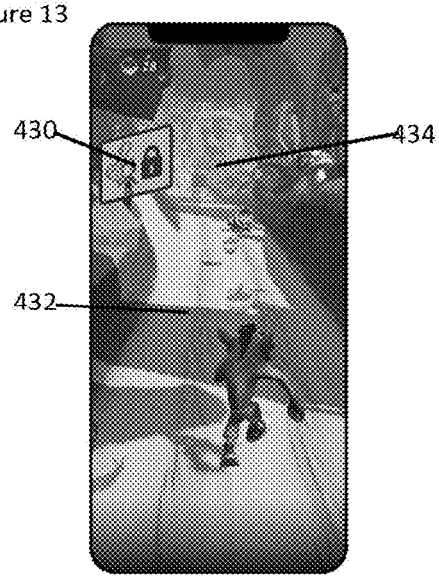
FIG. 13 shows a locked part of a path.

Reference is made to FIG. 13. In this example, the character is being guided along the main path 432. There is a branch path 430 and a continuation 434 of the main path. In this example, the branch path is locked. This means that the user is unable to guide the character along the path until that path is unlocked.

The path may be unlocked until the at least one processor has determined that a as "key" which unlocks that path has been obtained. In some embodiments, the path will be unlocked for a given period of time. A timer may be started when the path is unlocked. The time may control the length of time for which the path is available. In some embodiments, the at least one processor is configured to determine that the timer has expired or reached a predetermined time. In response, the at least one processor is configured to cause the path to be locked.

Whilst that path is unlocked, the at least one processor is configured to allow user input provided via the user interface by the user to guide the character along that path.

By way of example only, a path may be unlocked for 24 hours. This is by way of example only and a path may alternatively be unlocked for more or less than 24 hours.

In some embodiments, there is unlimited access to that path within the given period of time.

In some embodiments, this path may have unique resources and/or gems.

In some embodiments, this path may have relatively rare resources and/or gems.

In some embodiments, the at least one processor may be configured to allow the user to unlock the path with a key. The key may be obtained in any suitable manner.

In some embodiments, a user may be able to obtain a key through game play. The at least one processor may be configured to determine that the user has satisfied one or more criteria by playing the game and in response provide a key.

In some embodiments, the key may be an item. That item may be created as previously described.

In some embodiments, the user may be able to purchase a key. This purchase of the key may be with in-game currency or real currency. This may be from the shop of the base of FIG. 2b, for example.

In some embodiments, one or more runs may have a locked path. In some embodiments, each run may have a locked path. In some embodiments, one or more runs may have two or more locked paths.

Once the resources have been collected on the unlocked path, the at least one processor may be configured to provide more resources on the unlocked but only after a period of time, such as previously described. This may be referred to as reseeding of resources. Different types of resources may be associated with different reseeding times. The resources may be continually provided. Alternatively, a given amount of the resources need to be collected before new resources can be provided.

This means that the user is encouraged to revisit the unlocked path within the time period. In some embodiments, it is not possible for the character to collect all the resources available on the unlocked path in a single run. This may because the resources are provided in adjacent lanes adjacent one another and/or because one or more lanes go up a level and/or one or more lanes go down a level and/or unlocked path itself has one or more branch paths.

In some embodiments, the at least one processor may be configured to cause the display to display information for the user as to the number of items that have been collected on the unlocked path.

In some embodiments, the at least one processor may be configured to cause the display to display information for the user as to the number of items that have not yet been collected on the unlocked path. This may be updated in dependence on the progress of the reseeding.

In some embodiments, the at least one processor may be configured to cause the display to display information for the user indicating the amount of time until one or more of the resources are reseeded.

In some embodiments, the at least one processor may be configured to cause the display to display information about the one or more timers associated with reseeding of one or more resources may be displayed on the display.

In some embodiments, in response to user input provided via the user interface by the user, the at least one processor may able to speed up the rate at which new resources are provided. This may be by using in game currency, hard currency or by game play.

In response to user input provided via the user interface by the user, the at least one processor may be able to cause a timer to speed up or to be skipped in order to provide extra resources more quickly. The reseeding time may thus be shortened.

Alternatively or additionally, in response to the user input provided via the user interface by the user, the at least one processor may be able to upgrade a reseeding object which produces or generates the resources, so it provides the resources more quickly.

In some embodiments, an in-game shop may be provided, and the key may be obtained from this shop.

In some embodiments, the user is not able to immediately obtain a key. The user may need to satisfy one or more game criteria. For example, the user may have acquired a given number of gems. When the user has satisfied the one or more game criteria, the at least one processor may be configured to provide the key.

In some embodiments, each locked path may have a unique key. In other embodiments, one or more paths may share the same key or the same type of key. In response to a user input received via the user interface to use the key or unlock the path, the at least one processor is configured to determine if the path can be unlocked with the key and if so to cause the locked path to be unlocked.

In some embodiments, the validity of the key starts from when it is obtained. In other embodiments, the validity of the key starts from when the key is deployed. When at least one processor determines that the period associated with the key expires, the at least one processor is configured to lock the path such that the character will no longer have access to the associated path.

In some embodiments, there may be some limitation on the number of times a key can be obtained and/or used on a given path.

In some embodiments, there may be a limitation on the frequency at which the key can be obtained. For example, the same key may not be obtained within 24 hours or any other suitable time period.

In some embodiments, the at least one processor may be configured to allow the user only to deploy one key at a time. In other embodiments, the at least one processor may be configured to allow the user to deploy a plurality of keys at the same time.

In this embodiment a key is the object which is used to unlock the path. It should be appreciated that this is by way of example. In other embodiments any other suitable object may unlock the path.

In some embodiments, the key may be omitted so that a path is simply unlocked. This may be in response to the at least one processor determining that at least one criteria has been satisfied.

In some embodiments, instead of being a locked part of a run which is unlocked with a key, a whole run may be available only if a key such as previously described is used to unlock the run.

As shown in FIG. 13, a path to be unlocked is provided. By way of example only, the path may be located adjacent to or close to the entrance to the run. However, in other embodiments, the path to be unlocked may be provided in any suitable location. As can be seen from FIG. 13, the at least one processor may be configured to cause the display to display a path which is locked with a key indication.

When the user has the key, the at least one processor may be configured to cause the display to display an animation which may optionally show the key being used to unlock the path.

In some embodiments, the at least one processor may be configured to unlock the path automatically when the user runs close to the locked path.

In other embodiments, the at least one processor may be configured to determine that one or more actions have been performed and in response to cause the path to be unlocked. The one or more actions may be during the run and/or before the run is started.

The path which has been unlocked may have a higher density of resources as compared to the rest of the path of the run.

The path which has been unlocked may have an exit onto a main path or other path of the run.

In some embodiments, the path which is unlocked may designed to be such that it is harder for the character to die.

In some embodiments, it may require two or more runs by the character on the unlocked path to collect all the resources as previously discussed.

As mentioned previously, some embodiments allow the purchase of a key from base entity which provides an in-game shop. In other embodiments, a separate purchasing area or option may be provided for purchasing in game items.

Figure 14A:
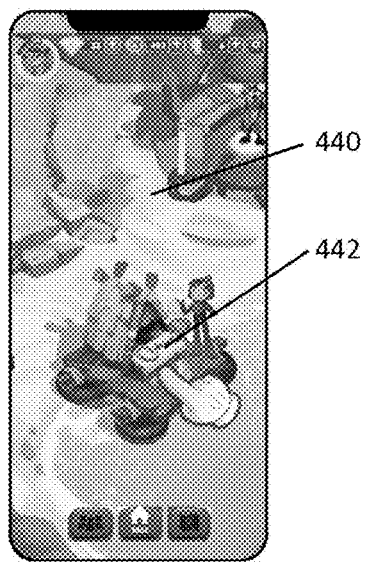
FIGS. 14a to 14c show screens displayed during the purchase of a key for a locked path.
Figure 14B:
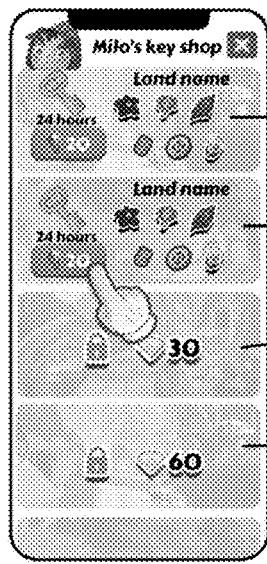
Figure 14C:
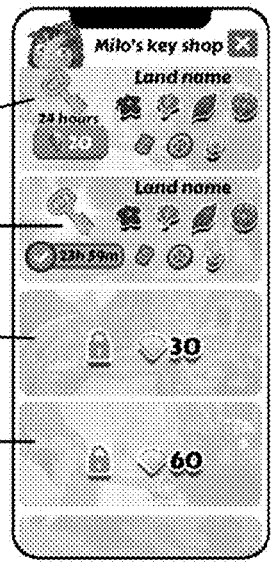

Reference is made to FIGS. 14a to c which shows a series of screens which the at least one processor causes the display to display as the user purchases a key from the shop.

The first screen is shown in FIG. 14a and represents the availability of the shop 440 to the user for one or more keys 442. This shop may be a base entity and needs to be unlocked. In other words, the at least one processor has to determine that the user has satisfied the criteria in order to be permitted to purchase one or more keys from the shop. In the event that the user has not satisfied the criteria, the at least one processor causes the display to display the screen shown in FIG. 14a with an indication that the shop is unavailable for the user. Optionally, the at least one processor may be configured to cause the display to display an indication of the criteria (for example number of gems) required to unlock the shop.

The user may provide a user input select the key option 442 as represented schematically in FIG. 14a or the shop itself.

FIG. 14b shows the screen displayed by the display when the at least one processor determines that user input received via the user interface has selected the key option 442 or the shop itself. This the at least one processor may cause the display to display an indication as to which keys are available for which runs and the associated costs. In the example shown in FIG. 14b, there are two keys 444 and 446 which are available for purchase. For each available key, information is displayed. This information may comprise one or more of the run with which the key is associated, the resources which can be collected on the locked path, the cost associated with the key and the length of time for which the key will be valid.

The at least one processor causes the display to display those keys 448 and 450 which are not yet available to be displayed in a visually distinct manner. The at least one processor may cause the display to display those keys with information indicating the criteria for making the keys potentially available.

Reference is made to FIG. 14c which shows the screen displayed by the display when the at least one processor determines that user input received via the user interface has caused the second key 446 to be purchased. When the key is purchased, the area associated with the key will be updated to indicate the amount of time left for which the key is valid. This may replace the cost information previously displayed.

When there is an active key(s), the at least one processor cause the display to display an icon to indicate its existence. This icon may be provided on a game world map, and/or or collection run screen and/or in any suitable way. This will allow the players to identify and/or navigate to a collection run with an unlocked run or a run which can be unlocked.

In some embodiments, at least one resource and/or at least one item may be stored in one or more entities in the base. The one or more entities may be storage structures in the base. In the example shown in FIG. 2a, these resources and/or items may be stored in the silo. When the user selects the silo, the at least one processor cause the display to display one of more of the screens of FIGS. 15a to e.

Figure 15A:
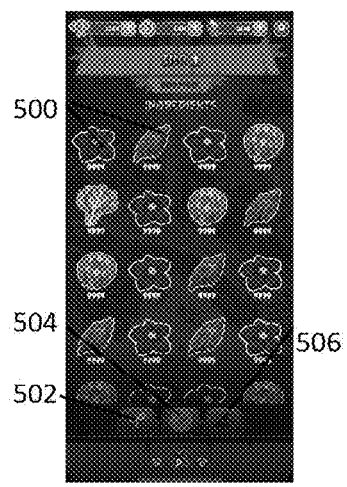
FIGS. 15a and 15b show first examples of ingredient screens.

FIG. 15a shows a screen that the at least one processor causes the display to display showing the ingredients 500 that a user has collected. In particular, this screen shows the number of each ingredient or resources which has been collected. At the bottom of the screen are three user selectable option areas or buttons. The first user selectable option area or button 502 is for resources (ingredients), the second user selectable option area or button 504 is for items (parts) and the third user selectable areas 506 is for craft items (the craft items are examples of items).

These user selectable option areas or buttons can be used to navigate between the screens associated with these different options.

Figure 15B:
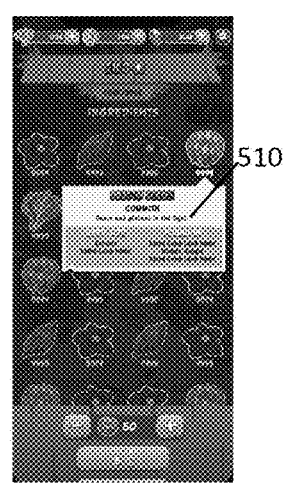

As shown in FIG. 15b, the at least one processor causes the display to display information 510 about a resource or ingredient. This may be in response to user input to select or highlight a particular resource or ingredient. This information may be displayed adjacent the respective ingredient. The information may comprise information as to how the ingredient may be used and/or where the ingredient may be found. The latter information may provide information as to the one or more runs which provide that resource.

Figure 15C:
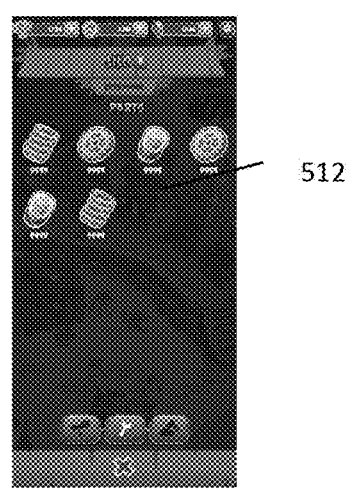
FIG. 15c shows an example of a parts screen.

FIG. 15c shows the screen that the at least one processor causes the display to display when the second user selectable area 504 for parts (items) 512 is selected by user input received via the user interface. This will show the various parts 512 that have been made from one or more resources and/or one or more items.

Figure 15D:
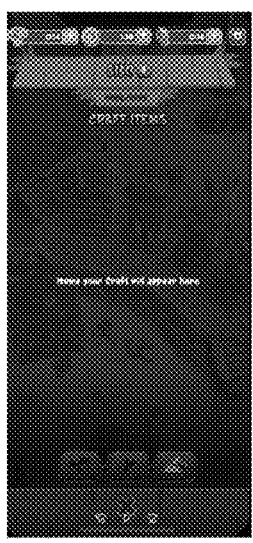
FIG. 15d shows an example of a crafting screen.

FIG. 15d shows the screen that the at least one processor causes the display to display when the third user selectable area 506 for craft items is selected by user input received via the user interface. This will show the various tool items that have been made from one or more resources and/or one or more items. In this example, the user has yet to make any such tool items.

Figure 15E:
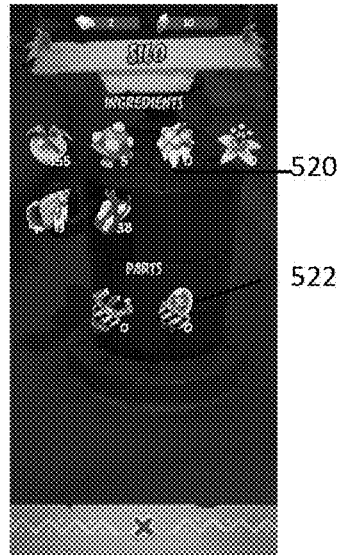
FIG. 15e shows a different example of a screen showing an inventory of ingredients and parts.

Reference is made to FIG. 15e which shows an alternative screen that the at least one processor causes the display to display for showing the contents of a silo. This may be used when the silo is relatively empty. In this example, the resources 520 and the items 522 may be shown on a single screen.

Figure 16:
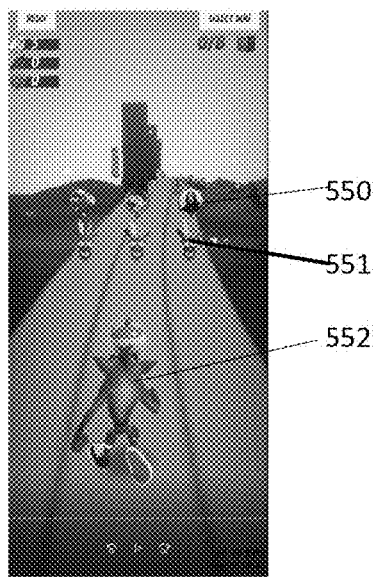
FIG. 16 illustrates a character interacting with avatars of other players.

Some embodiments are configured to provide a social aspect to the game. In this regard, reference is made to FIG. 16. As the character 552 controlled by the user runs, that the at least one processor causes the display to display an avatar 550 or the like adjacent each lane indicating another player. The other players may be a social contact of the player or may be selected by the game server.

When the character 552 is controlled by the user input received via the user interface to run through one of the avatars, the at least one processor is configured to cause a representation of that selected other player to run with the character. If the character completes the run with that representation of the other player, the current player and the other player will receive a reward.

The representation of that selected other player may provide some protection for the current character. If that representation is used to protect the player, then that representation will no longer run with the character.

A player or character may be provided with a mask 551. The mask which a player or character has can have a plurality of different levels. The more that a player plays the game, the higher the level of the mask in some embodiments.

In some embodiments, the representation of the other player may be in the form of the mask 551 of that player.

If a player completes a run with the mask of the other players, the reward of at least one of the player and the other player may be dependent on a level associated with the mask of the current player and/or the other player.

In some embodiments, different rewards will be provided to the current player and the other player.

In some embodiments, the reward provided to the current player will be based on the level of the mask of the other player.

Figure 21:
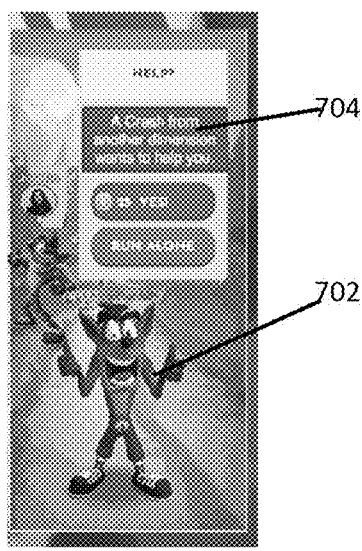
FIG. 21 shows a screen with an option to run with a character of another user.

Reference is made to FIG. 21. In some embodiments, at the beginning of a collection run, the at least one processor causes the display to display a character 702 associated with another player at the beginning of a run and/or a message 704. The at least one processor causes the display to display an invitation for the player to reward or pay the other player for help from the character of the other player. In the event that the other player is paid or rewarded for help, the character of that other player will be controlled by a game bot to collect items for the player. The character of the other player may run ahead of the character of the player.

In some embodiments, the at least one processor may cause, in response to user input via the user interface, by the player paying of the other player with in-game currency or provide any other suitable reward. This may be facilitated by the game server.

In some embodiments, the other player may belong to the same clan as the player. In some embodiments, the other player may be a social contact or friend of the player.

In some embodiments, the other player may receive one or more messages indicating that their character is helping out another character. For example, the other player may receive a message when the player selects the offer for help. The other player may receive a message with a reward. In some embodiments, the reward may be provided at the being of the run. At least one message may comprise information identifying the player.

In some embodiments, the player may receive the offer for help in response to the other player causing an offer for help to be sent.

In some embodiments, as mentioned previously, the character of a player may belong to a particular clan. This may be a clan to which the character is assigned by the game server or may be a clan which the user has selected. This may for example be a clan comprising one or more of the social contacts of the user. The user may be able to navigate to a clan area by selecting the user selectable option area or button 32 in FIG. 2b.

In some embodiments, the at least one processor may be configured to cause the character of the player to race against or with one or more other characters. This may be in a so-called team run.

Figure 17A:
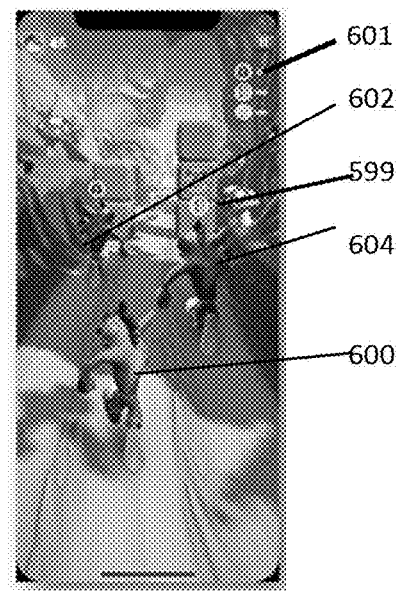
FIG. 17a illustrates a character running with two other characters in a team race.

In this regard, reference is made to FIG. 17a. As can be seen in this Figure, the character of the user is referenced 600. This character 600 is shown as racing against two other characters 602 and 604. In this example, the racing characters have the same or similar appearance and an avatar 599 is displayed in association with all of the racing characters or in association with the racing characters other than that controlled by the player of the game. The avatar may for example be displayed above the head of the character.

In some embodiments, the at least one processor may be configured to receive via the user interface a user input to control the appearance of the character. In response the at least one processor is configured to control the appearance of the user's character displayed on the display during the team race.

Figure 17B:
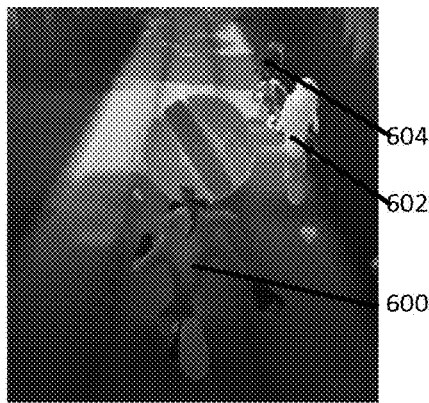
FIG. 17b illustrates another example of a character running with two other characters in a team race.

Reference is made to FIG. 17b. In this example, each of the characters 600, 602 and 604 has a different appearance. In this example, the additional avatar of FIG. 17a is not displayed. The appearance of the user's character may be controlled by the at least one processor in response to user input. Alternatively the at least one processor may be configured to control the appearance of the user's character independently of user input.

These different characters in the team race may belong to one or more different clans or teams. In some embodiments, the different characters may be within the same clan or team as the character controlled by the user.

In some embodiments, the at one processor is configured to cause information 601 (See FIG. 17a) to be displayed on the display which provides information on each of the characters in the team race and their relative position in the race. The information may be displayed in any suitable location on the display.

Figure 17C:
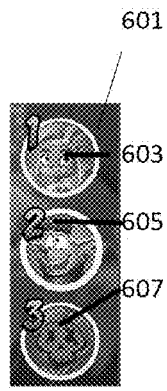
FIG. 17c shows an example of information displayed on the display for a team race.

Reference is made to FIG. 17c which shows an example of this information 601. The information is determined by the at least one processor and the at least one processor is configured to cause the information to be displayed on the display. The at least one processor may be configured to update the information during the race and the at least one processor is configured to cause the display to display the updated information.

This information may comprise an avatar 603 for each of the players in the race. It should be appreciated that alternatively or additionally the information about the racing characters may be provided by the name of the player. The name of the player may be the actual name of the player and/or the name used by the player when playing the game.

It should be appreciated that in the example of FIG. 17a, the information shown may comprise the avatar which is displayed above the racing character.

In the example of FIG. 17b, the information displayed may be that shown in FIG. 17c and comprise an avatar based on the racing characters. For example, the avatar may comprise a head of the respective racing character.

The information 601 indicates the position of each of the characters in the race. The at least one processor is configured to update the position information for the players during the game and to control the display to display the updated position information. In this example, this position information is indicated by a number 605. Thus the player in first place is indicated by the number 1, the player in second place is indicated by the number 2 and the player in third place in indicated by the number 3.

The placing may be dependent on a number of points accumulated or a score. The placing may be dependent on the order in which the characters lose their life in the run with the last character to lose their life being placed first.

In some embodiments, the avatars are displayed in a placing order. For example the avatars may be displayed with the avatar in first place at the top of a list and so on. In this example, the at least one processor is configured to cause the displayed position of the avatars to change as the placing of the players changes during the race. In some embodiments, where the avatars are displayed in a placing order, the placing number may optionally be omitted.

In other embodiments, the order in which the avatars is displayed may be the same throughout the race with the position of a player being otherwise indicated, for example with a numeric indication such as a placing number.

In some embodiments, when one of the other characters has died during the race, the at least one processor is configured to cause the information which is displayed to indicate this. In the example shown in FIG. 17c, the avatar 607 of the character who has died is represented by a skull. In other embodiments, the avatar of the character that has died may have a cross and/or may be greyed out and/or may be removed from the displayed information.

Figure 17D:
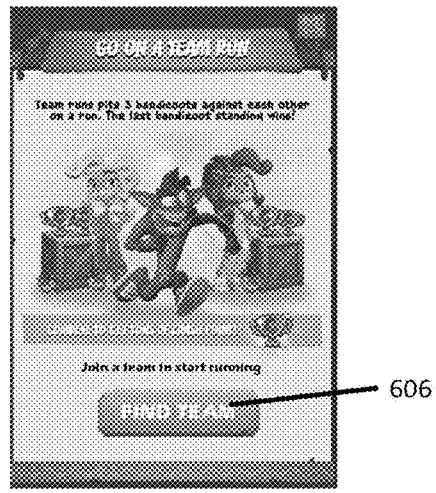
FIG. 17d shows an example of a screen for finding a team for the team race.

Reference is made to FIG. 17d which shows a screen which is displayed on the display where a player is not in a team. The at least one processor may be configured to receive a user input via the user interface indicating that the user wishes to take part in a team race. In response, the at least one processor is configured to determine if the character is already part of a team. If not, the at the at least one processor is configured to control the display to display a selectable area or button 606 inviting the character to join a team. The at least one processor may be configured, in response to the button 606 being selected by user input received via the user interface, to cause a team to be found for the user's character. This may result in the at least one processor causing the sending of one or more messages to the game server and the receiving of one or more messages from the server. The message exchange may cause the user device to be provided with information about the other characters in the race and information about their progress in the race.

In some embodiments, a team may be automatically allocated to the user. In some of these embodiments, the finding of a team option shown in FIG. 17d will be omitted.

In some embodiments, information about a team for the user to race may be already stored in the memory. This information may include information about the other characters in the race and information about their progress in the race.

In some embodiments, the different characters may be provided by game bots based on real game play by the associated characters controlled by respective different users. The team runs may be asynchronous runs with the player's character racing against the game bots providing the other characters in the race. The game bot information may be transmitted to the user device by the game server.

In some embodiments, the characters against which the player races may be controlled by game code. That game code may be controlled to provide a variety of different entities and/or a plurality of different performances in the race to provide variety when the team run option is repeated.

In other embodiments, the race may be a real time race with the different characters being controlled by different players on their respective devices. The data from each of the respective devices is provided to the one or more game servers which would then provide the required race data to each of the other devices.

In some embodiments, the race has no defined end. The race maybe a so-called endless or infinite run. In other words, the character can keep on running provided that the character does not fail or lose one or more lives or the like.

The at least one processor may determine that the race had ended when the character of the player had died in the race. In some embodiments, the at least one processor may determine that the race has ended with all of the other characters in the race have died apart from the character of the player.

In other embodiments, the race may have a defined end. In some embodiments, the at least one processor may determine that the race had ended when the defined end is reached by one or more of the racing characters. In some embodiments, the at least one processor may determine that the race had ended earlier than the defined end if the character of the player dies or if all the characters in the race have died before the end.

In some embodiments, the at least one processor may be configured to control the speed of the characters during the race. This may be independent of any user input. This is described in more detail later.

In some embodiments, the at least one processor is configured to cause the run speed of the characters to increase as the race progresses. This may be to allow more skilled players to be more successful in the race and earn more points and/or rewards. In some embodiments, there may be a maximum run speed.

In some embodiments, the at least one processor will receiver user input from the user via the user interface and the at least one processor uses this input to control the path of the character and/or how the character moves and/or how the character interacts with objects. The at least one processor may be configured to control the movement of the other characters in race independently of any user input provided via the user interface. Thus the player is only able to control his character in the race and not any of the other characters in the race.

In some embodiments, there may be some limitation on when a player is permitted to take part in a race. For example, a player may be required to use one or more tickets or other tokens in order to take part in a race. In this regard, reference is made to FIG. 17e which shows a screen which the at least one processor is configured to cause the display to display. In this example, the at least one processor causes a user selectable area or button 609 is displayed on the display. This button when selected by user input received via the user interface will cause the at least one processor to allow the player to take part in a team race or run. In some embodiments, this user selectable area will only be provided when the player has the required ticket(s) or token(s) to take part in the team race. The at least one processor may be configured to determine if the user has the required one or more tickets and only if the user has the required one or more tickets is the button 609 caused to be displayed and/or to be selectable. Thus, in some embodiments, this user selectable area will only be selectable when the player has the required ticket(s) or token(s) to take part in the team race.

Figure 17E:
FIG. 17e shows an example of a screen for starting a team race.

In some embodiments, the at least one processor may be configured to cause the display to display to information indicating that the user has the required ticket(s) or token(s) to take part in the team race. In the example of FIG. 17e, an image of a ticket is displayed on the button 609. However it should be appreciated that this is by way of example only and in other embodiments, a different visual representation may be used. The different visual representation may comprise an image and/or one or more words. The visual representation may be displayed at any suitable location on the screen in addition to or as an alternative to on the button. In some embodiments, this visual indication of the user has the required ticket(s) or token(s) to take part in the team race may be omitted and instead may be indicated by the availability of the team run option for selection.

One or more tickets or tokens may be obtained through game play and/or by in game purchase and/or may be provided at particular points of the game and/or may be provided at particular times. By way of example only, a player may be provided with one or more tickets or tokens every day or at some other frequency. Information about one or more tickets which the user has acquired and not yet used may be stored in memory. Information about available tickets may be displayed in response to user input received via the user interface.

In some embodiments, there may be a time limit associated with one or more tickets or tokens. The at least one processor may be configured to store in memory for each token or ticket information associated with an expiry. When the at least one processor determines that the ticket or token has expired, that ticket or token will be unavailable for use. The at least one processor may be configured to determine which one or more tickets or tokens have expired. This may be periodically or when a user provides an input requesting a team race option. The at least processor may delete expired tickets or tokens from the memory or mark the expired tickets as expired.

The at least one processor may be configured to determine when a user selects a team option the one or more tickets or tokens which are closest to expiry. The at least one processor may be configured to cause the one or more tickets or tokens which are closest to expiry to be used when the team race option is selected.

In some embodiments, there may be a limit on the number of tickets which a user has at one time. The at least one processor may be configured to determine when a new ticket or token is received if the user has the maximum number of tickets or tokens already. If so the, the at least one processor may be configured to prevent the user from acquiring a further ticket.

Where the ticket or token is being purchased, the at least one processor may be configured to prevent the user from purchasing that new ticket.

In some embodiments, where a ticket is associated with an expiry, the at least one processor may be configured to determine the ticket closest to expiry, delete that ticket and replace that ticket with the new ticket.

In some embodiments, where the limit of tickets or tokens has been reached, the at least one processor may be configured to cause the display to display a message to the user indicating that they will get no additional tokens or tickets until one or more of the current tickets are used.

Where a player is able earn tickets or tokens through game play or in game purchases, the limit may not apply to these tickets or tokens.

It should be appreciated that in other embodiments, there may be no limit on the number of tickets or tokens that a user can have.

In some embodiments, the use of tickets or tokens may be omitted. The at least one processor may be configured to receive user input received via the user interface selecting a team run to allow the user to take part in a team run. In some embodiments, the user is able to take part in a team run at any time. In other embodiments, there may be one or more conditions associated with the taking part in a team run which need to be satisfied. In some embodiments, the team run option is only available when those one or more conditions are satisfied. These one or more conditions may comprise one or more conditions relating to game play and/or one or more conditions associated with time.

In some embodiments, points and/or other rewards may be earned in dependence on how long the character controlled by the user survives as compared to one or more of the other characters. In some embodiments, the points may be dependent on the distance covered by the user's character in the race and/or the length of time for which the user's character survives in the race.

In some embodiments, there may be a reward and/or points awarded dependent on the position of the user's character in the race.

The placing points or reward may be separate to the points dependent on the distance covered by the user's character in the race and/or the length of time for which the user's character survives in the race.

The placing points or reward may be added to the points dependent on the distance covered by the user's character in the race and/or the length of time for which the user's character survives in the race.

In some embodiments, as the user's character runs in the team race, team points may be accumulated. The tea, points accumulated may be accumulated by all the characters in the game. Alternatively each character accumulates its own points. The team points may only be those accumulated by the player's character. The points which are accumulated may be added to a team total.

The at least one processor is configured to determine the points acquired during the race and to update a points total. This may be done in an iterative manner during the race.

In some embodiments, additional points may be provided in dependence on the character's position at the end of the race. For example, if the user's character is first, more points will be awarded than if the character is second or third. It should be appreciated that the extra points awarded for final position in the race may be provided only when the race is ended, for example when the user's character dies.

The points accumulated may be dependent on a distance run and/or the length of time for which the user's character survives. Alternatively or additionally the points may be dependent on one or more actions taken by the character In some embodiments, when a speed at which the character runs increases, the at least one processor may be configured to cause the rate at which points are accumulated to be increased.

In other embodiments, even where the speed of the character is not increased, the rate at which points can be accumulated may be increased during the run.

In some embodiments, the run speed may increase on a frame by frame basis. In other embodiments, the run speed may increase more slowly. The run speed may increase linearly or non-linearly. In the latter case, the speed may increase stepwise or exponentially.

In some embodiments, the at least one processor is configured to control the rate of accumulation of points. The at least one processor may be configured to initially provide X points per Y time. This may be at a constant rate. The speed may be increasing in this time period. Thus for a first part of the race, the speed is increasing but the points are being accumulated at a first constant rate.

After a predetermined time or when the speed has reached a threshold, the rate at which the points are provided may increase. The rate may be increased by a multiplier of the initial rate. For example, the rate is increased to 1.1 X per Y time. Thus the at least one processor may determine a current speed and compare the current speed to the threshold. When the threshold is reached, the at least one processor is configured to update the rate at which the points are provided.

This increased rate will be maintained until speed has reached a second threshold, and then the rate at which the points are provided will be increased. The rate may be increased by a multiplier of the initial rate or the modified rate. For example, the rate is increased to 1.2 X per Y time.

This is repeated. In some embodiments, there may be a cap on the value by which the points rate may be modified. In other embodiments, the rate continues to be increased until the character dies.

In some embodiments, the rate at which points are accumulated may increase based on a time or a distance threshold.

In some embodiments, the at least one processor may be configured to cause information about the rate at which the points are being accumulated to be displayed. For example, information about the multiplier may be displayed.

In some embodiments, the at least one processor may be configured to display information indicating an increase of the rate at which points can be accumulated. In this regard, reference is made to FIG. 17g which shows an arrow 619 in an upwards direction next to a representation of the points. The representation is used to convey to the user that the rate at which the points are accumulated had increased. Alternatively or additionally this may be accompanied by information indicating a multiplier such as previously described.

In some embodiments, while the character is racing the at least one processor is configured to display the number of points accumulated by the characters.

In some embodiments, the character of the user may collect or destroy one or more resources or objects. The resources may be used such as previously described.

In some embodiments, when one or more objects are collected or destroyed, this may be used to provide extra points. By way of example only, crates may be provided in the team run and when a crate is destroyed or smashed, this will provide one or more extra points. In some embodiments, the at least one processor may be configured to control the display to display a visual indication of the link between the completing of the relevant action with respect to an object and the points provided. By way of example only, a visual representation will move from the track on which the character is running or from the smashed object to the counter and then the counter is incremented.

Figure 17F:
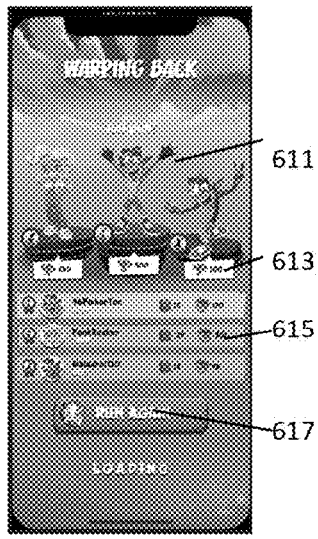
FIG. 17f shows an example of a results screen for a team race.
Figure 17G:
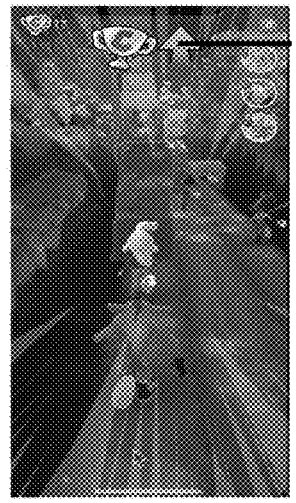
FIG. 17g shows an example of a screen displaying indicate an increase in a rate at which points are accumulated.

In some embodiments, the at least one processor may be configured to cause the display to display a results screen such as shown in FIG. 17g at the end of the race. The results screen may provide information 611 about which character won the race. In this example, the at least one processor is configured to control the display to show a representation of each character and a podium. The position of a character on the podium is dependent on the position achieved by the character in the race. In this example, the user's character has won the race. The information about the position of the characters in the race may be represented alternatively or additionally in any other suitable way.

The results screen may display information 613 indicating a number of points provided for the placing of the characters. In the example shown in FIG. 17f, this information may be displayed below the respective podium position. This is by way of example only and in other embodiments, the information may be alternatively or additionally be displayed in any suitable way.

In some embodiments, the at least one processor is configured to cause the display to display on the results screen a list 615 of information about the performance of each of the characters. The list may provide information identifying each character. This information may be an avatar and/or the username. The list may provide a total number of points earned in the run for character.

This total number of points may be points for distance run and/or the time for which the character has run.

Alternatively, this total number of points may be points for distance run and/or the time for which the character has run and the points awarded for final race position.

Alternatively, this total number of points may be points for distance run and/or the time for which the character has run, the points awarded for final race position and the points for performing specific actions in relation to one or more objects Alternatively, this total number of points may be points awarded for final race position.

Alternatively, this total number of points may be points awarded for final race position and the points for performing specific actions in relation to one or more objects In some embodiments, information about the number of resources collected may be displayed.

In some embodiments, information may be displayed about the number of objects for which the specified action has been performed. In the example described, this would indicate the number of crates smashed.

In some embodiments, a user may be able to do another team run. The at least one processor is configured to cause the display to display on the results screen a user selectable area or button 617 which when selected by user input received by via the user interface allows the user to do another team run.

Where the user selects another team run, the at least one processor may be configured to cause the display to display on the next results screen an accumulated number of points across the team runs, an accumulated number of resources across the team runs and/or the accumulated number of objects for which the specified action has been performed across the team runs.

In some embodiments, when a character dies in the team run, the user may be provided with an opportunity to make an in game purchase which will allow the character to continue to run in the team run. In some embodiments, the number of times which a character can continue in the same team run after dying may be capped. In some embodiments, the at least one processor may be configured to cause the display to display an invitation for the user to make an in game purchase to continue to take part in the team run. This displayed invitation may comprise information about the current rate at which the points are accumulated (this may be the multiplier previously described) and/or information indicating the position of the character when he died and/or information about the number of points accumulated in the run before the character died.

When a character makes an in game purchase, the at least one processor is configured to restart the race and the user's character is able to resume running in the team run. Those other characters which had previously died remain dead. In some embodiments, the run may be considered to be made of segments or chunks. The at least one processor may be configured to determine the segment or chunk of the run in which the character died and when an in game purchase is made, the at least one processor is configured to cause the character to be returned to the beginning of the segment or chunk in which the character died. The previously collected items in that chunk may be respawned.

The at least one processor is configured to control the displayed character to have the run speed and point accumulation rate that the character had when the character died. The at least one processor is configured to control the displayed character to retain the position that the character had in the race when the character died with the chance to get into a better position.

The at least one processor is configured to control the displayed character to have a protective item which can be used at least once to save the character from dying. That protective item may be used only a given number of times in some embodiments. For example, the protective item may be used only once in some embodiments. In some embodiments, the item may only be effective against one or more hazards and/or may be ineffective or have no effect against one or more hazards.

If the player decides not to make an in game purchase after his character dies, the results screen such as previously discussed is displayed.

Figure 17H:
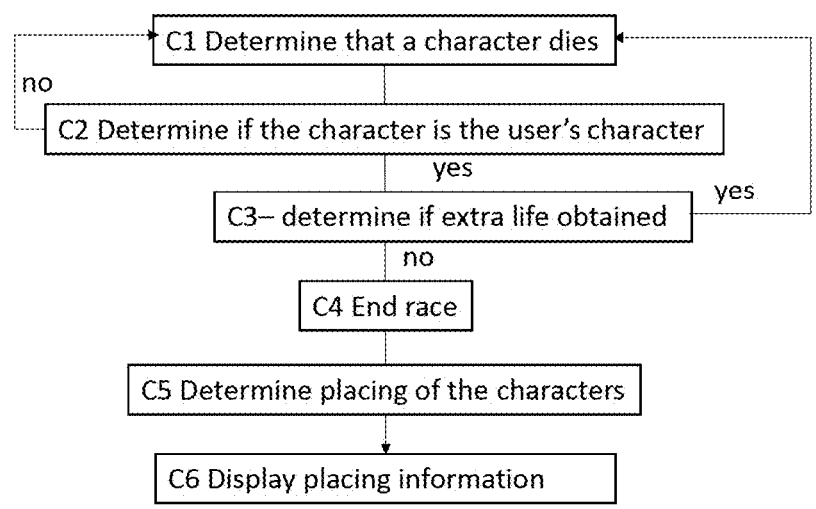
FIG. 17h shows a method for determining a place in the team race.

Reference is made to FIG. 17h which shows a method of some embodiments.

In step C1, the at least one processor is configured to determine that a character has satisfied a fail condition. In this example, the fail condition may be the character has died. This may be the result of the character losing a life or where the character has more than one life, all of the available lives being used up.

In step C2, the at least one processor is configured to determine if the character which has satisfied the fail condition is the user's character or one of the other characters in the team race. In some embodiments, steps C1 and C2 may be part of a single step.

If it is determined that the character is not the user's character, the method will revert to step C1.

If it is determined in step C2 that the character which has satisfied the fail condition is the user's character, the next step is step C3. In step C3, it is determined by the at least one processor if an option to obtain an extra life is obtained. This may be as previously described. If so, the method will revert to step C1.

If it is determined in step C3 that the extra life option has not been selected, then the next step is step C4 in which the at least one processor is configured to end the race.

When it is determined by the at least one processor that the race has ended, then the next step is step C5 in which the placing of the characters is determined. If it is determined that that user's character is the only character remaining, then it is determined that the user's character is in first place. In some embodiments, the position of the user's character is determined based on the number of the other character which have already died when the race is determined to have ended. Where the user's character is the first character to die and/or there are two or more other entities alive when the user's character dies, the at least one processor is configured to determining a placing of the other characters based on run information associated with the respective characters. In some embodiments, alternatively or additionally, the position of the user's character is determined based on the number of the other character which still alive or have not satisfied a fail condition when the race is determined to have ended.

In some embodiments, step C4 and C5 may be provided in a single step.

In some embodiments, the at least on processor may be configured to cause the display to display information about the placing in step C6.

In some embodiments, a step may be provided between step C2 and C4. If it is determined that all of the other characters in the race have died other than the user's character, the race may be ended. In other embodiments, even if the all of the other characters in the race have died other than the user's character, the race will continue until the user's character dies.

In some embodiments, at least a part of the score achieved by the user's character during the team run may be used to determine a team contribution from that user's character to the team of the user's character. This team score may be all or part of the points acquired during the run by the user's character. The team score may be provided by or based on the placing points of the user's character in the run and/or the points acquired by the users' character during the run by running and/or the points acquired by the users' character during the run by interacting with one more objects. The team points earned by the user's character in the team run may be added to the points or score for that team.

In some embodiments, there may not be a contribution from the other characters in the team run to the team score. In other embodiments, there may be a contribution from one or more of the other characters in the team run to the team score. This contribution may be determined as for the user's character or in any other suitable way.

In some embodiments the at least one processor may be configured to cause the display to display the points total for the team including the points added by the user's character. The at least one processor may be configured to send the user's contribution to the game server and to receive an updated team score from the server. In other embodiments, the at least one processor may be configured to update the team score on the device using a current team score and the user's team score.

In some embodiments, the at least one processor may be configured to cause points information about at least one other team to also be displayed. The information about the user's team and at least one other team may be displayed in a leader board. The information about the one or more other teams may be received from the game server.

In some embodiments, there may not be any clans or teams, or the race may be outside the clan format. For example, the character controlled by the user may race against one or more social contacts of the user or one or more other players selected by the game server for the competition to get rewards.

The reward may be any suitable reward. The reward may be for the player and/or the clan of the player.

As mentioned previously, in some embodiments, a character is able to attack an enemy. In some embodiments, a group of players may work together against a common enemy in order to defeat that enemy. In some embodiments, the character is controlled to run along a path with other player. In order to defeat an enemy, this requires that the enemy is hit N times where N is greater than one. In some embodiments, the N hits may come from any of the players. In some embodiments, an enemy may need to be hit by N different characters where N is greater than 1. The other characters may be in the same clan as the character controlled by the current user and/or in a different clan. In some embodiments, the different characters may be not part of any clan structure.

The game play of one or more other player may be provided by a game bot. This game play of one or more other players provided by a game bot may be based on actual game play by the respective one or more other player or based on the game play of one or more other players. The actual game play done by the different players may take place at different times but through the bots, it appears that the different players are playing at the same time. The game bots may be provided on the server and/or on the user device.

As mentioned previously, some players may be in a team or clan. A player can join a team and win rewards in team events such as a team run described previously. A player in a team can win rewards by helping their team to climb a league during a season. A season will be described in more detail below. When a player joins a team, the player will have access to the team run feature previously described. The player may be able to chat via the game with other members of the team or clan. A player may have an opportunity to show off their achievements and customization.

There may be an entry requirement before a player can join or create a team. For example, a player may need to have a minimum number of power gems or other in game reward or currency. By way of example only, the player may need to have a minimum of 5 power gems to join a team. Different teams may have different minimum power gem requirements.

There may be a limit on the number of players in a team. For example, the maximum number of players may be 30 players in a team. In other embodiments, different number of players may be provided in a team.

Each team member can earn points or trophies by engaging with different features of the game. A team's points are the accumulated count of all its team members' individual points within a season. The points may be those points accumulated during the season. The points may additionally include points accumulated in the tease period. (A tease period may be provided before a season starts).

League rewards may be given out at the end of a season depending on the team's position in the league. Each team member will get a league reward.

The position in the league may determine if a team goes up or down a league for the next season.

At the end of the season, the team's points is reset to 0.

A team may have a team tag. This is a unique ID provided by game software when a new team is being created. This unique ID may be provided by the game server in some embodiments.

The team can be an open team or a search only team Open teams can show up in recommended list for any players; Search only teams can only be found by inputting its tag in the search field. This means that a player can only join a search only team if the player has the tag. This allows friends to play together in teams. The option to be an open team or search team is set by the team creator and can be changed by the team leader or co-leader.

In some embodiments, there may be a power gem requirement in order to join a team. Only players that have the required number of power gems can join the team. Members who have already joined the team may not be affected if this requirement is changed after a player has joined the team. The number of power gems may be set by the team creator and can be changed by the team leader and co-leaders.

The at least one processor may be configured to cause the display to display information about a list of one or more recommended teams for a player who has not joined a team. This may be displayed in a team tab. The information may be displayed in response to user input selecting the team tab. The information about the recommended teams may be determined and provided by the game server to user device on which the game is being played. The list of recommended teams may be a scrollable list of teams. A recommended team is one which still has space for new members. The at least one processor may be configured to cause the display to display more active teams may be displayed first. The at least one processor may be configured to cause inactive teams to be hidden. The at least one processor may be configured to cause the display to display teams whose average power gem count which are closest to the player's power gem count first. In some embodiments, where teams can have a minimum power gem requirement, the at least one processor may be configured to cause the display to display only those teams which have a power requirement equal to or lower than the player's current number of power gems. A recommended team will be one whose status is set to open.

The list of recommended teams may be at least partially categorised. By way of example only, the categories may comprise one or more of the following: very active teams—this includes only very active teams; cooperative teams—this show teams with the most daily clan runs (per player on average); chatty teams—this show teams with the most daily chat messages (per player on average); and family friendly teams—this will show teams where its profanity filter has not been triggered in the last 30 days (or some other suitable time period).

The at least one server may be configured to determine one or more metrics for a team. The metric may comprise an activity metric, a cooperative metric, a chatty metric, and a family friendly metric. One or more of these metrics are used to rank teams in one or more categories. This determination may be done for all teams or for a set of possible teams for a user.

The teams that are recommended in a category may satisfy one or more other criteria. The teams may for example satisfy one or more power gem criteria. The teams may be ones which are open with availability for new members.

A player can search for a specific team by inputting via the user interface the team name or team tag (unique ID) in the search field to look for specific team. This will provide the team which satisfies the search criteria.

Figure 32:
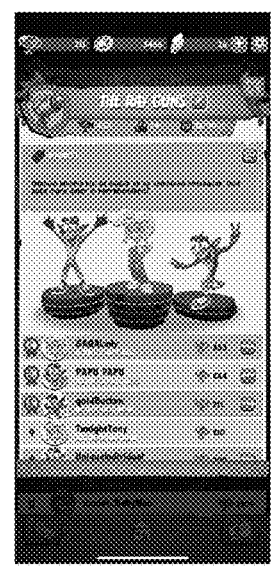
FIG. 32 shows a screen with information about a team.

The user can select by providing user input via the user interface to select a team in the recommended list or search result, in response the at least one processor is configured to cause the display to display a team profile screen. The team profile screen such as shown in FIG. 32 may show one or more of the following: badge; name; team points, current rank in the leader board/league; member count; country; tag; activeness; description; list of members; and member information.

The information displayed on the team profile screen may show team members sorted according to their point contribution. Characters (with the costume and poses) of the top 3 or any other suitable number of members in the team may be displayed, as shown in FIG. 32. This may be displayed above the member list. The member information may comprise one or more of rank in the team based on the points contribution, portrait with the current avatar and costumes, player name, information indicating when the player was last online, and the player's points contribution to the team during the current season.

A player is able join a team immediately if the player does not belong to a team. Otherwise, the player will need to wait until the end of a cool down period associated with the leaving of another team, before being able to join a new team.

When a player is leaving a team, information about the team that the player is leaving and the new team may be displayed to allow the player to compare the teams. The information about the teams may comprise one or more of information about the activeness of each team, the points of each team, the league and rank for each team, and the number of players.

Instead of joining an existing team, a player may create their own team. This may require in game currency in some embodiments. If the player already belongs to a team, when they access the create team screen, the at least one processor is configured to cause the display to display a popup indicating that the player will need to leave the current team first. The at least one processor may be configured to cause the player to automatically leave the current team when the new team is created. The at least one processor may be configured to cause the display to display information indicating that the current points of the player do not move to the new team. The at least one processor may be configured to cause the display to display a create team screen in response to the player selecting an option to continue creating the team.

A new team will start at a guest league which is the lowest league in some embodiments.

The creator of a team can name the team. A team description may be provided by the creator of the team. A badge can be selected. The creator of the team is the team leader. In some embodiments, a player may have to achieve a certain level in order to be able to create a team. The players who join the created team may be required to have achieved a certain level in order to join the team.

The leader of a team can kick players out of a team. The kick function may be locked for the last X days of a season, so players will not get kicked out of a team and missed the chance to earn the season's rewards. The team leader can change the team description, the team name and change the team badge. In some embodiments only the team leader can edit and manage the team. Only the team leader can promote other players to be co-leaders. A leader may edit a location requirement of the player, the player level requirement, and control if the team setting is open or closed. The location may be a country or any other suitable location requirement.

A co-leader may manage the team and may have the same control options as the team leader. However, a co-leader may not be able to promote or demote other co-leaders. The other members of the team do not manage the team.

When a player leaves a team, the points contributed by the player before leaving the team remain with the team which is being left. When a player joins a new team, their point contribution will start at 0. This may not affect the points count in the battle pass of the player. In some embodiments, there may be a limit as to how often a player can change team. For example a player may only switch team once every 48 hours or any other suitable length of time. In some embodiments, after leaving a team and before the player can join a new team, there is a cool down period. The cool down period may be for example 48 hours or any other suitable length of time.

A leader can leave the team themselves or may be remove removed by the game server because of inactivity as will be discussed in more detail later.

When a player who already belongs to a team tries to join or create a new team, they will be told to leave their current team first.

The player may leave a team by selecting a leave button via user input in the team profile screen displayed on the display. The at least one processor may be configured to cause the display to display information indicating that all the contributed points will not carry over to new team. The at least one processor may be configured to cause the display to display information indicating that they will lose their chance to win the season's reward without a team. The at least one processor may be configured to cause the display to display information indicating that, if they are in a cool down period for joining new team, they cannot join a new team for the current remaining amount of the time of the cool down period. The at least one processor is configured to keep track of the cool down period and cause the display to display information indicating how much time there is until the end of the cool down period.

Figure 33:
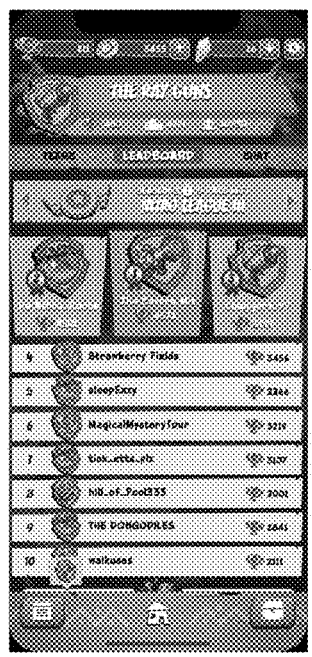
FIG. 33 shows a screen with information about a league of teams.

A leader board may be provided for the teams. An example of such a leader board is shown in FIG. 33. The teams may be split into multiple shards, with 100 (or any other suitable number of teams) teams in each shard, so each team is competing with 99 other teams. Teams are ranked based on the total points that their team members have earned during the season. The at least one processor may be configured to cause the display to display a countdown timer for the current season in the leader board screen. At the end of a season, rewards may be given out to team members, depending on the final position of their team and which reward tier that position belongs to. The leader board may be divided into multiple reward tiers. At the end of the season, the players will be rewarded based on the team's rank and which reward tier the team is in.

The game server may be configured such that Inactive teams may not only be demoted but also moved all the way to a guest league, together with the newly created teams.

A player may be able to provide user input to select any team in the leader board to see other teams' profiles. The player may be able to look at the profiles of individual ones of the teams. The player may be able to join the team if the team is open and the player satisfies the joining criteria. The player may be able to see the reward earned by that team.

In some embodiments, the game server may be configured to cause team members to get one or more of the following feeds:

new member has joined;
member has been removed from the team; member has left;
member has been promoted to leader (as a result of original leader leaving the team);
result of the season/event for the team;
member has been promoted to co-leader;
co-leader has been demoted to member; and
free clan run ticket from other member's battle pass purchase.

When a member has purchased a battle pass, clan run tickets will be rewarded to each members and can be claimed by each of the other team members.

The game may be configured to determine for each team which members are inactive. This may be done on the backend game server or on the computer device of the team leader. The team leader may receive a message which is displayed on the display and which prompts the team leader to remove inactive members. Alternatively, the backend game server may remove inactive members from a team.

Any suitable criteria may be used to determine if a player is inactive. For example, a player may be considered to be inactive if they have not come online for 14 days or any other suitable time.

In some embodiments, if there is at least one inactive member in the team, the at least one processor may be configured to cause the display to display a feed or message for the leader. This may be for example, when the team leader provides user input to access the team feature. The team leader may have the option to remove the inactive players from the team. The at least one processor may be configured to cause the display to display information to the leader indicating when the inactive players were last online and/or the points provided by those inactive players. The points may be for a current season and/or one or more previous seasons. The at least one processor may be configured to cause the display to display a remove button or other user selectable area next to each inactive player. When this remove button is selected, the at least one processor is configured to cause the inactive player to be removed from the team. The team leader can choose to remove any one or more of these players or none at all if they choose to.

For the players who get removed from a team, the at least one processor may be configured to cause the display to display a popup with a message will appear when they next launch the game. This message may indicate that they have been removed from the team and/or indicating that they should join a new team.

For an inactive team or a not very active team, each team member may be provided with a message suggesting that join a new team.

Where a player receives a suggestion to join a new team, the at least one processor may be configured to cause the display to display information about one or more recommended teams to be displayed. This may be in the popup.

In some embodiments, the at least one processor may be configured to provide a button or other user selectable area, which when selected by user input via the user input will cause the display to display the join team screen of a recommended team.

In some embodiments, inactive team leaders may be demoted. The inactive team leader may be a co-leader of the team. If there is any co-leader(s) in the team, the player who has contributed the most points may be auto promoted as the new leader. If there is no co-leader, the player who has contributed most points will be auto promoted to leader.

In some embodiments, empty and/or very inactive teams may be removed.

A team will be deleted when there is no more members in the team.

If a team has no member which came online for a full season or other length of time, the team may be deleted when that length of time is over.

When a player comes online, after their team has been deleted, the at least one processor may be configured to cause the display to display a message indicating that the old team has been disbanded due to inactivity and a suggestion that the player join an active team now to win rewards in the new season A team may be closed to new players or open to new players. If the team does not have enough members, the at least one processor may be configured to cause the display to display a message suggesting that the team leader change the status of the team to open to allow new players to join the team. A team leader may send a team tag to other potential team members or make the team open to anyone.

A player may need to be in a team to access the team runs described previously. There may be a delay before this team run feature is provided in a season.

Some embodiments of the computer implemented game may have seasons. A season may last for a period of time. The period of time may be the order of one or more weeks. The season may be divided into episodes. In some embodiments, a season may have a narrative content which will advance each episode.

The objective of the player is to earn points or trophies from the core game features (which are always available) and/or from different seasonal features that become available during the season. The points may allow the player to win one or more of costumes, trophies and some other items from a team leader board and battle pass. Some rewards may be unique to a season. For example a particular costume may only be obtained during a particular season. The availability of one or more game features may change from season to season.

In some embodiments, there may be a gap between seasons. This may be a tease period. Points earned in this period may count towards the next season and/or may be used by one or events provided between seasons. In other embodiments, one season may be immediately followed by another.

The display may be controlled to display an icon or widget or the like when a season is live. Interaction by the user via the user interface with the icon or widget, causes the at least one processor to cause the display to display the menu for the season. The icon may have a different appearance for different seasons. The appearance of the icon may be different for different episodes. Before the start of the season the icon may have a message indicating that the season will start shortly and/or a timer. In some embodiments, information may be displayed during the season indicating the remaining time of the season. For example a countdown timer may be provided. At the end of the season, information may be displayed to indicate that the season has ended.

The at least one processor may be configured to cause the display to display a season menu. The season menu screen can be displayed in response to user input, for example tapping on a button or other usable selectable area in a season introduction, a widget associated with the season or a specific building or location in the base (for example a dock). A widget or icon may be displayed on the display for a current episode. A widget or in for an episode is removed from the display at the end of the episode.

The season menu screen may contain one or more of a timer counting down to the end of season; and narrative content such as season name, season image, dialogue, and/or the like. The narrative content may change when the new episode of the season has started. The menus may have tabs to provide a season overview and to show different features in the season. Selection of a tab by user input may be configured to cause the display to display a respective screen associated with the selected tab.

The overview tab may show all the seasonal features that are available in the current season, which are separated into multiple sections. There may be a get pass section which appears only if the player has not yet purchased a pass for the season. There may be a pass button or user selectable area, which when selected by user input cause the at least one processor may to cause the display to the pass purchasing screen.

There may be a point earning feature section. This may have buttons or user selectable areas for all the point earning features that are available in the current season. One of the more buttons may be temporarily locked if not yet available for selection. For example a season challenge run may only be available starting from episode 3 of the current season. If a button for an unavailable feature is selected or tapped by user input received via the user interface, the at least one processor is configured to cause information to displayed indicating when the feature will become available.

In some embodiments, the at least one processor may be configured to cause the display to display information such as "!" or the like in association with the button or user selectable area if attentions is needed from the player.

There may be a reward giving feature section. This may include buttons or user selectable areas for all the reward giving features that are available in the current season. These buttons or user selectable areas may operate in a similar way to that described in relation to the points earning features section.

An information button or user selectable area may be provided in a tab which when selected will cause the at least one processor to cause the display to display a help centre's article about the current season.

A battle pass tab may be provided for the battle pass feature. This tab may be provided only if a battle pass is available for the current season. This tab may be accessed through a battle pass button or user selectable areas in the overview tab. Rewards may will be unlocked through this feature as the player accumulates points during the season. The battle pass feature is broken down into "episodes". A player can only earn all the rewards up to the end of the current episode. The player can only continue the progress when a new episode become available. A player can see the progress of their friends and team members here and/or elsewhere.

A challenge tab may be provided for challenges. The challenges may be daily challenges or missions or any other challenge.

The tab may only appear if the challenges are available for the current season.

This tab may be accessed through a challenges button in the overview tab. In some embodiments, the challenges may comprise challenge runs and/or time trial challenges. The challenges may only become available at a later stage of the season in some embodiments. The timing for the different types of challenges may be different. One or more of these features may optionally only be available if the battle pass has been purchased. The challenge may appear to be locked until the pass is purchased and the challenge has become available in the season.

The dock or other building of the base may be associated with a season. The dock may have 3 different states. There may be an empty state—when there is no live season and no tease period for a next season. If the dock is selected by user input information may be displayed to indicate that a new event is coming soon. There may be an active state for a season tease (foreshadowing). During the season tease period, if the dock is selected by user input, this will trigger a tease popup. There may be an active state for live season. During the active state for the live season, if the dock is selected by user input, this will trigger the at least one processor to cause the season menu to be displayed. Reference is made to FIG. 30*e* which shows an example of a dock of the base when a season is live. FIG. 30*f* shows an example of dock of the base in a season's tease period.

The dock may look different in each season. Each season may have its own dock appearance that matches the narrative or theme of the season.

The points may be earned from core loop features. The points may be earned from the mini-games previously described. The ammo throwing mini game in the boss runs may give out points as a reward and optionally also XP. Points may be earned by smashing a certain type of crate in a boss run. Points may be earned by defeating one or more bosses. For example, gold and sapphire bosses which only appear when all power gems giving gangs are defeated may be defeated to earn points. Points may be earned by selling items in the silo and/or other building of the base. Step points and/or certain ingredients such as Wumpa fruit may be converted in points. Extra points may be earned by wearing particular costumes. This is described in more detail later. Points may be earned from season features.

Some ways of earning points may not always be available in a season and/or may be unavailable during part of a season. However it should be appreciated that in some embodiments, one or more of these events may be always available. For one or more features available in a season, there may be a shortcut button or user selectable area in the season menu's, for example in an overview tab. Some examples of these events which may be available in a season are given below.

Battle pass platinum boss—beat the boss to earn points. This may only be available for those who have purchased the battle pass.

Seasonal challenge run—available for battle pass owner only. Complete the challenge to earn points.

Time trial daily challenge—available for battle pass owner only. Complete the challenge to earn points.

Mission—complete tasks to earn mission tokens. With enough tokens the player will receive points as a reward.

Seasonal gang—beat the gang to earn points.

Step point crates in collection runs, smash the crates to earn extra steps, which can then be converted into points, The players may also unlock the seasonal rewards with points during the season from the battle pass. The battle pass owner will be able to unlock both free and premium rewards with points. The battle pass is divided into multiple "episodes" which will become available one by one during the season. The player can only unlock rewards up to the last reward in all available episodes.

With some missions, the players need to complete different tasks to earn rewards. Information about the tasks may be displayed. Information about the reward associated with each task may be displayed. The rewards may be used to fill up a reward meter. The reward meter may provide points or unlock a next round of the mission. A mission may have a defined number of rounds. The rounds may be associated with time availability—that is when they are scheduled to be potentially available. A next round may only be accessed if the previous round has been successfully completed. A mission may be associated with a time limit after which the mission is no longer available. The mission may have a start time and an end time. Each round may be scheduled between the start and end times. There may be time gaps between the different rounds. Different tasks may be associated with different amounts of points. This may be dependent on the difficulty of the task. A difficult task may be flagged as such to the player. Count down information may be displayed indicating when a next mission is available. Count down information may be displayed indicating how long until the end of the mission.

A separate building may be provided in the base for missions. This may be represented by a mission board. The player is able to access the missions via the mission board. Reference is made to FIG. 30*d* which shows the mission board 905 of the base. The mission board is placed near the dock and works as a shortcut to the mission menu. The mission bard may be on or off depending on if a mission is available or not.

The mission board may be a shared access point for two or more different types of mission. When either type of mission is available, the mission board appears in an ON state. When tapped or otherwise selected by user input, the mission menu for the mission last exited is displayed. This will depend on which menu the player last exited from. The menus' state is stored to support this feature. When both types of mission are not available, the mission board will appear in the OFF state. Tapping on (or otherwise selecting)

the OFF state mission board may send the player to a mission screen with empty state.

The mission board may have information which is displayed to indicate that the new mission feature has become available and that new feature has not yet been checked out by the player. The mission board may have information which is displayed to indicate that a task in the mission can be completed A player will see his point contribution to the current team. This may be in a team features. This may also be shown in a building in the base for points or trophies. The appearance of the building may change in dependent on the number of points or trophies.

Figure 31A:
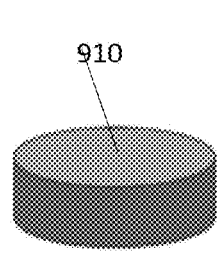
FIGS. 31a to 31d show a trophy building of the base during a season.
Figure 31B:
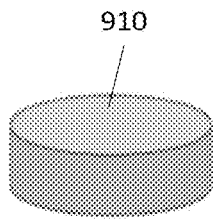
Figure 31C:
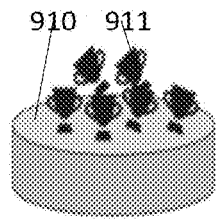
Figure 31D:
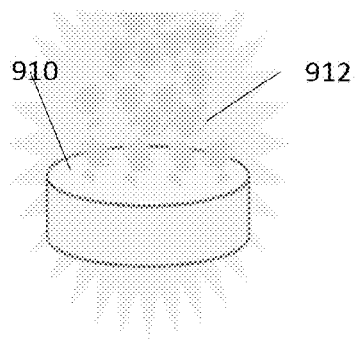

FIG. 31a shows the trophy building in a state where there is no season. FIG. 31b shows the trophy building when the season has started and the building is empty. The building has a different appearance in FIG. 31b as compared to FIG. 31a. FIG. 31c shows the trophy building with some trophies 911 during the season. FIG. 31d shows the appearance of the trophy building 910 when the player goes back to the base after earning some trophies. A visual indication 912 is provided to indicate the filling up of the trophy building with trophies. Depending on the number of trophies earned, the building may be updated to the next level. The trophy building will go back to the state of FIG. 31a at the end of the season.

When a player leave the team, the points already contributed to the current team will not carry over to the new team. The trophy building in the base will change to reflect that the player has gone back to 0 points. This may also be the case at the end of the season. The player will accumulate points even when the player is not in a team. As soon as the player joins a team, those points contribute to the new team's points.

Figure 31E:
FIG. 31e shows a screen with information about the different trophies acquired by the player.

In some embodiments if the user taps on the trophy building, the at least one processor is configured to cause the trophy screen shown in FIG. 31e to be shown. This will show the event name and the countdown timer 913a. The screen shows the total trophies 913b that has been earned since the beginning of the current season/event and a break down 913c of where they are earned form. The screen may show where 914c highest end rewards for the current event that can be earned. A button 914d or user selectable area that links to the current season or event screen is provided, The points earned can be used both for the team contribution and the battle pass at the same time. The points can be used on both places without affecting the other. Earned points will charge up the reward meter in the battle pass. Those same points will go towards to the points total of the team. The battle pass will be divided into multiple sections, and will become available on specific date. Points which are earned when there is no available section will not be counted in the battle pass. After a section is available for the player, any earned points will be stored temporarily (and optionally not displayed anywhere until the player access the battle pass). When the player access the battle pass, these temporarily stored points will be counted into the battle pass.

The reward meter is charged up by the points and the reward meter can be used to unlock rewards in the battle pass.

There may be one or more events between seasons which may make use of the earned points.

At the end of the season, X mins may be allowed for the event to be concluded. X may be any suitable value such as 10 to 15 minutes. For those players who have already started a team run, they will continue their run, and the points earned in these runs will count for the season. However the team run feature will turn off, so a new team run cannot be started during this X mins. This may also be the case for boss runs, challenge runs or any other features which has been started but not completed. In the case of a completing challenge run, there will be no retry option.

For the non season features, the player can start runs, pick costume and play the mini game as usual. If the run ends within this X minutes, the points earned will be counted for the current season. Otherwise the points will be counted for next season/event.

A widget may be provided when a season is live. The widget may be displayed on the screen for the base. The widget may provide information about the remaining time of the season. Alternatively or additionally, the widget may provide information about a current season. In some embodiments, the widget may be displayed before the season starts as a season tease. The widget may for example say "soon" or a similar phrase. The widget may indicate that the season has ended during the wrap up period which is described in more detail later.

The at least one processor may be configured to trigger a season tease popup when the player is in the base for the first time after the tease period has started. The season tease pop up may comprise one or more of a countdown to the start of the upcoming season, a season name, and information of rewards for the upcoming season. The pop up may optionally have a button to access the battle pass purchase screen only if such a pass has not been purchased yet. The pop up may optionally have a button to access the team leader board, where the player can see their preseason points accumulating. The pop up may optionally have a button to access a join team screen.

The at least one processor may be configured to trigger a season start popup when the player is in the base for the first time after the tease period has started. The season start popup may be accessed via the widget. The season start pop up may comprise one or more of a countdown to the end of the season, a season name, and rewards for the season. The pop up may optionally have a button to access the battle pass purchase screen only if such a pass has not been purchased yet. The pop up may optionally have a button to access the season menu.

Tapping on the widget or the dock during wrap will trigger a wrap up popup.

After the wrap up, the season will be concluded, the at least one processor is configured to cause an end of season pop up to be displayed. This end season pop up may be displayed when the player is in the base for the first time after the event is over.

If the player belongs to a team, the pop up may comprise reward information. This may show one or more of information if the team get promoted to the next league, remain in the same one or demoted, a final rank of the team in the season and the rewards for the rank. The pop may have a reward button which when selected by the player causes the team reward to be provided. The pop up may be prevented from closing unless the rewards are claimed.

If the player does not belong to a team, the pop up may indicate that that did not get a reward as they did not belong to a team and/or a join team button which when selected takes the player to the join team screen.

Figure 30A:
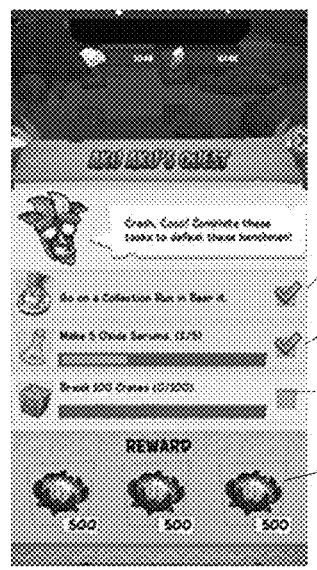
FIG. 30a shows a screen of the progress of a set of tasks of a challenge.
Figure 30B:
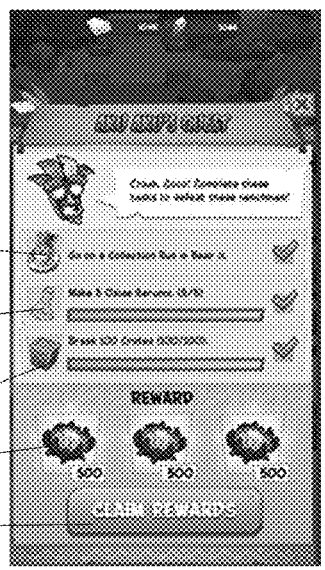
FIG. 30b shows a screen when all of the tasks have been completed.
Figure 30C:
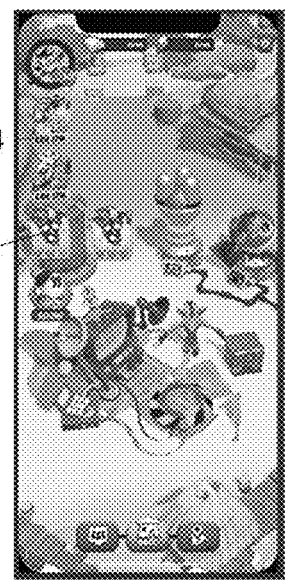
FIG. 30c shows a screen of the base with a widget associated with the challenge.

Reference is made to FIGS. 30a to 30c which show an example of a challenge or quest. FIG. 29a shows example challenge which comprises three tasks 900a, 900b, and 900c. In other embodiments, other challenges may comprise a different number of tasks. The number of tasks may be one or more.

The at least one processor is configured to determine for each task, the progress of each task. The at least one processor is configured to determine when the challenge is started and to determine the progress of each task after that time. In other word, actions of a player prior to the start of the challenge will not count as progress towards the completion of the challenge. For example, for a task that a player completes a particular collection run, the at least one processor is configured to determine if the collection run has been completed and if so to store information indicating that the task has been completed. Where the task is to make a given number of a particular serum, the at least one processor is configured to maintain a count on how much serum has been made and/or how much serum is still be made. Where the task is to break a given number of crates, the at least one processor is configured to maintain a count of the number of crates which have been broken and/or how many crates are still to be broken.

As shown in FIG. 30a, the at least one processor is configured to control the display to display progress of each of the tasks. The first task 900a which is to go only a collection run in a particular world has been completed. The second task 900b which is to make 5 batches of a particular serum. The at least one processor has determined that two batches have been made and is configured to control the display to display this information. This may be shown using a progress bar. The third task 600c is to break a given number of crates. The at least one processor has determined that 10 crates have been broken and is configured to control the display to display this information. This may be shown using a progress bar.

The display may be controlled to display the rewards 901 which will be obtained when the challenge is completed.

Reference is made to FIG. 30b. The at least one processor is configured to determine that all of the tasks have been completed and is configured to control the display to display information indicating this. In this example, the tasks which are completed are shown with a tick and/or with a completed progress bar. The at least one processor is further configured to control the display to display a user selectable option 902. When the user provides input via the user interface to select this options, which may be provided by a button or user selectable area, the user is able to claim the rewards provided by the completion of the challenge. The user will then be able to use the claimed rewards. The at least one processor may be configured to cause the reward option to be displayed on the display only when the tasks have all been completed.

In some embodiments, the at least one processor may be configured to cause the screen shown in FIG. 30b to be displayed when the tasks are completed. For example, if the player is in the base, the screen shown in FIG. 30b is automatically displayed.

In some embodiments, the at least one processor may be configured to prevent the user from navigating to a different screen to that shown in FIG. 30b unless the user has collected the rewards for completing the challenge.

Reference is made to FIG. 30c which shows the base. As can be seen widgets are displayed.

A widget 903 for a challenge may be provided. When this widget is selected by user input, this may provide the screen such as shown in FIG. 30a. Alternatively, or additionally the widget may comprise summary information indicating which tasks have been completed. The widget may be displayed at the beginning of a challenge and when selected this may start the challenge. In some embodiments, a challenge may be automatically started or may be started in any other suitable manner. The widget may be displayed differently depending on whether the associated challenge is available or not. In some embodiments, the widget may be removed from the display at the end of a challenge. The appearance of the widget may be modified to glow and/or bounce when the challenge has been completed.

The widget 904 associated with another challenge or event is shown with time information. This time information may indicate the amount of time remaining to complete the challenge. Alternatively or additionally the time information may indicate the time until the challenge is available.

Some embodiments may alternatively or additionally have a counter displayed on the display indicating the progress of a respective task.

The example challenges may be daily challenges. In one example of a daily challenge, the player is provided with a day to complete the one or more tasks of a challenge.

In another example, there may be no time limit for completing a daily challenge. However, no new daily challenge may be provided until a current challenge has been completed.

A new challenge may be provided every day provided that the player satisfies any associated conditions to receive such a challenge. If a player completes the daily challenge for n consecutive days, then the player may earn extra rewards. The player will earn extra rewards if the challenge is completed and the challenge has been completed for a number of consecutive days. If the player fails to complete a challenge, the rewards may be lost. The extra rewards can be claimed when a challenge has been successfully completed or rolled over to the next challenge.

If a player has an uncompleted challenge but continues to play the game, the player may continue with the incomplete challenge.

If the player has not played the game for a given amount of time, the incomplete challenge may be discarded. The player may be provided with a new challenge. The given amount of time may be any suitable amount of time. For example the given amount of time may be a week.

In the above example, the challenge is a daily challenge. However, in other embodiments, the player may be provided with a different frequency of the challenges. The different frequency of challenges may be more than a day or less than a day.

In some embodiments, there may be an amount of time to complete the challenge. The amount of time to complete the challenge may be different to the regularity of the challenges.

For example the challenges may be provided daily but the user has only for example, 3 hours (or any other suitable amount of time) to complete the challenge. This may be defined from when the challenge first starts.

In another example, weekly challenges may be provided but those challenges may need to be completed within a given time frame. For example a weekly challenge may be provided at the beginning of every weekend and that weekly challenge needs to be completed by the end of the weekend.

A challenge may have one or more trigger conditions. When the one or more trigger conditions are satisfied, the challenge may be provided.

In some embodiments, there may two or more different types of challenge. In some embodiments, only one challenge may be active at a time. For example, there may be daily challenges and other types of challenge. No daily challenge may be available while the player is doing a different challenge. In other embodiments, a player may have two or more challenges which are yet to be complete and which are ongoing at the same time.

In some embodiments there may be a task pool and the one or more tasks for a challenge may be selected from the task pool. The tasks may be selected randomly from the task pool. There may be one or conditions associated with the selection of a task. Each task may be associated with one or more power gem PG requirements. The task may be associated with a minimum power gem requirement and/or a maximum power gem requirement. The task can only be selected if the number of power gems which the player has satisfies the tasks one or more power gem requirements. For example:

Task min PG requirement<Player's PG<max PG requirement

In some embodiments, the tasks may fall into different categories. In some embodiments, there may be a limit on a number of tasks from a given category. The limit may be 1 or any other suitable number One or more tasks may have one or more other conditions. The condition associated with a task needs to be fulfilled in order for that task to be selected. If a task has special condition, it will also need to be fulfilled to be picked. The at least processor is configured to determine if a task has been completed. The at least one processor is configured to keep track of each task and update the progress of each task.

Each task has a reward. The rewards provided by a challenge may comprise the rewards from each of the selected tasks.

The tasks may be selected from one or more:

Do a collection run on specific land—It will be marked as completed when the player ends the run by going to one of the level's exits. Quitting runs through an end game purchase or a pause menu does not count as a successful completion of the task.

Make x specific serum—It will be marked as completed when it is produced and collected from the production building. X can be any suitable number Defeat a specific boss/henchmen—It will be marked as completed when the boss is defeated, quitting run without defeating the boss does not count as a successful completion of the task.

Earn x Power Gem—It does not matter which boss or henchmen has been defeated to earn the power gems. X can be any suitable number Upgrade a specific production building in the base—It will be marked as completed when the building is upgraded with new type of items becoming available. Buying a new production slot does not count as a successful completion of the task.

Buy a new slots for a specific lab or coop—It can be additional production slots in any labs or chicken coop.

Repair a specific building in the base—Fix a building that is in its ruined or basic state. It can be any building in the base, including labs, farming buildings and specialized buildings.

Collect x chill berries from a specific land/Island—It can be collected over multiple runs. A counter goes up as soon as a berry is collected. Dying or quitting a run will not affect this counter. If a land/island is specified in the task, the counter will only count those that are collected in the land/island. X can be any suitable number Collect x free offers from vending machine—Collect a free offer from the in game shop. X can be any suitable number.

Join a Team—this task will only be given if the player is not in a team. As long as the player joins a team this task is completed. Whatever happens next (quit team/get kicked) will not undo this task.

Play team run x times—Counter increase as soon as a run has started. X can be any suitable number.

Collect x rewards from battle pass or any other pass—Both free and premium rewards may count. E.g. tier 1 has 1 free and 1 premium reward, collecting these will be counted as 2 rewards. X can be any suitable number Earn a total of x Trophies or points—Start counting once the challenge has started, it can be earned from any features. X can be any suitable number Complete a specific time trial level—Regardless of the time result or failure to get to the end of the level, it will count as long as the player has started the level.

Complete a specific challenge run level—Regardless of the run result (fail to smash all crates or get to the end of the level), it will count as long as the player has started the level.

Break x crates—it counts all types of crates in any run. X can be any suitable number Get x Wumpa fruits—it counts Wumpa fruits collected in any run. Wumpa fruits rewarded from level up, buying packs or any other situation that is outside of a run will not count towards as a successful completion of the task. X can be any suitable number When a new challenge is available, the at least one processor is configured to determine if the player is currently playing the game. If so, the at least one processor is configured to display a pop up indicating the availability of a new challenge. This pop up may be displayed when the player first goes to the base after the new challenge is available. If the player is not currently playing the game, the at least one processor is configured to cause the pop up indicating the availability of a new challenge to be displayed when the player provides an input to launch the game.

Figure 22A:
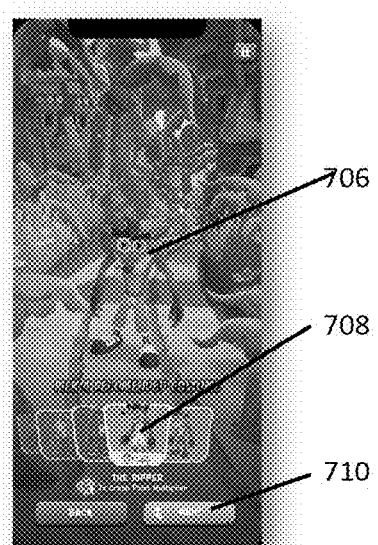
FIG. 22a shows a screen with an option to select a costume for the character.

Reference is made to FIG. 22a. In some embodiments, the player is able to select for his character 706 one of a plurality of different costumes 708. In some embodiments, if a character wears a specific costume for a specific battle run, the player may be able to earn one or more additional points or rewards. In some embodiments, the one or more additional points or rewards may be clan points. In some embodiments, the user is able to scroll via the user interface through a plurality of possible costumes and select one of the costumes by providing user input via the user interface. This selection may be by clicking on an icon associated with desired one of the costumes or by otherwise selecting the desired possible costume.

In some embodiments, a player may be able to use one of these different costumes in the team run described previously. In some embodiments, a least some of the points acquired during a team run may be used to acquire new costumes. A costume may be provided as a skin.

In some embodiments, a costume may provide one or more bonus or no bonus at all. The bonus may be to provide a resource multiplier, a trophy or points multiplier and/or a protection or mask bonus. The mask bonus may be a so-called Aku Aku mask bonus. These bonuses provided may be a property of the costume.

A resource multiplier bonus is a fixed percentage multiplier which affects the number of ingredients collected from ingredient crates found in collection runs. In some embodiments, the bonuses may apply only to particular ingredients. This means that one or more ingredients will by multiplied when the associated costume is worn and one or more other ingredients will not be multiplied.

When players have a costume with a resource multiplier bonus and go on a collection run, particular resources will be multiplied by this percentage. These bonuses do not change and are may be associated with the rarity of a costume. A numbers of ingredients awarded at the end of a level may be rounded upward.

In one example, a player goes for a collection run. At the costume selection screen, the player selects a costume which has a multiplier bonus of 80% for a particular ingredient obtained by smashing a particular type of crate. Each time the particular crate is smashed on that run, that ingredient number is multiplied by 1.8 (100%+80% (costume bonus)).

In other embodiments, the multiplier may be applied to all collected ingredients.

Different costumes may be associated with different multipliers.

A trophy or points multiplier bonus is a fixed percentage multiplier which affects the number of trophies or points awarded. This may be associated with battle runs. This bonus applied by a particular costume will be dependent on the boss. For example, a particular costume will provide the trophy or points multiplier when a particular boss or enemy is battled. The points or trophies obtained from one or more of defeating the boss, from the weapon-throwing minigame and picked up from trophy or points crates may be multiplied.

A given costume may provide the trophy or points multiplier for one or more different boss types. This bonus may not be provided elsewhere. The numbers of trophies or points awarded at the end of a level may be rounded upwards.

In one example, a player goes for a battle run. At the costume selection screen, the player selects a costume which has a multiplier bonus of 40% for a particular boss or enemy. When that bass has been defeated, the base number of points or trophies is multiplied by 1.4 (100%+40% (costume bonus)). The player may alternatively or additionally receive a number of trophies or points (based on minigame performance) when they use their weapons. These points or trophies may be multiplied by 1.4 (100%+40% (costume bonus)).

A mask bonus means that the player starts with either a normal or a gold mask at the start of a battle or collection run. A mask provides the player with protection. The gold mask provides more protection than a normal mask. Any crates associated with the mask picked up after the start of the level behave the same way as usual. The mask is upgraded to gold or if gold to invincibility level. If a player dies and is revived, they do not receive the mask bonus again. It only applies to the start of a run.

In one example, a player goes on a run. In the costume selection, the player selects a costume which provided the associated mask at the beginning of the run.

Different rarities of costumes may provide different bonus multipliers.

Figure 22B:
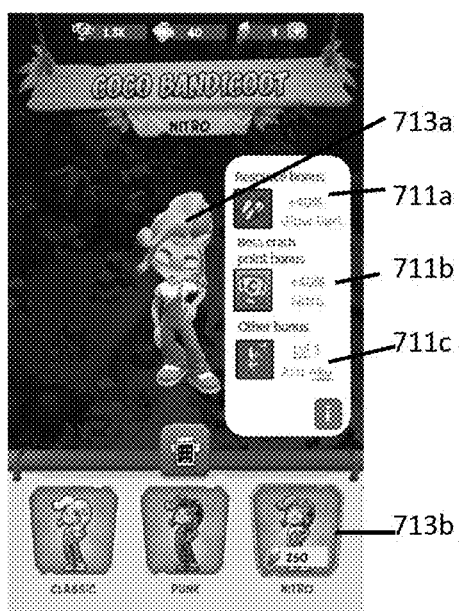
FIG. 22b shows a screen which shows the one or more bonuses provided by a costume.

In some embodiments, a player will be able to see the bonuses for costumes. In this regard reference is made to FIG. 22*b*. This may be when the player is selecting a costume to potentially use or purchase in an in game store. Each costume may be provided with information which indicates what if any trophy or points bonus is provided, what if any resource bonus is provided, and what if any other bonus (for example the mask bonus) is provided. In the example shown in FIG. 22*b*, the resource information 711*a* comprises information about the one or more resources to which the multiplier applies (if any) and the multiplier. The trophy or point information 711*b* comprises information about the one or more enemies (if any) to which the multiplier applies and the multiplier. The other bonus information 711*c* indicates if the mask bonus applies and if so the level of the mask. As shown in FIG. 22*b*, the display is controlled to display a plurality of different costumes 713*b*. In response to user input selection selecting one of the options, the selected costume 713*a* is displayed alongside the bonus information associated with that costume.

A costume may provide no bonuses or one or more different bonuses. A resource bonus may be associated with one or more different resources. A points or trophy bonus may be associated with none or one or more different bosses or enemies.

Figure 22C:
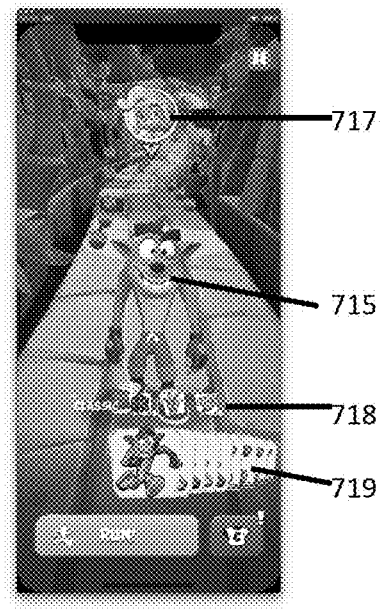
FIG. 22c shows a screen with costume recommendations for a character.

When players start a run, they can select a costume from a reel or recommendation list of 'recommended' costumes or a menu of their entire collection. The bonuses which that costume applies on that run are shown. Where a player has more than one character which they can use, their costumes and recommendations may be kept separate or combined. In this regard, reference is made to FIG. 22*c*. In this example, a player has two characters. The currently selected character 715 is shown in full with the recommended list 719 list of costumes. Information 718 about the costume bonus for the currently selected costume is displayed on the display. The player is able to scroll through this list of recommended costumes. In some embodiments, this list may instead include all the costumes of the character. Also displayed on the display is a selectable icon 717 for the player's other character. When user input is received to select this icon, the at least one processor is configured to cause the currently selected character to change to the other character. The costumes will be changed so as to be those costumes associated with the other character.

At costume selection, players are presented a number of costume options in a reel or recommendation list.

Players may have a default costume. This may be presented as a currently selected option in some embodiments.

In some embodiments, the costume options in the recommendation list have relevance to the run. For a collection run, players are recommended costumes with an ingredient bonus for the ingredients in that run. For a battle run, players are recommended costumes with a trophy bonus for the boss type in that run.

There may be a maximum of currently-owned costumes that are suggested. This may be 4. This number is by way of example only. There may be a maximum of 'for sale' costumes that are suggested after the owned costumes. This may be 5. This number is by way of example only.

The frames of costumes in the recommendation list may reflect their rarity or the size of the multiplier. For example, those provided in the recommendation list may reflect the larger multipliers.

The remaining costumes are accessible to players in a menu where they can view and select any of the costumes which they have collected.

If a players is looking at the costumes associated with a character and there is a costume associated with another character of the player which would apply bonuses in the current run information indicating this may be displayed on the display. For example, an "!" over the head of the other character may be displayed.

In some embodiments, the recommendation list may show owned costumes having a bonus for at least one of the ingredients in the collection run. If the player has two costumes which give bonuses for the same ingredient, only the costume with the higher % bonus for that ingredient may be shown (for example a costume with a 40% Glow Bark bonus eliminates a costume with a 20% Glow Bark bonus). Players are not suggested costumes that they own which have a lower bonus (e.g. 20%) for an ingredient than another that they also own (e.g. 40%) that boosts the same ingredient If there are two costumes with the same % bonus to the same ingredient, the costume with the higher Aku Aku mask bonus is selected for the recommendation list.

If there is no difference between the % bonus and the Aku Aku mask bonus, the suggested costume is the one more recently acquired.

Costumes in the recommendation list may be are ordered based on, firstly, their rarity and, secondly, the number of occurrences of the ingredient that they boost currently available on that collection run (e.g. a costume boosting nitric fungus on a collection run with 8 nitric fungus crates left and 4 glow bark crates left outranks a costume boosting glow bark).

'For sale' costumes suggested in the recommendation list for the collection runs have a bonus for at least one of the ingredients in the run and are currently on rotation at the store.

All Costumes currently on rotation at the store which provide a bonus to ingredients on the current collection run are shown in the recommendation list.

Unlike owned costumes, where only the costume with the highest bonus for an ingredient is shown, 'for sale' costumes that boost ingredients at different percentages may be shown (e.g. a player could be recommended an epic costume that boosts glow bark by 40% and a rare costume that boosts glow bark by 20%).

Owned costumes may be ordered based on, firstly, their rarity and, secondly, the number of occurrences of the ingredient that they boost currently available on that collection run (i.e. a costume boosting nitric fungus on a collection run with 8 nitric fungus crates left and 4 glow bark crates left outranks a costume boosting glow bark).

Owned costumes suggested in the battle run recommendation list have a trophy bonus for the boss type in the run.

In some embodiments, only one owned costume is suggested to a player—that with the highest relevant boss type bonus and the highest Aku Aku mask bonus.

If the player has two costumes which provide bonuses for the same boss type, only the costume with the higher % bonus to that boss type is shown (i.e. a costume with a 40% nitro type bonus eliminates a costume with a 20% nitro type bonus). If there is a costume which provides a higher ranked Aku Aku mask bonus, both are shown (e.g. a 40% nitro type bonus with no Aku Aku mask and a 20% nitro type bonus with a base Aku Aku mask would both be shown)

If there are two Costumes with the same % bonus for the same boss type, the costume with the higher Aku Aku mask bonus is selected If there is no differentiation between % bonus and Aku Aku mask bonus, the suggested costume is the one more recently acquired.

'For sale' costumes suggested in the recommendation list for the battle run may have a bonus for the enemy in the battle run and currently on rotation at the store.

In the runner part of the game, the costume that's shown in the first slot in the costume reel is the player's current costume or "profile costume". The costume reel is populated with 1: the default costume, 2: recommended costumes, 3: costume that are available to purchase. In some embodiments, no more than 10 costumes should be shown in the costume reel. This number is by way of example only.

Figure 22D:
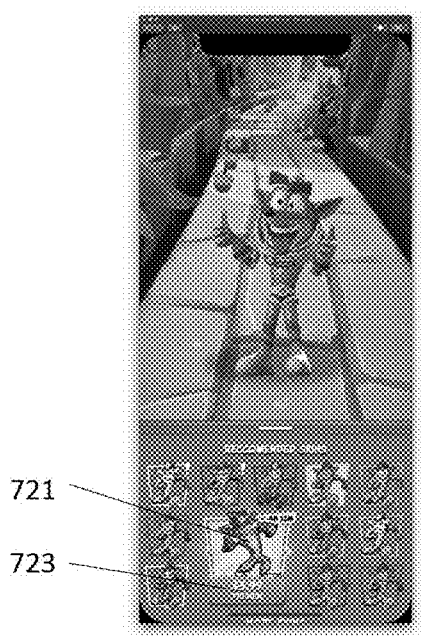
FIG. 22d shows a preview of a purchasable costume.

When a purchasable costume is selected in the costume reel, it triggers a button swap; The "RUN!" button is swapped with the "PREVIEW" button. Tapping the PREVIEW button triggers the costume overview. This is shown in FIG. 22d. The costume referenced 721 has been selected by user input. In response, the at least one processor is configured to cause the preview button 723 to be displayed.

Tapping a costume button triggers the costume selection menu. This option contains two sections; 1: "recommended costumes", 2: more costumes". The "recommended" costumes are tied to the costume's bonuses as discussed previously. The costume which is selected overwrites the first slot in the costume reel, making it the runner's default costume. This can be done over and over again. The character will wear the costume that is selected in the reel when the player taps "RUN!".

A '!' or similar notification may appear on the costume button when there are more recommended costumes available. The '!' or similar notification may be provided on the character switcher when the other character has costumes providing a bonus as well.

During runs, the multipliers of players' costumes may not change gameplay—other than the masks provided at the start of a run. However, the effect of the multiplier can be seen on the ingredients or the trophy or points counter which appear when a crate is collected. For ingredients/trophies that are boosted, an icon, when it appears may have a glow behind may be provided or any other suitable indication. In some embodiments, the glow may correspond in colour to the rarity of the costume which is providing a bonus to that resource or to the trophies being collected.

At the end of a run, players will see the resources or trophies which they have collected, prior to multipliers being applied followed by an effect which applies the multiplier. For example, the words "costume bonus" could appear over the resources which were multiplied and a new number (the base number multiplied by the costume bonus) will remain. This may be in a different colour.

Players may be able to obtain costumes from various places in the game and/or by buying them in the in game store, buying them through offers or acquiring them in a battle pass. The player may be able to obtain a costume by defeating bosses in battle runs, completing time trials and/or by completing challenge runs. Costumes may be provided after a set of criteria is reached. For example, this may mean a certain number of power gems attained will grant a costume or a certain combination of time trial relics or challenge run jewels. When the criteria for a costume is reached, a popup displaying the costume may be presented to players as soon as they return from core gameplay. The newly acquired costume may be displayed on the when the player return to base.

Figure 23A:
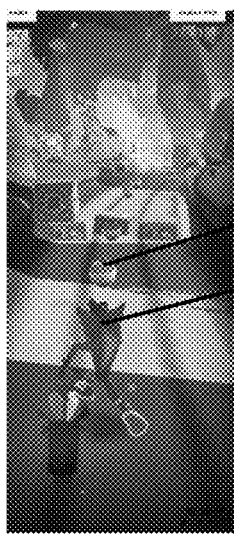
FIGS. 23a to 23c show a character in a battle run as the character approaches the enemy.
Figure 23B:
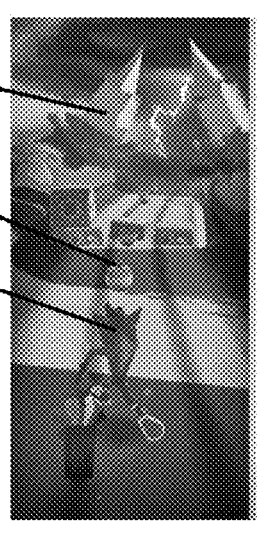
Figure 23C:
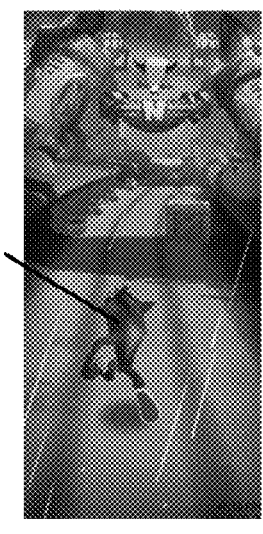

Reference is made to FIGS. 23a to 23c which show various screens from a battle run. In a battle run, there may be at least a part of the battle run which is similar or the same as a collection run. This is shown In FIG. 23a. The character 712 can run and collect resources 714. There is no interaction with the enemy in this part of the battle run. This may be the beginning part of the battle run.

In FIG. 23b, the character 712 is still able to run and collect resources 714. However, at least one processor causes the display to display one or more visual indications 716 are provided to indicate to the player that they are about to enter the zone in which they will encounter the enemy. However, in FIG. 23b, the character is not yet in that zone.

In FIG. 23c, the character 712 has entered the battle zone. In the battle zone, the character may be able to use one or more weapons against the enemy, in response to user input received via the user interface. In some embodiments, the at least one processor determines if the character has got within a certain distance of the enemy and in response to the determination, the character is able to use one or more weapons against the enemy. If the at least one processor determines that the character has not got within a certain distance of the enemy, the character is unable to use one or more weapons against the enemy.

In some embodiments, the at least one processor is configured to cause the enemy to use one or more weapons against the character. In some embodiments, the at least one processor is configured to cause the enemy to use one or more weapons against the character before the character is able to use one or more weapons against the enemy.

In some embodiments, when in the battle zone, the character has to dodge attacks from the enemy. The character may be able to dodge attacks from the enemy by moving between lanes. This is controlled by the at least one processor is in response to the user input received via the user interface.

In some embodiments, if a character is able to hit the enemy at a particular time, the at least one processor causes the player to earn a reward. This may be considered as a reward for a skill shot. If the character hits the enemy with ammunition or with a weapon at the particular time, the player may be awarded extra points and/or extra damage may inflict on the enemy.

As mentioned previously, different bosses or enemies may have different powers or levels. This may mean that an enemy at a higher level may be harder to defeat than an enemy at a lower level. For example an enemy at a lower level may be hit at any time by the character, once the character is in range of the enemy. A higher level enemy may have a forcefield. When the forcefield is up, any attacks from the character will bounce off the force field. However, the forcefield will lower at certain times allowing the character to attack. The at least one processor may be configured to determine when an attack is made by a character if the force field is up. In response to determining that the force field is up, the at least one processor is configured to determine that the enemy is not damaged. In response to determining that the force field is not up, the at least one processor is configured to determine that the enemy is damaged and by how much.

In some embodiments, when an enemy is at a lower health, the attacks provided by that enemy may speed up. The health of an enemy will decrease in response to successful attacks on the enemy by the character. When an attack is made, the at least processor is configured to update the health of the enemy. When the health is below a threshold level, the enemy is defeated.

In some embodiments, the player will be able to battle with the enemy at the end of the battle run. If the at least one processor determines that the enemy has been defeated by the player, the at least one processor is configured to provide the player with a game reward. The at least one processor may be configured to cause the character to return to the base. In the event that the player is unsuccessful, the at least one processor may be configured to cause the character to returned to the base or the player may be able to replay at least a part of the battle run, This replaying may require the payment of in game currency in some embodiments, the watching of an advertisement, the satisfying of one or more game criteria and/or the use of one or more of one or more resource, one or more items and one or more reward items. This may be as previously described.

Figure 24:
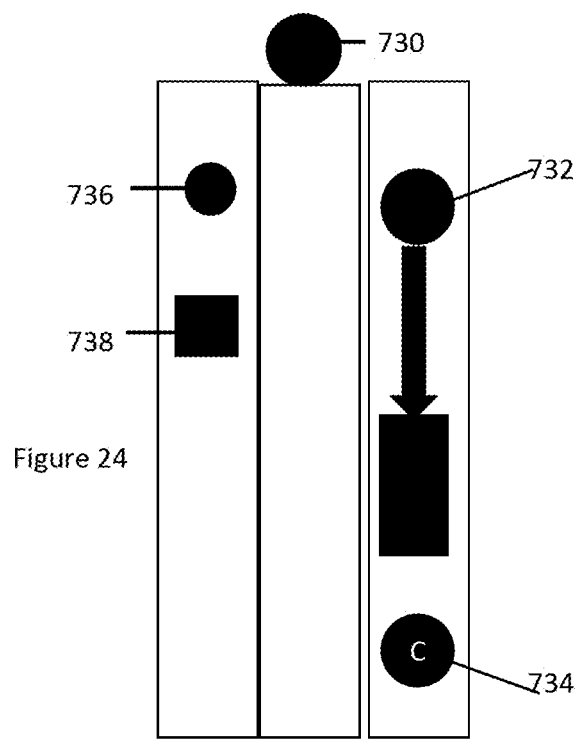
FIG. 24 shows an example of an enemy attacking the character.

Reference is made to FIG. 24 which schematically shows an enemy 730.

The at least one processor may be configured to cause the enemy may throw larger shots 732 at the character 734. The effect of the larger shots may be dependent on the enemy. If the character collides with the larger shot, at least one processor may be configured to cause the behaviour of the character may be altered and/or the character may lose a life. For example, the character may move more quickly and become harder to control. This may make the character more likely to hit an obstacle.

In some embodiments, the at least one processor may be configured to cause the enemy to alternatively or additionally throw smaller shots 736. The smaller shots may vary in in speed. The character may be able jump over and/or slide under the shots. This may be an alternative to moving to a different lane. The smaller shots may explode if they hit larger obstacles 738. The smaller shots may smash crates.

Figure 25:
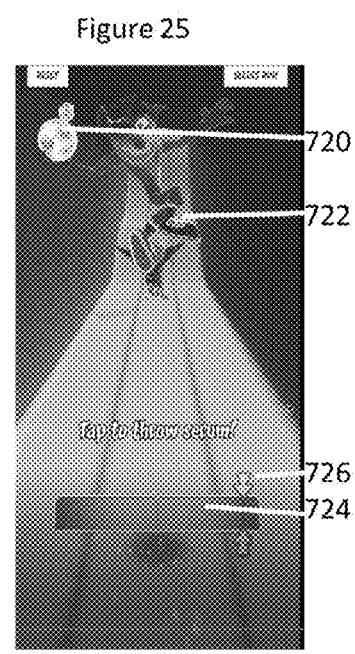
FIG. 25 shows an example of a mini game provided at an end of a battle run.

In some embodiments, a mini game may be triggered to attack an enemy. This mini game may be triggered when the enemy is about to be defeated, in some embodiments. An example of a mini game is shown in FIG. 25.

In this mini game, the character 722 is about to throw serum 720 at the enemy. A scale 724 is provided on the screen. A marker 726 moves up and down the scale. The marker is stopped from moving when the user taps the user interface. The point at which the marker stops on the scale will determine what if any reward the user is provided. In some embodiments, the user is provided with costume points and/or extra points. In some embodiments, costume points may be used to purchase a costume such as described in relation to FIG. 22*a*.

In some embodiments, at least one processor may be configured to use the point at which the marker stops on the scale to determine the strength of the attack on the enemy.

In some embodiments, the reward provided may comprise a reward for the group or clan of players to which the player belongs.

In some embodiments, the player may be provided with two or more different rewards for playing mini game. One or more rewards may be for the player and one or more reward may be for the clan or group of players to which the player belongs.

It should be appreciated that different mini games may be associated with different enemies or different types of enemy.

Figure 18:
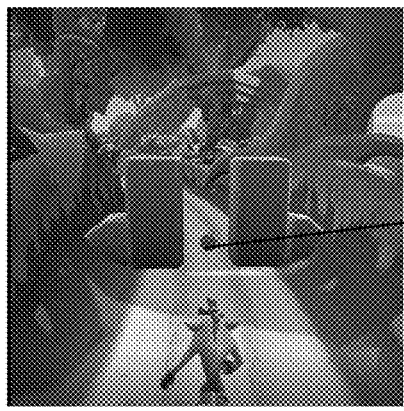
FIG. 18 shows an example object usable by a character in the game.

Reference is made to FIG. 18. In this arrangement, the at least one processor may be configured to cause the character to throw an object 700 at an obstacle in response to user input received via the user interface to control the character. This object may be any suitable object. This object may act as a missile. In some embodiments, this object may be referred to as boom berry. When the object is thrown against the obstacle, the at least one processor is configured to determine the action that that the object has with respect to the obstacle. For some obstacles, the obstacle will be removed, or the object is forfeited. For some obstacles, the object may bounce off that obstacle. The object may then return to the user to be reused by the user against one or more other obstacles. The object may bounce off an obstacle in some embodiments.

In some embodiments, there may be a limit as the amount of times the object can be used against obstacles. The at least one processor may be configured to determine the number of times the object has been used or a remaining number of times the object can be used. In response to determining that the object has been used a threshold number of times or a remaining number of times the object can be used has reached a threshold number of times, the at least one processor may be configured to remove the object from the collection run.

In other embodiments, there may be no limit as to the number of times, the object can be used against obstacles.

In some embodiments, the object may be associated with an amount of power. Each time the object is used, the power may be reduced. When there is no power left, the object may be no longer usable. The at least one processor may be configured to determine a remaining power or a used power each time the object has been used. In response to determining that the remaining power or a used power has reached a threshold, the at least one processor may be configured to remove the object from the collection run.

In some embodiments, the amount of power required to remove an obstacle may be dependent on the obstacle. In other embodiments, a fixed amount of power may be required to remove an obstacle.

In some embodiments, the object may be removed from the game area, depending on the object which has been hit.

In some embodiments, the boom berry may move along a lane. This may be the lane in which the character was located when the boom berry was thrown.

In some embodiments, the boom berry may be thrown against an object which breaks up when hit by boom berry. In some embodiments, after the boom berry has hit an object which is broken up, the boom berry continues along its path. If the boom berry hits one or more further objects which break up when hit, then one or more of those further objects may be broken up. The boom berry may continue until it hits an object which causes the boom berry to break up or to bounce back to the character. The at least one processor may be configured to control the boom berry in dependence on one or more obstacles in the lane of the boomberry.

In some embodiments, in order to complete a run, the player may be required to use one of more of these objects. There may for example be one or more obstacles which have to be removed and which can only be removed by one or more of these objects.

In some embodiments, one or more of these objects may be used against an enemy. For example, one or more of these objects may need to be used against an enemy before an item is deployed against the enemy. In some embodiments, the enemy may not be defeated unless at least one of these objects is used in conjunction with one or more items.

Figure 19:
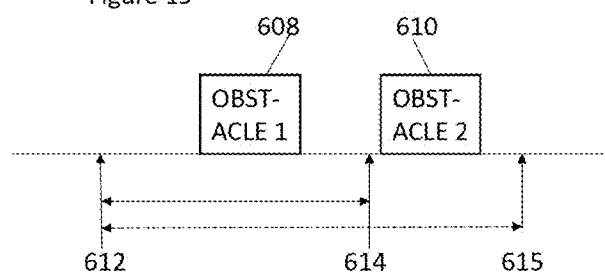
FIG. 19 illustrates the control of a movement of a character with two closely spaced obstacles.

One technical problem with playing games on a device with a limited touch screen area is the difficulty in supporting complexity in the game with a corresponding complexity of user input. This is illustrated in FIG. 19.

Consider the example of the runner game previously described. The character is controlled to move along a path. The path may be provided with a number of different obstacles 608 and 610. The character may be controlled to on one or more of: go around an obstacle; go through an obstacle: go over an obstacle: go under an obstacle; or to remove the obstacle.

A technical problem may arise, particular where the character is controlled by a user touching a touch screen of a limited size and where two or more obstacles are relatively close together. For example, the user input may control the character to perform a particular action to deal with one obstacle and the completion of that action may result in the character being unable to successfully deal with the next obstacle. This action may be controlled by a first user input.

Consider the following scenario, a first user input is used to control the character to perform a slide to hit a first obstacle to remove that obstacle. This starts at the point indicated by arrow 612. At the end of the slide the character may become upright again. This is indicated by arrow 614. If there is a further obstacle 610 close to the first obstacle 608, the character may simply hit the obstacle when upright. This may result in the character losing a life or other game advantage. The user is in this scenario unable to control the character in time to deal with that second obstacle. This may depend on when the user started the slide.

Accordingly, in some embodiments, the at least one processor is configured to determine that there is an adjacent second obstacle and to extend the length of the slide so that second obstacle can be dealt with by the same sliding action. The slide is only completed when the second obstacle has been dealt with. Arrow 615 shows the point at which the slide is completed. The normal length of the slide will be the distance between arrows 612 and 614.

In some embodiments, instead of extending the length of the slide, the time for the slide is extended. The slide time may be modified dynamically after destroying an obstacle with the slide attack so that a player can hit two or more objects in a row with ease.

Figure 20:
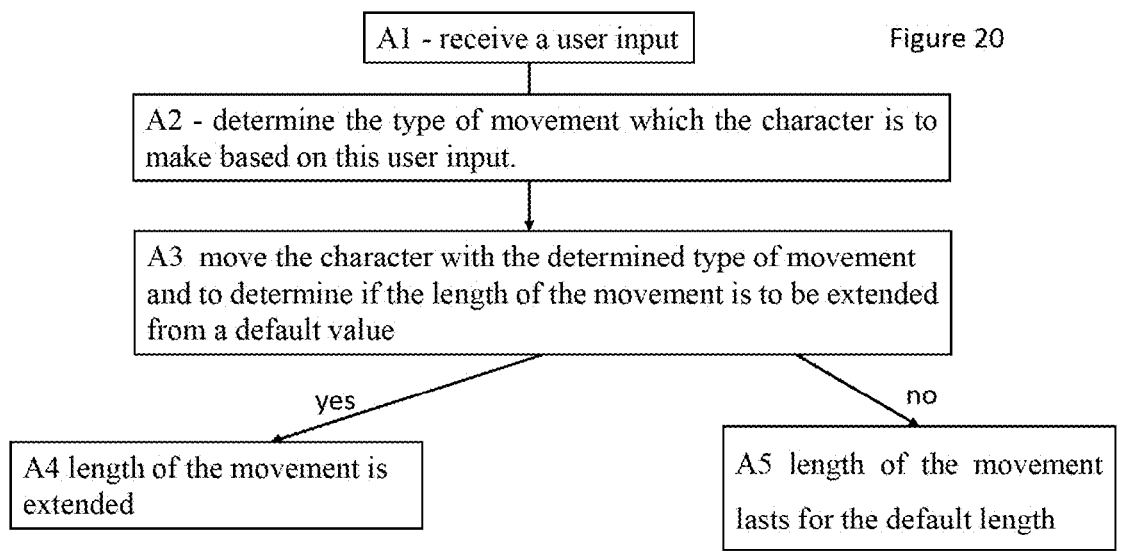
FIG. 20 shows a method of some embodiments for controlling a movement of a character.

Reference is made to FIG. 20 which shows a method of some embodiments.

In step A1, the user interface is configured to receive a first user input.

In step A2, the at least one processor is configured to determine the type of movement which the character is to make based on this first user input. This first user input may be associated with a default movement. The default movement may be associated with a default time for which the move is provided and/or a default distance covered by the movement. The default movement provided may be dependent on the first user input.

In step A3, the at least one processor is configured to move the character with the determined type of movement and to determine if the length of the movement is to be extended from a default value. This determination if the length of movement is to be extended may be based on one or more criteria being satisfied.

The determination may be dependent on a location of a subsequent obstacle or the like with respect to a first obstacle. The first obstacle is encountered by the character after the determined type of movement is started.

In an alternative embodiment, the length of time for which the action is performed is alternatively or additionally extended.

The movement provided by the input may be associated with a default time. In some embodiments, the at least one processor may be configured to determine the start of the movement. The at least one processor may be configured to start a timer. The at least one processor may be configured to determine when the game entity encounters the first obstacle. The processor may be configured to determine when the game entity first encounters the first obstacle and/or when the game object has navigated the first obstacle.

The at least one processor may be configured to determine the remaining time of the default time. Based on this remaining time, the at least one processor is configured to determine if the default time is to be extended.

The default time may be extended if there is less than a threshold amount of time remaining. This may be regardless of the presence or otherwise of a second obstacle.

In some embodiments, the default time may be extended if there is more than a threshold amount of time remaining. This may be regardless of the presence or otherwise of a second obstacle. If there is more than a threshold amount of time, this may be an indication that the user input caused a good movement. The user may be rewarded by an extension to the movement.

In some embodiments, there may be a second threshold such that default time may be extended if the amount of time left is less than a first threshold but greater than a second threshold. If there is less than a threshold amount of time, this may be an indication that the user input was started too soon. The user may not be rewarded by an extension to the movement in order to provide feedback to the user about the timing of the move.

In some embodiments, a determination may be made as to when the obstacle is first encountered. The at least one processor may be configured to determine if there is sufficient time remaining for the user to move beyond the end of the obstacle. If is determined that there is not sufficient time remaining, the extended time may be used to allow the character to move beyond the first obstacle.

In some embodiments, the at least one processor may additionally take into account the presence of a second obstacle. For example, the at least one processor may be configured to extend the default time of the movement if the remaining time of the default time is less than a threshold amount of time and the second obstacle is within a threshold time from or distance from the first obstacle In this example, the movement is associated with a default time. In other embodiments, the movement is associated with a default distance. It may be determined how far much of the default distance remains after the move has been started and the first obstacle encountered. Based on this a decision may be made as to whether or not to use the extended movement. The at least one processor may be configured to determine the remaining distance of the default movement. Based on this remaining distance, the at least one processor is configured to determine if the default movement is to be extended.

The default distance may be extended if there is less than a threshold amount of distance remaining. This may be regardless of the presence or otherwise of a second obstacle.

In some embodiments, the default distance may be extended if there is more than a threshold distance remaining. This may be regardless of the presence or otherwise of a second obstacle. If there is more than a threshold distance, this may be an indication that the user input caused a good movement. The user may be rewarded by an extension to the movement.

In some embodiments, there may be a second threshold such that default distance may be extended if the distance left is less than a first threshold but greater than a second threshold. If there is less than a threshold distance, this may be an indication that the user input was started too soon. The user may not be rewarded by an extension to the movement in order to provide feedback to the user about the timing of the input to make a movement.

In some embodiments, a determination may be made as to when the obstacle is first encountered. The at least one processor may be configured to determine if there is sufficient distance remaining for the user to move beyond the end of the obstacle. If is determined that there is not sufficient distance remaining, the extended movement may be used to allow the character to move beyond the first obstacle.

In some embodiments, the at least one processor may additionally take into account the presence of a second obstacle. For example, the at least one processor may be configured to extend the default distance of the movement if the remaining distance of the default movement is less than a threshold amount and the second obstacle is within a threshold distance from the first obstacle, In some embodiments the at least one processor is configured to use information about the default movement and information about the first obstacle and one or more subsequent obstacles. Based on this information, the at least one processor may make a determination whether or not the default movement is to be changed to an extended default movement.

In some embodiments the at least one processor is configured to determine a distance between first obstacle and one or more subsequent obstacles. Based on this determination the at least one processor may be configured to determine if the default movement is to be changed to an extended default movement. The at least one processor may be configured to determine that the character to move with the extended default movement when the second obstacle is within a threshold distance of the first obstacle.

The information which is used by the at least one processor may be stored in the at least one memory. For example, the memory may store information about the location of the obstacles and/or information about the obstacles. In some embodiments, the determination about whether to extend the default movement may depend on the type of first and/or subsequent obstacle.

If it is determined that the default distance for the movement or the default length of time for the movement is to be extended, then the next step is step A4 where the distance of the movement and/or the length of time for the movement is extended. This movement may be extended by a given distance and/or the time for the movement may be extended by a given amount.

If it is determined that the default movement (is not to be extended, then the next step is step A5 where the default movement lasts for the default length and/or default time.

In some embodiments, by using an extended default movement instead of a default movement, the character may avoid hitting or other interacting with a second obstacle. That second obstacle may be relatively close to the first obstacle.

The default movement and the extended default movement may be the same type of movement.

The extended default movement may be dependent on information associated with the obstacles. For example, the amount by which the default movement is extended may depend on how close the obstacles are and/or when the first input was received. In other embodiments example the amount by which the default movement is extended may fixed.

In some embodiments, instead of extending the default movement, the default movement may be reduced. This may for example allow the first input to cause the first obstacle to be navigated and enough time for a second input to be received to allow the obstacle to navigated.

Some example embodiments may provide methods for introducing complexity into computer implemented games. This may be particularly challenging when considering small screen devices, where complex game arrangements may be difficult to display due to the limitations imposed by the devices in terms of processing capability and display size. By providing any of the abovementioned methods, some example embodiments may allow strategic diversity in gameplay, and therefore introduce a further level of complexity to the computer implemented game, without placing undue burden on processing or display requirements. As such, some embodiments may also drive user engagement with the computer implemented game by making the game more complex and challenging.

In the above described embodiments, reference has been made to a character being controlled. It should be appreciated that this is by way of example only and in other embodiments, any object or game entity may be controlled.

Various screens are described. The screens which are displayed are controlled by the at least one processor. The at least one processor may be configured to update one or more screens based on information received from a game server and/or based on a determination made by the at least on processor. The information received from a game server may relate to one or more other players or teams. The information received from a game server may control a season which is provided by the user device. The at least one processor may be configured to provide and/or control one or more timers. The at least one processor may be configured to cause the display to display time information associated with one or more of the timers.

It should be appreciated that the user device is specifically configured to provide the computer implemented game.

It should be appreciated that several of the embodiments have been described in the context of a computer implemented game played on a mobile device. However, it should be appreciated that other embodiments may be played on any other suitable computer device such as a compute console, a laptop or a desktop or gaming computer.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented racing game, the computer device comprising:
a user interface configured to receive user input of a first player to control movement of a first game entity in a run with one or more second game entities of the computer implemented racing game;
at least one processor configured to control movement of the one or more second game entities in the run independently of user input and the movement of the first game entity in response to user input,
a touch screen display configured to display the first game entity moving in the run of the computer implemented racing game with the one or more second game entities, the touch screen display providing said user interface, wherein the display is configured to display a plurality of lanes with the first game entity running in a current lane of the plurality of adjacent lanes and the one or more second game entities each running in one of the plurality of lanes;
wherein the at least one processor configured to:
in response to receiving a swipe to the left on the display, move the first game entity in a leftward direction from the current lane into an adjacent one of the plurality of lanes;
in response to receiving a swipe to the right on the display, move the first game entity in a rightward direction from the current lane into an adjacent one of the plurality of lanes;
determine an end of the run responsive to the first game entity satisfying one or more fail conditions, wherein one of the one or more fail conditions is satisfied by the first game entity when a character re presented by the first game entity dies in the computer implemented racing game;
determine a first score for the first game entity in dependence on a placing of the first game entity at the end of the run;
determine a team score contribution provided by the first game entity in dependence on the first score of the first game entity; and
cause the touch screen display to display a team score for a first team associated with the first game entity and a team score for at least one other team, the first team comprising the first player and at least one second player, the team score for the first team associated with the first game entity taking into account the team score contribution provided by the first game entity and a team score contribution provided by one or more of the at least one second player playing different instances of the computer implemented racing game.

2. The computer device as claimed in claim 1, wherein the user interface is configured to receive user input from the first player to join the first team, prior to the first game entity running in the run with the one or more second game entities.

3. The computer device as claimed in claim 1, wherein the at least one processor is configured to cause the display to display a league table comprising at least: the first team; and the at least one other team.

4. The computer device as claimed in claim 1, wherein the at least one processor is configured to, in response to determining the end of the run, determine which of the first and the one or more second game entities have satisfied one or more fail conditions.

5. The computer device as claimed in claim 1, wherein the at least one processor is configured to determine a placing of the first game entity for the run in dependence on which of the first and the one or more second game entities have been determined to have satisfied the one or more fail conditions.

6. The computer device as claimed in claim 1, wherein the at least one processor is configured to determine the end of the run responsive to determining that one or more of the second game entities has satisfied one or more fail conditions.

7. The computer device as claimed in claim 1, wherein the at least on processor is configured to determine the placing of the first game entity for the run using information associated with the one or more second game entities indicating that one of the one or more second game entities has not satisfied a respective fail condition before the end of the run.

8. The computer device as claimed in claim 1, wherein the at least on processor is configured to determine a placing for the first game entity in dependence on a number of the second game entities which satisfied the one or more fail conditions prior to the end of the run.

9. The computer device as claimed in claim 1, wherein the at least one processor is configured to determine that the first game entity has satisfied an initial first fail condition and in response to cause the display to display information about one or more continue options which when selected allow the first game entity to continue to run in the run.

10. The computer device as claimed in claim 9, wherein the at least one processor is configured to determine that user input has been received via the user interface selecting one or more of the continue options and in response, the at least one processor is configured to cause the first game entity to run in the run.

11. The computer device as claimed in claim 1, wherein the at least one processor is configured to determine a run score for the first game entity in dependence on at least one of a distance run by the first game entity in the run or a length of time run by the first game entity in the run.

12. The computer device as claimed in claim 11, wherein the at least one processor is configured to cause the display to display information associated with the determined run score.

13. The computer device as claimed in claim 11, wherein the at least one processor is configured to determine the first score for the first game entity further in dependence on the run score of the first game entity in the run.

14. The computer device as claimed in claim 1, wherein the at least one processor is configured to determine a run score for the first entity in dependence on one or more parameters associated with the run.

15. The computer device as claimed in claim 1, wherein the one or more second game entities are provided by a respective game bot.

16. The computer device as claimed in claim 1, wherein the at least one processor is configured to cause the first and second game entities to collect resources whilst the first and second game entities move in the run.

17. The computer device as claimed in claim 1, wherein the at least one processor is configured to cause the display to display a plurality of resources in the run and to determine if one of the first and second game entities has collected a respective resource by the movement of the one of the first and second game entities.

18. A computer implemented method provided by a computer device configured to provide a computer implemented racing game, the method comprising:
receiving, by a user interface of the computer device, user input of a first player to control movement of a first game entity in a run with one or more second game entities of the computer implemented racing game, the user interface being provided by a touch screen display of the computer device;
controlling, by at least one processor of the computer device, movement of the one or more second game entities in the run independently of user input and the movement of the first game entity in response to user input;
displaying, by the touch screen display of the computer device, the first game entity moving in the run of the computer implemented racing game with the one or more second game entities, a plurality of lanes being displayed with the first game entity running in a current lane of the plurality of adjacent lanes and the one or more second game entities each running in one of the plurality of lanes;
in response to receiving a swipe to the left on the display, moving by the at least one processor, the first game entity in a leftward direction from the current lane into an adjacent one of the plurality of lanes;
in response to receiving a swipe to the right on the display, moving by the at least one processor, the first game entity in a rightward direction from the current lane into an adjacent one of the plurality of lanes;
determining, by the at least one processor, an end of the run responsive to the first entity satisfying one or more fail conditions, wherein one of the one or more fail conditions is satisfied by the first game entity when a character represented by the first game entity dies in the computer implemented racing game;
determining, by the at least one processor, a first score for the first game entity in dependence on a placing of the first game entity at the end of the run;
determining, by the at least one processor, a team score contribution provided by the first game entity in dependence on the first score of the first game entity; and
causing, by the at least one processor, the touch screen display to display a team score for a first team associated with the first game entity and a team score for at least one other team, the first team comprising the first player and at least one second player, the team score for the first team associated with the first game entity taking into account the team score contribution provided by the first game entity and a team score contribution provided by one or more of the at least one second player playing different instances of the computer implemented racing game.

19. A non-transitory computer readable storage medium comprising computer executable instructions that, when executed by at least one processor of a computer device causes the computer device to:
receive, by a user interface of the computer device, user input of a first player to control movement of a first game entity in a run with one or more second game entities of a computer implemented racing game, the user interface being provided by a touch screen display of the computer device;
control, by at least one processor of the computer device, movement of the one or more second game entities in the run independently of user input and the movement of the first game entity in response to user input;
display, by the touch screen display of the computer device, the first game entity moving in the run of the computer implemented racing game with the one or more second game entities, a plurality of lanes being displayed with the first game entity running in a current lane of the plurality of adjacent lanes and the one or more second game entities each running in one of the plurality of lanes;
in response to receiving a swipe to the left on the display, move by the at least one processor, the first game entity in a leftward direction from the current lane into an adjacent one of the plurality of lanes;

in response to receiving a swipe to the right on the display, move by the at least one processor, the first game entity in a rightward direction from the current lane into an adjacent one of the plurality of lanes;

determine, by the at least one processor, an end of the run responsive to the first entity satisfying one or more fail conditions, wherein one of the one or more fail conditions is satisfied by the first game entity when a character represented by the first game entity dies in the computer implemented racing game;

determine, by the at least one processor, a first score for the first game entity in dependence on a placing of the first game entity at the end of the run;

determine, by the at least one processor, a team score contribution provided by the first game entity in dependence on the first score of the first game entity; and cause, by the at least one processor, the touch screen display to display a team score for a first team associated with the first game entity and a team score for at least one other team, the first team comprising the first player and at least one second player, the team score for the first team associated with the first game entity taking into account the team score contribution provided by the first game entity and a team score contribution provided by one or more of the at least one second player playing different instances of the computer implemented racing game.

* * * * *